US008487756B2

(12) United States Patent
Karr

(10) Patent No.: US 8,487,756 B2
(45) Date of Patent: Jul. 16, 2013

(54) LOCATOR INVENTORY SYSTEM

(75) Inventor: Lawrence J. Karr, Santa Monica, CA (US)

(73) Assignee: Roundtrip LLC, Los Angeles, CA (US)

(*) Notice: Subject to any disclaimer, the term of this patent is extended or adjusted under 35 U.S.C. 154(b) by 439 days.

(21) Appl. No.: 12/983,756

(22) Filed: Jan. 3, 2011

(65) Prior Publication Data
US 2011/0095866 A1  Apr. 28, 2011

Related U.S. Application Data

(63) Continuation-in-part of application No. 12/210,115, filed on Sep. 12, 2008, now Pat. No. 7,864,045.

(51) Int. Cl.
*G08B 1/08* (2006.01)
*G08B 13/14* (2006.01)

(52) U.S. Cl.
USPC ............ 340/539.13; 340/539.16; 340/539.17; 340/572.1

(58) Field of Classification Search
USPC .................. 340/572.1, 572.4, 539.1, 539.11, 340/539.13, 539.16, 539.17; 342/450, 463, 342/465; 370/328, 350; 455/404.2, 456.1, 455/456.2, 550.1, 556.2
See application file for complete search history.

(56) References Cited

U.S. PATENT DOCUMENTS

| 5,418,537 | A | 5/1995 | Bird ............................. 342/357 |
| 5,418,736 | A | 5/1995 | Widigen et al. .............. 364/786 |
| 5,528,232 | A | 6/1996 | Verma et al. ............ 340/825.49 |
| 5,565,858 | A | 10/1996 | Guthrie ...................... 340/10.33 |
| 5,576,716 | A | 11/1996 | Sadler ........................... 342/357 |
| 5,774,876 | A | 6/1998 | Woolley et al. ................ 705/28 |
| 5,804,810 | A | 9/1998 | Woolley et al. ............... 235/492 |
| 5,892,441 | A | 4/1999 | Woolley et al. .......... 340/539.26 |
| 5,920,287 | A * | 7/1999 | Belcher et al. ................ 342/450 |
| 5,959,568 | A | 9/1999 | Woolley ......................... 342/42 |
| 6,946,956 | B2 | 9/2005 | Hayashi et al. .......... 340/539.13 |
| 7,046,657 | B2 | 5/2006 | Harrington et al. .......... 370/350 |
| 7,130,293 | B2 | 10/2006 | Hanada et al. ................ 370/342 |
| 7,269,427 | B2 | 9/2007 | Hoctor et al. .............. 455/456.2 |
| 7,499,711 | B2 | 3/2009 | Hoctor et al. .............. 455/456.1 |

(Continued)

FOREIGN PATENT DOCUMENTS

KR   10-2007-0057601   7/2007

OTHER PUBLICATIONS

International Search Report, PCT/US2008/085017, dated Mar. 13, 2009.

(Continued)

*Primary Examiner* — Van T. Trieu
(74) *Attorney, Agent, or Firm* — Merchant & Gould

(57) ABSTRACT

A transmission sequence is broadcast from a locator to a group of transponder devices. Each transponder identified with the group is arranged to receive and capture at least a portion of the transmission, correlate the captured information with an internally stored reference sequence for the identified group, and identify a correlation when the captured information correlates with the internally stored reference sequence. Each transponder that finds a correlation is arranged to broadcast a transmission reply sequence at a precisely determined time interval so that the transponders in a group transmit at different times. A series of locators receive the transmission reply sequence(s), each at a precisely logged time of arrival, and the locators forward the received results to a central processing unit for time synchronization, location tracking, and inventory logging.

51 Claims, 33 Drawing Sheets

U.S. PATENT DOCUMENTS

| | | | |
|---|---|---|---|
| 7,672,690 B2 | 3/2010 | Hsu et al. | 455/552.1 |
| 7,864,045 B2 | 1/2011 | Karr | 340/539.13 |
| 2003/0212602 A1 | 11/2003 | Schaller | 705/22 |
| 2005/0283411 A1 | 12/2005 | Reah | 705/28 |
| 2006/0055552 A1 | 3/2006 | Chung et al. | 340/686.1 |
| 2006/0164239 A1 | 7/2006 | Loda | 340/539.22 |
| 2006/0173756 A1 | 8/2006 | Benight | 705/28 |
| 2006/0282340 A1 | 12/2006 | Morand et al. | 705/28 |
| 2007/0001809 A1 | 1/2007 | Kodukula et al. | 340/10.1 |
| 2007/0069895 A1 | 3/2007 | Koh | 340/572.1 |
| 2007/0085677 A1 | 4/2007 | Neff et al. | 340/539.22 |
| 2007/0126583 A1 | 6/2007 | Maniwa et al. | 340/572.2 |
| 2007/0291690 A1 | 12/2007 | Twitchell, Jr. | 370/328 |
| 2009/0201152 A1 | 8/2009 | Karr et al. | 340/545.6 |
| 2010/0066531 A1 | 3/2010 | Karr | 340/539.1 |

OTHER PUBLICATIONS

International Search Report, PCT/US2009/056626, dated Jun. 14, 2010.

EP Supplementary Search Report, issued Mar. 15, 2011, in EP Application No. 08 85 4790.6.

Office Action issued Apr. 11, 2011, in EP Application No. 08 85 4790.6.

* cited by examiner

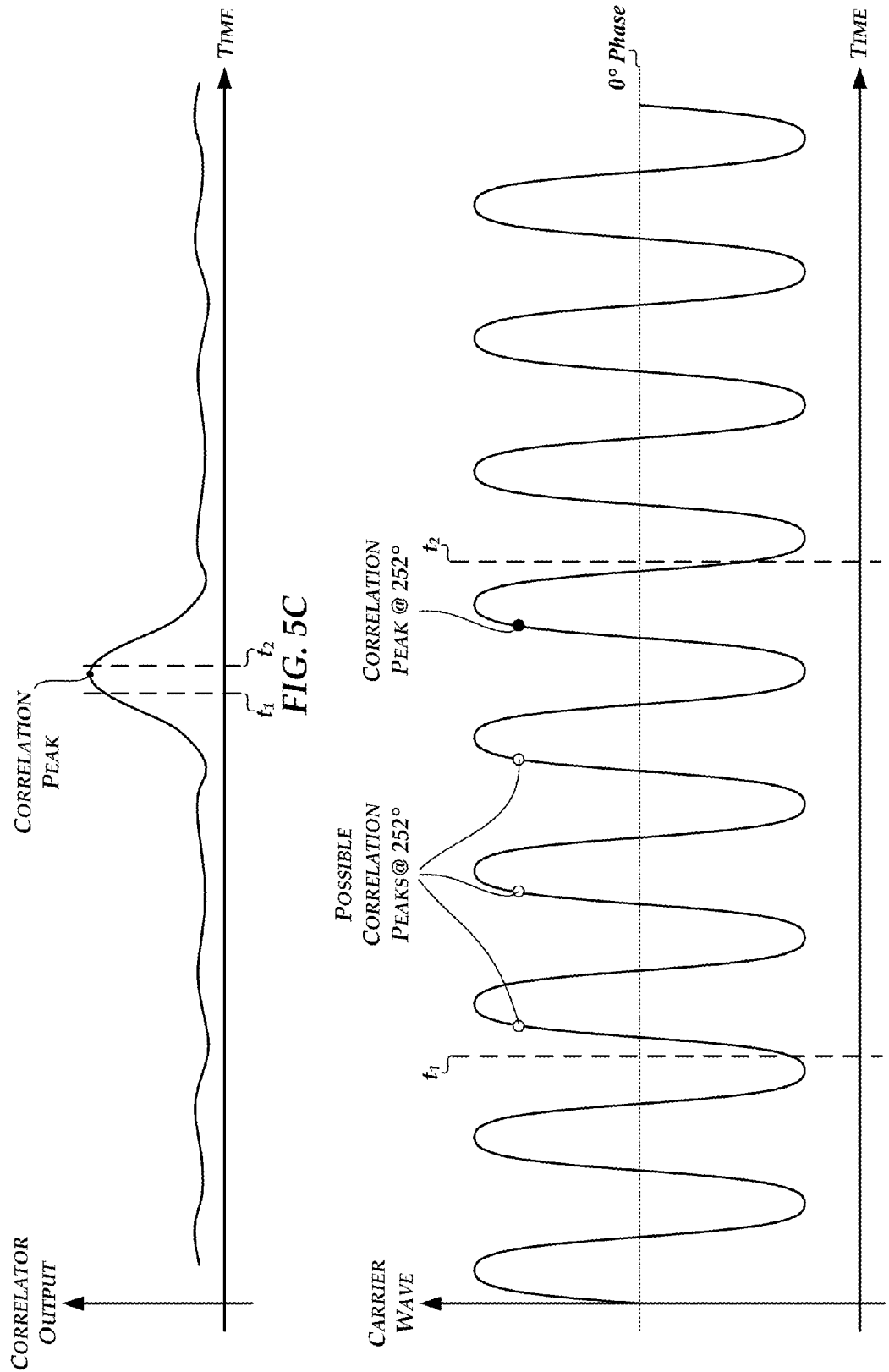

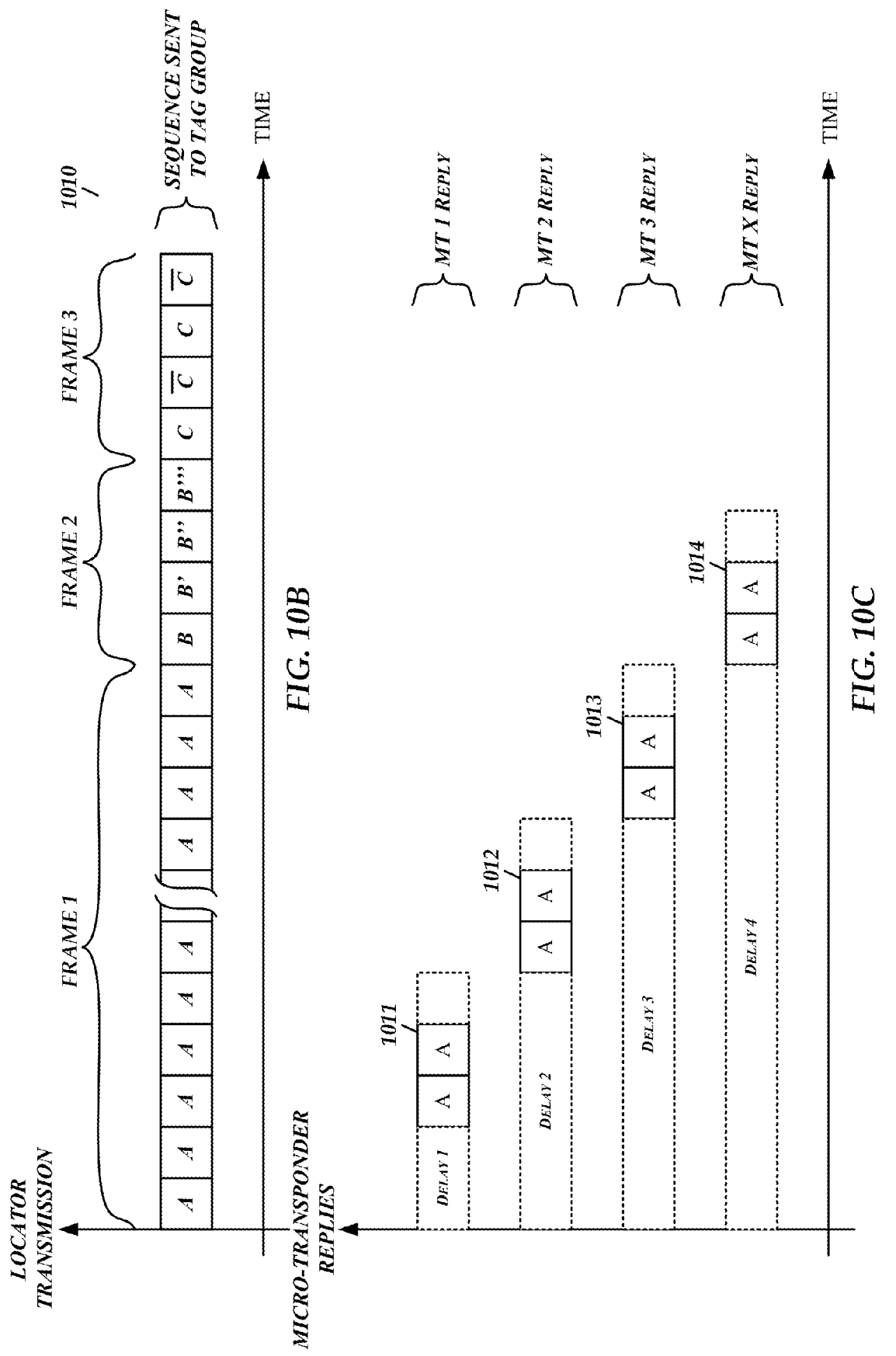

| Locator Number | Operational Status | Physical Location | Accessible Tags | Group Assignments |
|---|---|---|---|---|
| Locator 1 | OK | Position 1 | Tag 1, Tag 2, Tag 3 ... Tag N | Group 1, Group 2, Group 3 ... Group M |
| Locator 2 | OK | Position 2 | Tag 2 | Group 1 |
| Locator 3 | Not Responding | *Position 3* | Unknown | Group 1, Group 3, Group 4 |
| Locator 4 | OK | Position 4 | Tag 1, Tag 2, Tag 5 | Group 1, Group 2 |
| ••• | ••• | ••• | ••• | ••• |
| Locator Y | OK | Position Y | Tag 1, Tag 2, Tag 3 ... Tag N | Group 1, Group 2, Group 3 ... Group M |

*FIG. 13C*

| Tag Number | Operational Status | Physical Location | Group Assignments |
|---|---|---|---|
| Tag 1 | OK | Location 1 | Group 2 |
| Tag 2 | Not Responding | *Location 2* | Group 1, Group 2, Group 3 ... Group M |
| Tag 3 | OK | Unknown | None |
| Tag 4 | OK | Location 4 | Group 1, Group 3 |
| ... | ... | ... | ... |
| Tag N | OK | Location Y | Group 1, Group 2, Group 3 ... Group M |

FIG. 13D

LOCATOR INVENTORY SYSTEM

CROSS-REFERENCE TO RELATED APPLICATIONS

This application is a continuation in part of U.S. patent application Ser. No. 12/210,115, now U.S. Pat. No. 7,854,045 entitled "LOCATOR INVENTORY SYSTEM", which was filed on Sep. 12, 2008, which is hereby incorporated by reference. This application is also related to U.S. patent application Ser. No. 12/324,615, now U.S. Pat. No. 7,936,271 titled "ANTI-TAMPER CARGO CONTAINER LOCATOR SYSTEM" which was filed on Nov. 26, 2008; and U.S. Provisional Patent Application No. 60/990,277, titled "ANTI-TAMPER CARGO CONTAINER LOCATOR SYSTEM", filed Nov. 26, 2007; which are hereby incorporated by reference.

FIELD OF THE INVENTION

The present disclosure relates generally to a system, method and apparatus for locating a transponder with one or more locators. More particularly, the present disclosure relates to a system where a transmission sequence is broadcast from a locator to a group of transponder devices. Each transponder identified with the group is arranged to receive and capture at least a portion of the transmission, correlate the captured information with an internally stored reference sequence for the identified group, and identify a correlation when the captured information correlates with the internally stored reference sequence. Each transponder that finds a correlation is arranged to broadcast a transmission reply sequence at a precisely determined time interval so that each transponder does not transmit at the same time. A series of locators receive the transmission reply sequence(s), each at a precisely logged time of arrival, the locators perform signal processing operations including correlation, and the locators forward the received and processed results to a central processing unit for time synchronization, location tracking, and inventory logging.

BACKGROUND

Some methods for locating an object are known in the art. A missing vehicle locator system is described in U.S. Pat. No. 5,418,736 issued to Bird. The vehicle locator system uses one or more GPS systems in conjunction with a GPS antenna, a receiver/transmitter, a telephone with associated antennas, and a modem mounted in a vehicle whose position is to be monitored. A paging request is issued and received by a paging responder in the vehicle. The paging request causes the modem to interrogate the GPS receiver to determine the current position of the vehicle. The current position of the vehicle is transmitted via a cellular telephone link to notify a vehicle location service center of the current location of the vehicle. Other known location determination techniques include the use of a Loran or a Glonass satellite based system.

Another object location system is described in U.S. Pat. No. 5,576,716 to Sadler for locating lost or stolen property. This location system includes a GPS module, a microcomputer, a modem, and a telephone, all of which must be installed in the vehicle. The system described regularly and automatically computes the position of the property for transmission via the phone link to a central receiver/transmission station.

Low power transmissions are subject to signal corruption due to noise, static, and signal interference. Extracting information from a signal in the presence of such interference and noise is very difficult when the information signal is of the same order of magnitude as the noise sources. The presently described invention identifies various noise problems from the conventional solutions and provides a new and novel system, method, and apparatus that is arranged to extract signals from a transmission using very low power in a small scale object location system.

The present applicant has developed various technologies related to communications between locators and transponders as is described in the following issued U.S. patents and published U.S. patent applications: U.S. Pat. No. 7,791,470, titled "SPIN AROUND DIRECTION AND DISTANCE LOCATOR," and issued on Sep. 7, 2010; U.S. Pat. No. 7,646,330 "SYSTEM AND METHOD FOR LOCATING OBJECTS AND COMMUNICATING WITH THE SAME," and issued on Jan. 12, 2010; U.S. Pat. No. 7,592,918, titled "ELECTRONIC FENCE MODE ALERT SYSTEM AND METHOD," and issued on Sep. 22, 2009; U.S. Pat. No. 7,573,381, titled "REVERSE LOCATOR," and issued on Aug. 11, 2009; and U.S. Published Application 2008/0102859, titled "LOCATION OF COOPERATIVE TAGS WITH PERSONAL ELECTRONIC DEVICE," filed on Oct. 25, 2007 as U.S. patent application Ser. No. 11/924,553, which are hereby incorporated by reference.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified:

FIGS. 5C-5D are diagrams illustrating example correlation peaks for an example receiver;

FIGS. 10A-10C illustrate an example system where a locator concurrently transmits to multiple transponders (MTs or tags) that are the member of a group, and subsequently receives transmissions from each transponder according to a precisely determined delay;

FIGS. 13C-13D illustrate example data structures for storing information about locators and tags;

Figure 1A:
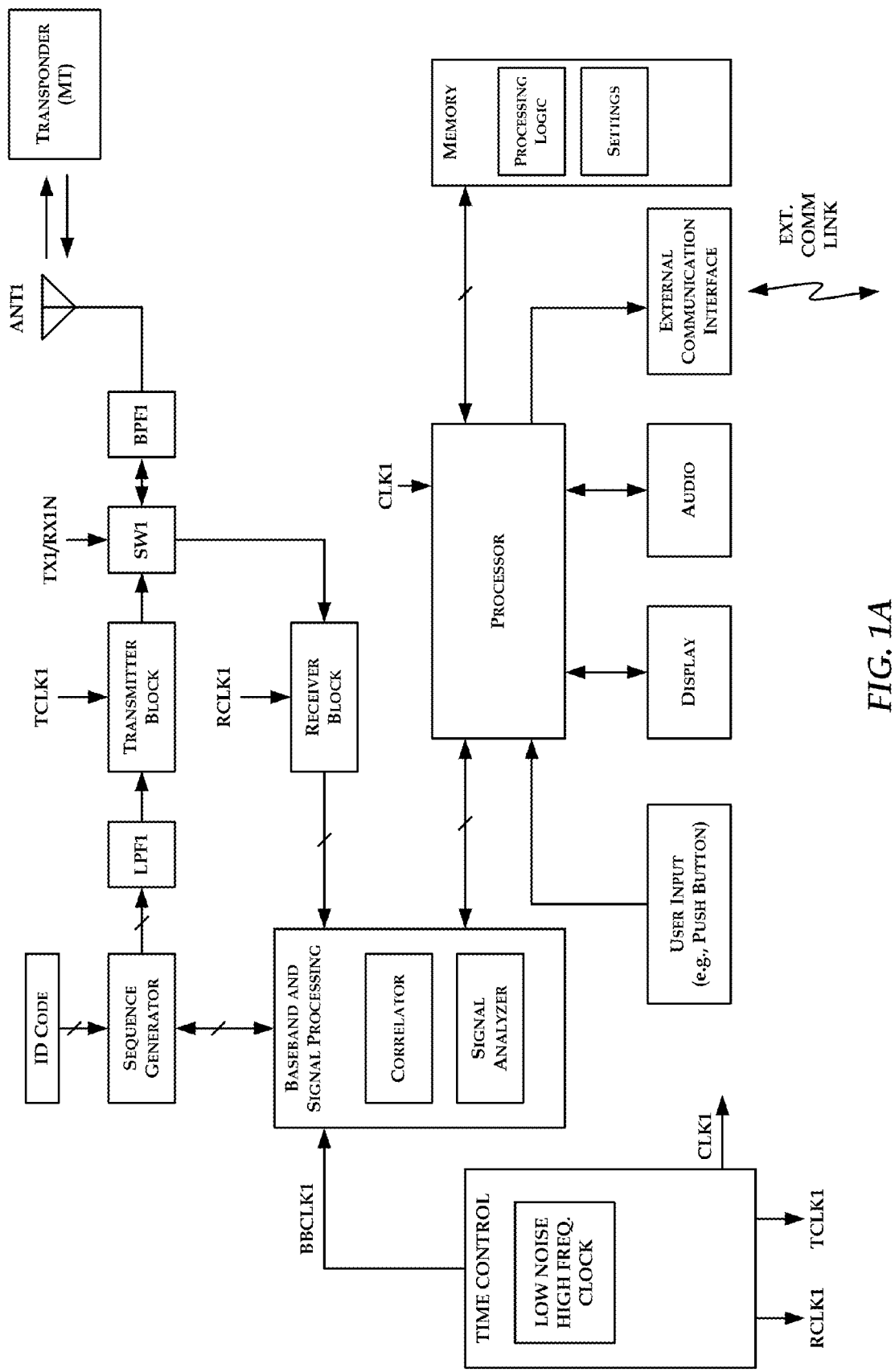
FIGS. 1A and 1B illustrate an example communication system that includes a remote locator (RL) and a microtransponder (MT)

all arranged in accordance with at least some aspects of present disclosure.

DETAILED DESCRIPTION

The present disclosure now will be described more fully hereinafter with reference to the accompanying drawings, which form a part hereof, and which show, by way of illustration, specific exemplary embodiments for practicing the invention. This disclosure may, however, be embodied in many different forms and should not be construed as limited to the embodiments set forth herein; rather, these embodiments are provided so that this disclosure will be thorough and complete, and will fully convey the scope to those skilled in the art. Among other things, the present disclosure may be embodied as methods or devices. Accordingly, the present disclosure may take the form of an entirely hardware embodiment, an entirely software embodiment or an embodiment combining software and hardware aspects. The following detailed description is, therefore, not to be taken in a limiting sense.

Throughout the specification, and in the claims, the term "connected" means a direct electrical connection between the things that are connected, without any intermediary devices. The term "coupled" means either a direct electrical connection between the things that are connected or an indirect connection through one or more passive or active intermediary devices. The term "circuit" means one or more passive and/or active components that are arranged to cooperate with one another to provide a desired function. The term "signal" means at least one current signal, voltage signal, electromagnetic wave signal, or data signal. The meaning of "a", "an", and "the" include plural references. The meaning of "in" includes "in" and "on".

Briefly stated, the present disclosure relates generally to a system, method and apparatus for locating a transponder with one or more locators. More particularly, the present disclosure relates to a system where a transmission sequence is broadcast from a locator to a group of transponder devices. Each transponder identified with the group is arranged to receive and capture at least a portion of the transmission, correlate the captured information with an internally stored reference sequence for the identified group, and identify a correlation when the captured information correlates with the internally stored reference sequence. Each transponder that finds a correlation is arranged to broadcast a transmission reply sequence at a precisely determined time interval so that each of the transponders in the identified group transmit at different times. A series of locators receive the transmission reply sequence(s), each at a precisely logged time of arrival, and the locators forward the received and/or processed results to a central processing unit for time synchronization, location tracking, and inventory logging.

As will be described, the MT and the RL each include a receiver and a transmitter. The communication signals from the transmitters are encoded with a unique ID code. In some examples, a group ID code can be used so that a locator (RL) can address multiple transponders (MT) at the same time such as might be desirable in an inventory tracking system. The communication signal consists of a sequence of encoded transmissions, where each sequence is arranged to provide a portion of clock synchronization and calibration information. Each receiver validates the ID code for the transmission, and decodes information. The frequency, phase, and starting time of the coded transmission sequence is determined by the transmission sequence itself such that clock recovery can be performed without additional information. The MT can be a wearable circuit such as a band or collar, affixed to an object, embedded in an object, or an implantable bionic device.

Frequency and phase information in the MT is initially recovered from one portion of the transmission from the RL, and further refined using a bootstrapping process. Timing location within the frame (e.g., coarse timing) is recovered in another portion of the transmission from the RL. After the timing, phase and frequency are recovered, data reception can be scheduled with a degree of certainty. The data is extracted and a reply message is transmitted from the MT back to the RL, where similar signal processing functions are performed. The carefully corrected round-trip time and the recovered phase of the transmission sequence is used to identify distance between the RL and the MT. A synthetic round-trip Doppler shift, which is independent of the MT's internal clock, is measured to and correlated against the relative motion of the RL and MT to assess identify an appropriate direction for a directional vector between the RL and the MT. The magnitude of the directional vector is determined by the round-trip time.

The presently described system has the ability to identify location of a RL with a MT utilizing an asymmetric transmission system. The signals captured by the MT will typically not be aligned in time with the start and end of a complete pattern in the sequence (e.g., a 2047 chip sequence). However, the RL is arranged to transmit repeated patterns over time in the sequence. The MT is arranged to cyclically capture a complete pattern in the sequence, even though the captured pattern may not be rotated in time relative to the start and end of a complete pattern. A circular correlator can be used to evaluate the captured signals such that the captured signals are properly identified by the MT, despite the rotation status of the pattern. Since the MT does not have a priori knowledge of the timing related to transmission and reception from the RL, circular correlations of the received transmissions are used by the MT to determine the fine and coarse timing. A circular correlation is a correlator that operates on a sequence of fixed length, where the sequence may be circularly shifted in time such that the beginning of the original sequence may be received in the shifted sequence after the end of the original sequence. While a general correlator may not give valid timing information, the circular correlation will provide valid timing information when the captured signals are not aligned in time with the start and end of a complete pattern.

The presently described asymmetric transmission system can be configured such that the MT receives a relatively high power transmission of a structured signal from the RL, while the reply or acknowledgement transmission from the MT to the RL is a very low power transmission. An example MT is configured to operate in a very low power "inactive" mode or "sleep mode", where the MT "activates" or "wake-ups" for brief intervals to listen for the transmission from the RL. The MT correlates each piece of its received structured signals to determine if these signals are coded with an identification code (ID Code) that is specifically associated with the MT.

The MT also determines the precise frequency, timing, phase, and cadence for which a reply transmission can be transmitted back to the RL from the received structured signals. The reply transmission that is transmitted from the MT to the RL is a very low power transmission of short duration (a short structured signal) such that significant battery life is conserved. Although the reply transmission is a very low power transmission, the RL is arranged to utilize an integration and circular correlation technique to increase the signal-to-noise level of the captured reply transmission.

In the presently described system, a reply transmission signal is transmitted back to the RL from an MT, where the MT synthesizes timing, frequency, phase, and cadence for the reply transmission from signals that are received by the MT from the RL. The frequency of the reply transmission from the MT differs from the original frequency from the RL's transmission by a Doppler shift (ignoring other noise and minor error sources). As such, the RL can predict the reply transmission frequency with a very small margin of error. The potential uncertainty of the reply transmission frequency is small enough so that the phase rotation over several tens of transmission sequences is much less than one turn (one phase rotation through 360 degrees). This allows the RL to sample the reply transmission and add (or integrate); either in the analog domain or the digital domain, the respective samples from reply transmission sequence. Since noise sums as a square root and signal sums linearly, the signal-to-noise ratio for the captured signal is increased, allowing reception of a much lower level signal than would otherwise be the case without the use of exhaustive computation.

The MT replies with a transmitted phase which is either matched to the phase of the received locator signal (a zero degree phase difference), or additively related to the phase of the received locator signal. The RL is therefore able to precisely determine the round trip phase shift, and determine distance in terms of carrier cycles. For example, as illustrated in FIG. 5C an RL receives a reply transmission from an MT and identifies a correlation peak within a time interval of $t_1$ to $t_2$. The time interval ($t_1$ to $t_2$) exactly corresponds to one cycle of the carrier wave shown in FIG. 5D. For example, a 915 MHz carrier wave has a period of approximately 1.093 nanoseconds. The phase of the carrier wave at the time of a correlation peak in this example corresponds to about 70% of the time interval ($t_1$ to $t_2$) or about 252 degrees. This determination becomes useful when the signal-to-noise ratios at the MT and at the RL are sufficiently great to allow the selection of a particular carrier cycle. Since a carrier cycle at 915 MHz for instance is a distance of about 33 centimeters, the distance determination without carrier phase identification must be accurate to about 33 centimeters to allow selection of a particular carrier phase. For example, 100 cycles of a 915 MHz carrier wave corresponds to a distance of about 32.8 meters). Distance measurements can then be refined in accuracy to within a small fraction of a carrier cycle (a centimeter or two) using the phase information. For example, a phase of 252 degrees corresponds to a distance of about 23 centimeters for a carrier frequency of 915 MHz. Thus, the described system has two accuracy states, one for the number of cycles that occur before a correlation peak is found, and one for the precise phase of the carrier signal when the correlation peak is detected. For example, 100 cycles of a 915 MHz carrier wave with a detected phase of 252 degrees corresponds to about 33 meters of distance. When multiple independent distance estimates resulting from interrogations by several remote locator are consolidated together, the distance estimates can be improved often to the point where the phase navigating, interferometric based measurements becomes possible with exceptional accuracy.

Example System

Figure 1B:
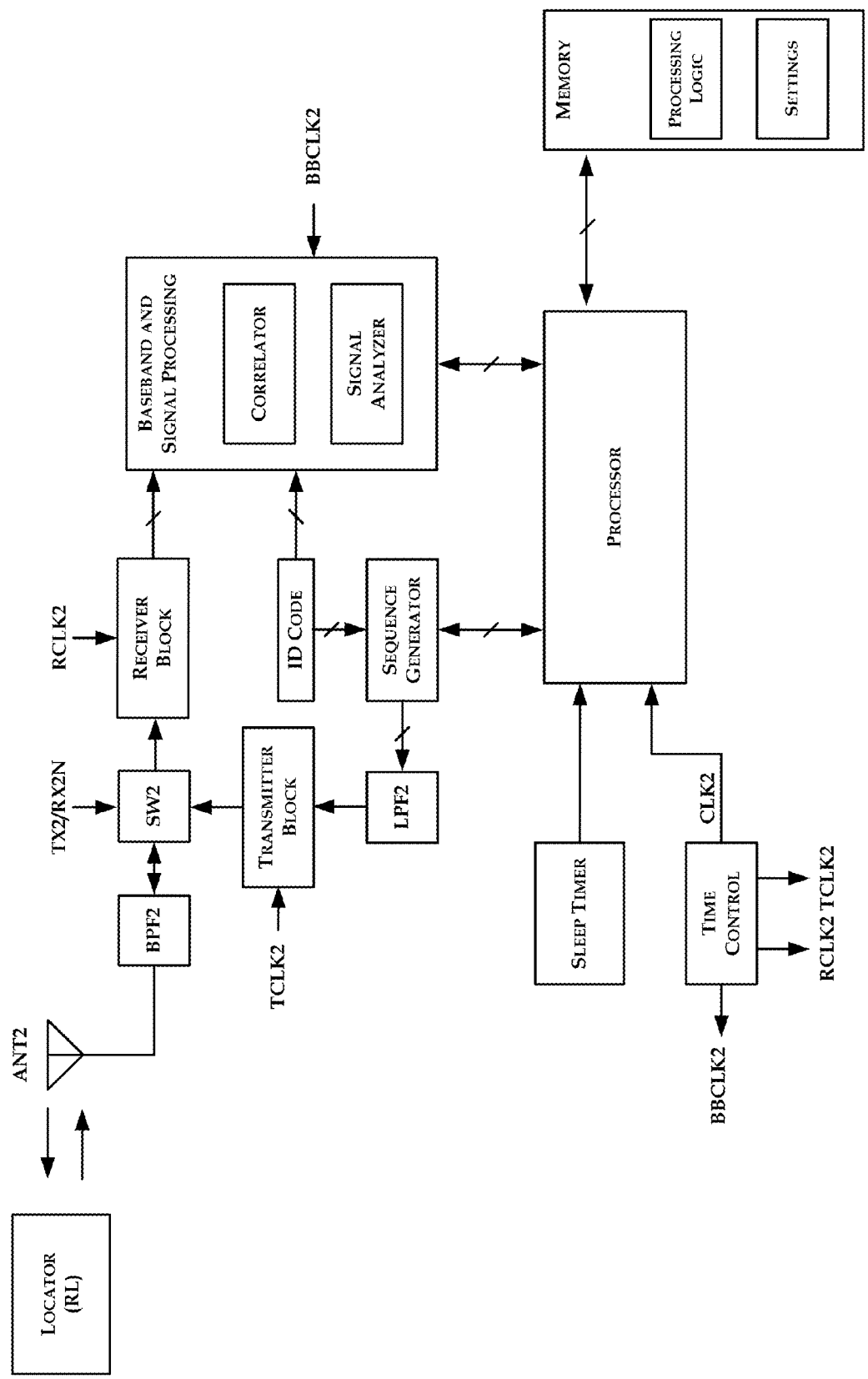

FIGS. 1A and 1B illustrate an example communication system that includes a RL and a MT arranged in according with at least one aspect of the present disclosure. The RL is arranged to transmit a sequence over a first communication channel, while the MT is arranged to transmit back to the RL over the communication channel in a half-duplex fashion.

The example RL device includes a first antenna (ANT1) that is coupled to a first transmit/receive switch (SW1). Another antenna (ANT1B) can optionally be coupled to the receiver block in some example systems through an additional switch (SW1B), where the second antenna is oriented orthogonal with respect to the first antenna. The selection of the antenna can be accomplished by a select control signal (SEL) that is arranged to operate the additional switch (SW1B) as a multiplexer between the various antennas. The antennas can be configured as diversity antennas so that additional information about signal strength, distance and Doppler can be obtained. The first transmit/receive switch (SW1) is coupled to a first transmitter block and a first receiver block in response to a first control signal (TX1/RX1N). A transmission sequence (e.g., TSEQ) is coupled to the first transmitter block when transmission commences, where the sequence is determined by an ID code. The first receiver block is coupled to the baseband and signal processing block. Time control is provided to the transmitter, receiver, baseband processing, and the processor in the form of various control signals (CLK1, RCLK1, TCLK1 and BBCLK1). The processor receives inputs and coordinates the operation of the baseband processing, signal analysis, memory buffering, input processing, display processing, and audio processing. The memory processing can include random access memory (RAM), read-only memory (ROM), as well as non-volatile memory (NVM) such as Flash memory, battery backed up RAM, EEPROM, as well as other NVM type technologies.

The example MT device includes a second antenna (ANT2) that is coupled to a second transmit/receive switch (SW2). The second transmit/receive switch (SW2) is coupled to a second transmitter block and a fourth receiver block in response to another control signal (TX2/RX2N). A reply sequence (e.g., RSEQ) is coupled to the second transmitter block when transmission commences, where the sequence is determined by the ID code. The second receiver block is arranged to provide in-phase and quadrature signals (I and Q) that are captured in a buffer (e.g. a memory buffer such as a digital buffer or an analog sample buffer). The capture buffer is coupled to a correlator in a baseband signal processor block, which can provide both direct form correlation and FFT correlation functions. The FFT correlator is arranged to provide a circular correlation function of the received I/Q data with the complex I/Q data related to the ID code. A signal analyzer and a processor are both arranged to receive the data output from the correlator for evaluation. Time control is provided to the transmitter, receiver, and the processor in the form of various additional control signals (TCLK2, RCLK2 and CLK2). The processor receives inputs and coordinates the operation of the correlator, signal analysis, sequence generation, memory buffering, and other related tasks. The memory for the processor can include random access memory (RAM), read-only memory (ROM), as well as non-volatile memory (NVM) such as Flash memory, battery backed up RAM, EEPROM, as well as other NVM type technologies.

Current technology systems for locating people and things have a rather short battery life, which can limit their use. The present disclosure describes a small device (e.g., a transponder or a micro-transponder) that has a long battery life by suspending energy consumption until operation is required. Since the MT device needs to be in an active state for very brief intervals, the battery life is extended substantially. Although cellular telephone technologies can be used to determine position in conjunction with a global positioning system (GPS) set, the energy required to operate conventional cellular telephones even in a standby mode will rapidly deplete small batteries. In addition, a GPS set in such an application would awaken from sleep, and perform a cold start location fix, which process will consume a considerable amount of energy that again rapidly depletes the battery. The present disclosure contemplates that a portable location technology is preferably operated intermittently to minimize power consumption, and thus addresses some of the problems from conventional location determination techniques.

The present disclosure has analyzed and identified problems with current Doppler shift technology such as found in GPS signals. Although GPS signals may be detected efficiently by means of FFT correlation, there are approximately 28 GPS satellites that include a significant level of Doppler ambiguity from about ±15 ppm. For a GPS signal of 1.5 GHz and a capture interval of 1 msec, a Doppler shift of roughly 22 KHz maximum requires on the order of several tens of Doppler bins or correlation attempts to identify the Doppler shift. The processing efforts necessary to utilize a conventional GPS technology are unacceptable for the presently disclosed use. For example, the MT in the current disclosure is searching for a single code, and in addition, need not contend with huge velocities, and thus does not require any Doppler bins. Moreover, the present disclosure describes an apparatus and system that has reduced capture times relative to conventional technologies, where the magnitude of the processing is reduced by approximately two orders of magnitude.

Example Remote Locator (RL)

FIG. 1A illustrates an example RL that is arranged to communicate with an example MT. The MT is arranged (e.g., by a sleep timer or user initiated) to wake up at pre-determined intervals and receive a coded transmission signal (e.g., COM13). The coded signals are received and evaluated using a variety of signal processing methods such as digital signal processing, analog signal processing, Fast Fourier Transform (FFT), correlation, inverse FFT (IFFT) to name a few. The MT evaluates the received coded signals to determine if the signals are specifically identified with the MT (e.g., by a unique ID code). Through the various signal-processing functions, various internal signals and parameters are varied such that time, frequency and phase alignments for receiving and transmitting coded information are successively refined (e.g., through digital control mechanisms) for accurate processing. The MT, using as it's time base the Doppler shifted frequency of the signal from the RL, subsequently transmits a reply sequence back to the RL, which is similarly coded. The RL receives the coded transmission, and processes the incoming signals in a similar fashion as the MT.

The RL includes a processor that can be any appropriate processing means including but not limited to at least one: micro-processor, micro-controller, CISC processor, RISC processor, application specific integrated circuit (ASIC), to name a few. The processor is arranged to: receive and evaluate inputs, control outputs, log data, retrieve logged data, and execute programs. The processor is thus arranged to communicate with any number of circuit components such as: a time control circuit, a storage circuit, and a memory circuit.

The processor is arranged to apply mode control logic that is responsive to messages received from the MT, as well as its own internal mechanisms, for activating and deactivating a variety of operating modes as will be described. The mode control logic and any related settings for the RL can be provided in a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

The RL is operated to send a transmission that consists of a series of coded signals. The code is generated by a unique identifier (e.g., an ID Code) that is associated with a specific MT. A sequence generator is arranged to evaluate the unique identifier and create a transmit sequence. After the coded sequence is generated for the unique identifier, additional information is encoded into the transmit sequence. In one example, the additional information can be command/control instructions for the MT. In another example the encoded information is distance measurements. Only one sequence need be transmitted to accomplish communication, timing synchronization, and sequence validation. The output of the sequence generator (e.g., TSEQ) can be filtered such as by a low pass filter (LPF1) prior to coupling the signal to the transmitter block.

The transmitter block is arranged to carrier modulate (e.g., multi-phase shift keying, binary phase shift keying, quadrature phase shift keying, differential phase shift keying, continuous phase modulation, multiple amplitude and phase shift keying, etc.) the coded signals with a carrier frequency, a spread spectrum carrier, and/or a frequency hopping method. The transmit-receive switch (SW1) is arranged to couple the carrier modulated coded signals to the antenna (ANT1) during the transmit sequence. A band-limiting filter (e.g., BPF1) can be provided between the antenna and the transmit-receive switch (SW1) such that out-of-band signals are ignored. The band-limiting filter (BPF1) can be any filter that provides reasonable band-limiting functions such as: a passive band-pass filter, an active band-pass filter, a surface acoustic wave (SAW) filter, a bulk acoustic wave (BAW) filter, a comb filter, a strip-line filter, to name a few.

The RL is operated to receive a transmission from the MT that consists of another series of coded signals. The coded signal is similarly generated by the MT with a unique identifier (e.g., the ID Code) that is associated with the specific MT. The receiver block is arranged to receive carrier modulated (e.g., multi-phase shift keying, binary phase shift keying, quadrature phase shift keying, differential phase shift keying, continuous phase modulation, multiple amplitude and phase shift keying, etc.) coded signals from the antenna (ANT1) via SW1. The received signals are handled by a baseband processor that can also provide signal-processing functions. Alternatively, the baseband processor is arranged to provide captured signals to the processor, which is arranged to handle various signal-processing functions.

The described RL performs distance measurement by round trip time measurement. For example, the round trip time can be determined by the difference in time between the transmission of a signal from the MT to the RL, and the subsequent reply transmission of an acknowledgement signal from the RL back to the MT, offset by any other delays.

Various timing signals that are employed by the RL are generated by a time control circuit as illustrated in FIG. 1A. The timing signals are used by the system to digitally synthesize transmitter and receiver carrier wave signals from a locally generated oscillator signal in the RL.

Example Micro-Transponder (MT)

FIG. 1B illustrates an example MT that is arranged to communicate with a RL. The example MT may be placed in a wristband, a collar, a watch, sewn into an article of clothing, or implanted in a patient such as a with a bionic-type device. The MT is arranged to receive a coded transmission signal, such as previously described, from the RL with a receiver block via switch SW2 and antenna ANT2. Optionally, a band-limiting filter (e.g., BPF2) can be used to minimize interference from out-of-band signals in the receiver and/or to prevent interference with other devices. The receiver demodulates the carrier frequency and provides I and Q information, which is subsequently captured by a capture buffer. The capture buffer provides output signals in the form of data to an FFT correlator, which correlates the decoded transmission with the unique identifier (ID code).

The MT includes a processor that can be any appropriate processing means including but not limited to at least one: micro-processor, micro-controller, CISC processor, RISC processor, application specific integrated circuit (ASIC), to name a few. The processor is arranged to: receive and evaluate inputs from the user, control outputs, log data, retrieve logged data, and execute programs. The processor is thus arranged to communicate with any number of circuit components such as: a time control circuit, a use input circuit, a digital compass circuit, an audio circuit, a display circuit, a storage circuit, and a memory circuit.

The processor is arranged to apply mode control logic in response to a variety of user inputs for activating and deactivating a variety of operating modes as will be described. The mode control logic and any related settings for the MT can be provided in a read-only memory (ROM) that is loaded into a conventional memory for execution by the processor, or by some equivalent mechanism such as a non-volatile memory (NVM), a flash memory device, and hard-coded instructions in a micro-controller, to name a few. In another example, the processor and memory can be replaced with a programmable logic device (PLD), a specially designed circuit such as an application specific integrated circuit (ASIC), as well as others devices that are arranged to provide similar functionality.

Example inputs can be from any number of sources such as: an interrupt signal, a wake-up timer, a keyboard device, a keypad device, one or more buttons or keys, a touch-screen (passive or active), a touch-panel, a joystick device, a joy-pad device, a mouse device, a pointing device, a touch-pad device, a pressure sensitive input device, or another processor and an input generated by a software program. In some examples, sound can be used as an input to the MT via audio input processor such as an analog-to-digital converter (ADC) circuit or a coder-decoder (CODEC) circuit that includes analog-to-digital conversion means. A microphone can be built into the MT or externally coupled to the MT through a microphone port for sound input purposes, where signals received by the microphone into a digital signal that can be interpreted as an input. The sound-based input can be stored for further use (e.g., a sound file for playback or recognition purposes) or interpreted as a voice input that can be utilized by the MT. In some implementations, a voice-to-text interpreter can be incorporated into a hardware solution that is arranged in communication with the processor. In some other examples, voice recognition under software control implemented by the audio input processor to operate as a voice input means that generates an example input.

Audio output circuits can be used as an indication means for reporting audible information to a user of the RL device, as well as to provide navigation and location information. The audio output circuit can include an audio output device and an audio output processor. The audio output processor is arranged to cooperate with the audio output device to provide an audible notification to the user. The functions of the audio output device and the audio output processor can be combined in some implementations. The audio output device can be an audio driver circuit for a headphone type device or a speaker type device. In some examples, a speaker or a piezo device is included in the RL to provide sound output. In another example, an audio output port such as a headphone jack can be provided in the RL for a user to connect a headphone type device, or perhaps an external speaker connection.

The audio output processor can be a single tone generator circuit, a polyphonic tone generator circuit, a polyphonic synthesizer circuit, a voice synthesizer circuit, a MIDI playback circuit, or a sound playback circuit. In some examples, the audio output processor includes digital-to-analog conversion means such as from a digital-to-analog converter (DAC) circuit or from a CODEC circuit. The voice synthesizer circuit can include a text to speech interpreter. The voice synthesizer can also be arranged to provide various regional voice affectations and language accents, such as male and female voices, robotic voices, English accents, French accents, Spanish accents, etc. In some examples, the audio output processor is arrange to provide music playback that can be in any desired format such as a lossy compressed sound file, a non-lossy compressed sound file, or an uncompressed sound file. In other examples, the audio output processor device is arranged to provide playback of previously recorded sounds or user recorded sounds. The recorded sounds can be voice messages such as can be provided in character voices (e.g., cartoon characters), recordings of celebrities, or as impressions of recognizable voices. In some examples, the audio output processor can be combined in function with the audio input processor previously described.

Display circuits can also be used as an indication means for reporting visual information to a user of the MT device, as well as to provide navigation and location information. Example display circuits can provide any appropriate video output such as, for example: an LED type display, an LCD type display, an active display, a passive display, a black and white display, a monochromatic display, and/or a color display. Other example display circuits can be discrete arrangements of LEDs, seven segment displays, as well as other light emitting devices that can be used for reporting visual information. In some examples, the user interface can be integrated with the video output device such as, for example, a touch screen that is integrated with an LCD display. In other examples, the user input interface is separate from the video output device.

The processor in the MT of the present disclosure is arranged to cooperate with a compass sensor device or some similar means for determining a rotational position of the MT device. The compass sensor can be an integrated circuit, a discrete circuit, or some other device that is arranged to provide compass sensor information that is related to a directional orientation of the MT. The compass sensor can be a digital compass device or an analog compass device that is arranged to work with an analog-to-digital converter, for example, to provide a comparable function.

In some examples, distance can be reported with display circuit in an alphanumeric representation (e.g., 100, 100', 100 ft, 100 m, etc.). In other examples, distance can be reported in a graphical representation such as an icon, a line, or other graphical shapes. Similarly, direction can be reported in either an alphanumeric representation (e.g., N, S, E, W, NE, SE, NW, or SW) or in a graphical representation. Any combination of graphical and alphanumeric representations can also be made.

Various processing methods are employed to perform base-band processing and signal analysis in the MT, including a correlator block and a signal analyzer block. The correlator block may include an FFT correlator and a direct-form correlator. The signal analyzer is arranged to evaluate the outputs from the FFT correlator and/or the direct form correlator, to determine if the received transmission sequence is identified with the specific MT. When the sequence is appropriately identified, various timing signals are adjusted such that the frequency and phase of the digitally synthesized transmitter and receiver signal(s) are precisely aligned in the MT. Information from the coded signals is extracted by the processor once the transmission sequence is validated. Such information can include command and control instructions for the MT such as, for example, set sleep interval to a new time lapse (e.g., 10 minutes), log receiver signal strength, log invalid received signals, log receiver frequency and phase, transmit logged data, change to slow ping mode, change to fast ping mode, etc.

It is important to note that the processor in the MT of the present disclosure is arranged to apply mode control logic in response to signals that are received from the RL. The mode control logic an any related settings for the MT can be provided in any of the above described memory devices, or as hard-coded instructions in a micro-controller, to name a few. In another example, the processor and memory can be replaced with a PLD, a specially designed circuit such as an ASIC, as well as others devices that are arranged to provide similar functionality.

A reply message is transmitted from the MT to the RL such that the RL can identify, locate, and receive data from the MT. The reply message is generated with a reply sequence generator that is keyed from the unique identifier (ID Code), similar to the transmit sequence generator. A low pass filter (e.g., LPF2) can be placed between the sequence generator and the transmitter block in the MT. The transmitter block is coupled to antenna ANT2 via switch SW2 to cause the coded reply transmission (e.g., COM31, COM32).

Since an example MT operates with limited energy, the MT is normally operated in a low power or sleep mode. The energy consumed in the sleep mode is sufficient to operate a sleep timer that operates from a low frequency clock. According to a pre-determined time interval, the MT is activated (e.g., wakeup is asserted by the sleep timer) and the MT looks for a signal to receive while operating a high frequency clock. When no identifiable signal can be received, the MT returns to the sleep mode, where the high frequency clock is disabled. The high frequency clock can be enabled and disabled by a respective control signal (e.g., HF EN). The MT can also be activated by the user such as by pressing a user input button.

Bearing to the RL is determined by the cooperative operation of the RL and MT as will be described later. In general, the user initiates a search mode by activating the MT. A communication link is established with the RL, and the MT receives an initial distance calculation from the RL. The user subsequently initiates locate mode that requires at least a partial rotation of the MT through an arc relative to the user where additional distance measurements and correlator information are acquired by the RL. Information is communicated back to the MT such that the MT can determine the direction to the RL.

Various timing signals that are employed by the MT (or MT) are generated by a time control circuit as illustrated in FIG. 1B. The processor is operated from one clock signal (CLK2), while the transmitter and receiver in the MT are operated by other clock signals (TCLK2 and RCLK2). The various timing signals are used by the system to digitally synthesize transmitter and receiver carrier wave signals from a locally generated oscillator signal in the MT.

The time control circuit can include additional functionality to calibrate the high frequency clock with a calibration logic circuit. The calibration logic circuit can include any number of high frequency counters (HF CNTR), low frequency counters (LF CNTR), and digital comparator circuits (COMP), as well as other logic circuits such as registers, latches and related logic. In operation the calibration logic is enabled when a calibration signal (CAL) is asserted, such as in response to the processor when applying mode control logic.

The above described remote locator (RL) can be arranged to provide a relatively high power transmission signal (e.g., 1 Watt).

The transponder (MT) is arranged to synthesize its own internal frequency for transmitting an acknowledgement signal by using the timing information that it acquires from the RL. The timing information that is received from the RL by the MT is Doppler shifted relative to the original transmission frequencies from the RL. The resulting synthesized frequency of the MT, while extremely accurate, corresponds to a Doppler shifted version of the original transmission frequencies form the RL. The acknowledgment signal from the MT is received by the RL, but is again Doppler shifted relative to the transmitting frequencies from the MT. The Doppler shift that result from the round trip of the signal transmissions (i.e., transmission from the RL to the MT, and reply transmission from the MT to the RL) is hereinafter referred to as the synthetic round-trip Doppler Shift.

Example Transmitter

Figure 2:
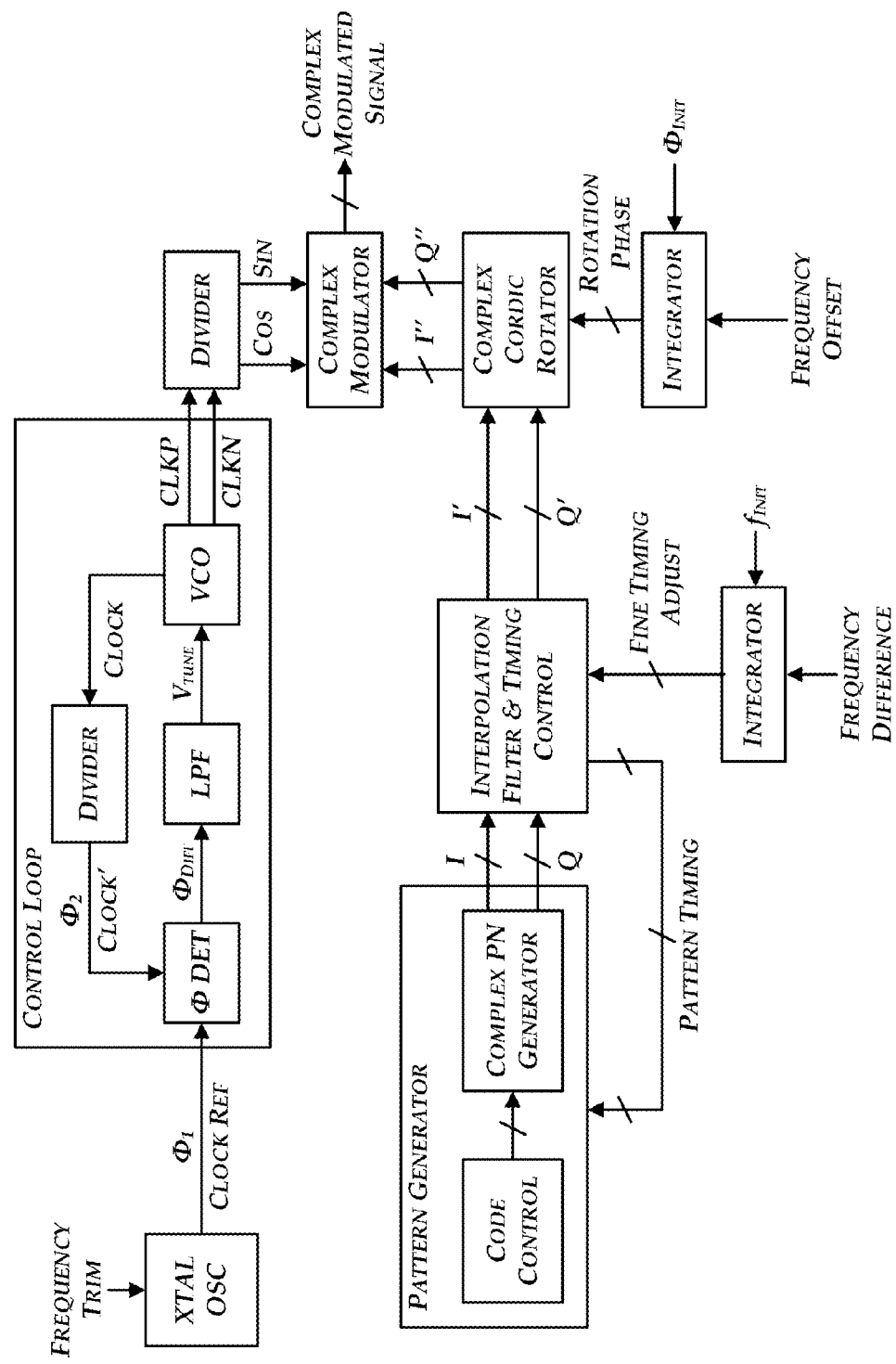
FIG. 2 illustrates an example transmitter.

FIG. 2 illustrates an example transmitter system. The transmitter system includes a crystal oscillator (XTAL OSC), a timing control circuit, a complex modulator, a pattern generator, an interpolation filter with timing control, integrators, and a complex cordic rotator.

The crystal oscillator is arranged to provide an oscillator signal as a clock signal (CLOCK) having a first phase ($\phi_1$) for the timing control circuit. In one example the crystal oscillator has a nominal frequency around 26.14 MHz, which can optionally be adjustable (e.g., via signal FREQ. TRIM). The oscillator can be a crystal-type oscillator, or any other oscillator that has a substantially stable oscillation frequency.

The timing control circuit includes a feedback control loop with an optional divider circuit that is arranged to synthesize a frequency. The control loop includes a phase detector, a low pass filter (LPF), a voltage controlled oscillator (VCO), and an optional divider circuit. The phase ($\phi_1$) of the reference clock signal (e.g., $CLOCK_{REF}$) is compared to a phase ($\phi_2$) from a feedback signal (e.g., CLOCK') by the phase detector to determine if the resulting clocks signal (CLOCK) is operating in phase with the reference clock ($CLOCK_{REF}$). The output of the phase detector corresponds to a phase difference signal ($\phi_{DIFF}$), which is provided to the low pass filter to generate a control voltage (VTUNE) for the VCO. The VCO adjusts the output frequency of clock signals CLKP and CLKN, which are out of phase with one another by 180 degrees. The feedback signal (CLOCK) is also provided from the VCO to the optional divider circuit. The output of the divider circuit is provided to the phase detector as signal CLOCK', which closes the control loop. Moreover, the VCO frequency can optionally be provided to another divider circuit, which generates synthesized frequencies that are associated with a sine and cosine function.

In one example, the VCO has a nominal output frequency of 1.83 GHz, the feedback loop divider circuit has a divide ratio of 70, and the phase detector is arranged to adjust the VTUNE signal via the low pass filter such that the average value of the 26.14 MHz signal is matched to 1.83 GHz/70. Other reference signals can be employed to yield the same result by adjusting the divider ratio in the control loop divider circuit. Moreover, the output of the VCO can be further adjusted by the output divider circuit (e.g., divide ratio of 2) to yield synthesized frequencies corresponding to SIN(915 MHz) and COS(915 MHZ) or any other desired frequency.

The pattern generator includes a code control block and a pseudo-noise generator block. The code control block is arranged to provide the pre-determined patterns, keyed from an ID Code, for "A", "B", and "C" sequenced patterns as will be described later. The pseudo-noise generator generates complex numbers (e.g., I and Q) from the codes based on the timing signals (pattern timing) for sequencing the pattern. In one example, the pseudo noise generator block is arranged to provide 2047 complex numbers. The complex sequence (I and Q) is provided to an interpolation filter and timing control block, which is arranged to adjust the fine timing associated with the I and Q signals, and provides I' and Q', which are associated with a complex interpolated baseband signal. An integrator circuit is used to integrate the difference between the transmitted and received frequencies to adjust the fine timing (fine timing adjust). The interpolator provides fine timing adjustment for the I and Q complex numbers (e.g., 8192/2047), and provides low-pass filtering for the transmitter. The integrator circuit can be initialized by an initialization parameter such as $f_{INIT}$ and/or $\phi_{INIT}$.

The interpolated complex baseband signals (I' and Q') are provided to the cordic rotator. The cordic rotator adjusts the rotational phase of the complex baseband signals (in the digital domain) in response to a phase adjustment signal (e.g., rotation phase). The phase adjustment signal is provided by another integrator that integrates the frequency offset. The integrator circuit can again be initialized by an initialization parameter such as $f_{INIT}$ and/or $\phi_{INIT}$. The output of the complex cordic rotator is a frequency shifted complex baseband signal (I" and Q"), where the frequency shifting is undertaken by the digital synthesis operations by the interpolation filter and the cordic rotator.

The complex modulator is arranged to receive the frequency shifted complex baseband signals (I" and Q"), and the sine and cosine timing signals to provide a modulated signal output. The modulated signal output can be provided to a power amplifier (not shown) that is coupled to an antenna for transmission of the modulated signal. The various timing control signals (e.g., clock frequency, clock phase, clock offset) are adjusted such that the rate, fine-timing, and phase of the modulated signal output has sufficient timing information embedded in the resulting signal.

The code control is based on a unique identifier (ID Code). In one example, the unique identifier is provided to a polynomial generator. In another example, the unique identifier is stored in a volatile memory. In yet another example, the unique identifier is stored in a non-volatile storage such as a flash memory device, a ROM, an EPROM, an EEPROM, a dip-switch, or some other means. In still another example, the pattern that was created with the ID code is stored in a memory device or a look-up table instead of the unique identifier.

Example Transmission Sequence

Figure 3:
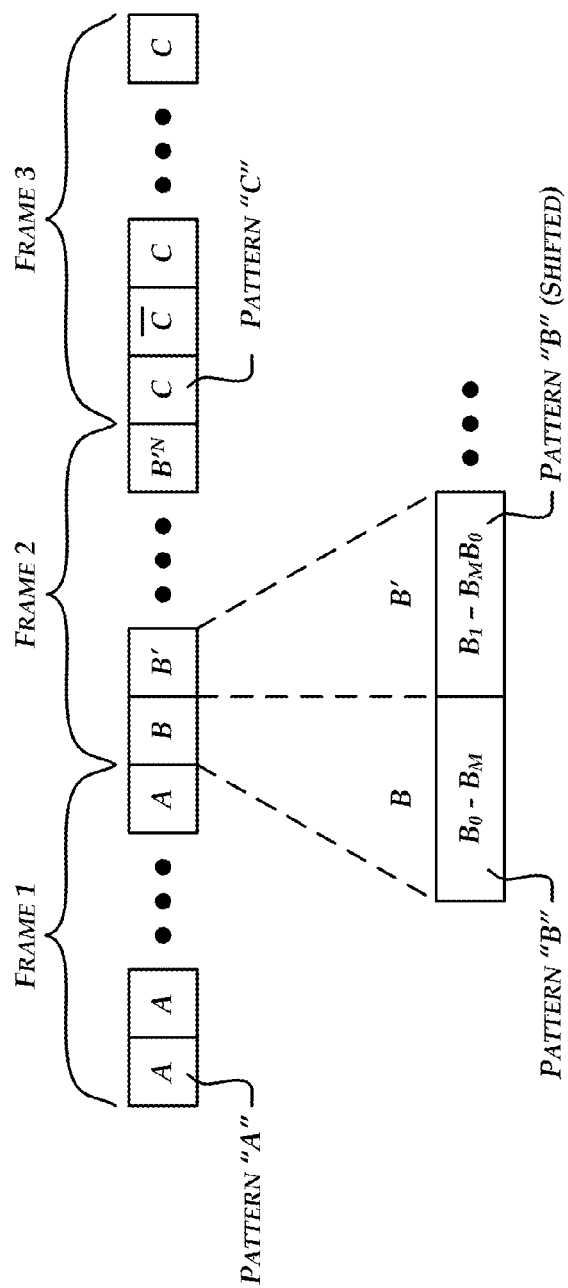
FIG. 3 is a diagram illustrating a set of frames formatted for transmission.

FIG. 3 is a diagram illustrating a set of frames formatted for transmission. A frame corresponds to a time-period for which a sequence is transmitted. For the example of FIG. 3, transmissions are broken into three sequential frames. During a first time-period, a first frame (i.e., "frame 1") is transmitted that consists of a first transmission sequence (i.e., "sequence A"). Sequence A consists of a repeated set of patterns that are in a sequential series, where each pattern (pattern A) is substantially identical. During a second time-period, a second frame (i.e., "frame 2") is transmitted that consists of a second transmission sequence (i.e., "sequence B"). Sequence B consists of a repeated set of patterns that are in a sequential series, where each subsequent pattern in the sequence is shifted as will be described later. During a third time-period, a third frame (i.e., "frame 3") is transmitted that consists of a third transmission sequence (i.e., "sequence C"). Sequence C consists of a repeated set of patterns, where each pattern (pattern "C") forms part of an encoded message as will be described later. The collection of the three sequential frames in a transmission is referred to as a PING as will be described later.

Each MT in the system has a unique identifier (e.g., an M-bit address) that is used to uniquely designate a specific MT. In one example, the unique identifier is a 33-bit address code that yields approximately 8.58 billion unique identifiers. The M-bit address can be dispersed over the various patterns. In one example, a 33 bit code is evenly dispersed over the three sequences such that 11-bits are coded in "sequence A", 11-bits are coded in "sequence B", and 11-bits are coded in "sequence C". In another example, the codes are not evenly dispersed over the transmission sequence. In still another example, the same code is used for each of the patterns. Each symbol that is transmitted is thus encoded according to the respective coding bits for the corresponding sequence portion. The terms "baud" and "chip" can also be used to refer to symbols.

The correlation of sequence "A" is used to verify that the first portion (e.g., the first 11-bits or bits 0-10) of the unique identifier is coded in the transmission. When a correlation is detected, fine baud and carrier timing can be derived. However, the MT has no prior timing information (e.g., no gross frame timing is known). Since the "A" pattern is repeated over the first-time interval, it is possible to accumulate the signals by adding them on top of one another before correlation is performed such that signal sensitivity is improved. In one example MT, the accumulation of signals is unnecessary. In another example MT, the accumulation of signals is performed during a repetitive tracking mode.

Once the "A" pattern has been acquired, the MT continues sampling to locate the "B" sequence. The correlation of sequence "B" is used to verify that the second portion (e.g., e.g., the second 11-bits or bits 11-21) of the unique identifier is coded in the transmission. As previously described, the "B" sequence is shifted over time. For example, a first B sequence includes coded bauds B0, B1, . . . , BM, while the second B sequence (B') includes coded bauds B1, B2, . . . , BM, B0. When correlation is achieved with the MT's "B" sequence, the MT identifies a stream position within the "B" sequence. Once the transmission stream position is determined from the shift pattern, the MT schedules the reception of sequence "C", whose arrival can now be predicted.

For the above described "B" sequencing example, a single baud shift is used between subsequent transmissions. Other shifting methods can be used such that the step size for shifting between subsequent transmissions can be a different integer number of baud shifts (e.g., 2, 3, 4, etc.) or a non-integer number of baud shifts (e.g., ½ baud, ¾ baud, 1½ baud, 2¼ baud, etc.) or a shift in samples of either an integer or non-integer variety. In another example, the shifting mechanisms between subsequent transmission can be replaced by a carrier phase rotation, where each subsequent transmission has the carrier phase rotated by a fixed amount.

Frame "C" has a third portion of the unique identifier encoded therein, and possible command and control data for the MT (or other data for the RL). The correlation of sequence "C" is used to verify the third portion (e.g., the third 11-bits or bits 22-33) of the unique identifier is coded in the transmission. The "C" sequence can also be very slowly modulated with a few bits of data. For example, up to 63 bits of data and error correction code (ECC) can be transferred in sequence "C". In one example, the chips or transmit symbols are encoded by inverting or not-inverting patterns of "C" in the transmission frame. Examples of coded command and control information were previously described above.

For the above described "C" sequence, data is encoded using an inverting and non-inverting encoding method. Other data encoding methods can be used such as encoding the data with a shifting bit pattern similar to the "B" sequence. For example, a "000" binary code can be encoded, and each increment in the binary code is the same pattern shifted by an incremental shift step (e.g., ½ baud step, 1 baud step, 2 baud step, etc.). The data message nominally in "C" can be encoded with a pattern timing changes as in the nominal section "B" previously described.

The MT transmits sequences A and B in substantially the same format as that described above. However, since the RL initiated the transmission and does not have a "wake-up" period creating an ambiguity in when reception begins, the transmission sequence from the MT can be shorter overall. The shortened transmission period helps minimize the MT's energy consumption. Frame "C" is similarly formatted, but may include other reported data such as: current temperature, heart rate, blood pressure, etc.

The timing and carrier signals for transmission in the MT are derived from the RL's clock as measured against the internal MT clock. The RL in turn correlates these signals, similar to the MT, and determines the exact round-trip time. The RL also determines deviations in the signal timing with respect to its own clock, which the MT attempted to mimic. The deviation in the signal timing is a consequence of Doppler shift, noise, and oscillator instability.

An example system has the following general information for a full non-hollowed transmission:
Received Frame consists of 4096 samples, 2047 baud;
Received Sample Rate is 25.777M complex samples/sec;
Transmitted Sample Rate is 2*25.777M complex samples/sec;
Baud Rate is determined by Sample Rate*(2047/2048)/2=12.8822 Mbaud symbols/sec, QPSK; and
Frame Period is 158.98 µs.

An example system has the following RL TX parameters for a full non-hollowed transmission:
"A" sequence is 2.2263 seconds long, (13×1024 frames), repeated un-shifted with one of 2047 first address portions;
"B" sequence is 317.96 ms long (2000 frames), repeated shifted with one of 2047 second address portions; and
"C" sequence is 10.174 ms long (64 frames), repeated un-shifted with one of 2047 third address portions, frames inverted according to modulated data.

An example system has the following MT TX parameters for a full non-hollowed transmission:
"A" sequence is 81.397 ms long, (512 frames);
"B" sequence is 20.349 ms long (128 frames); and
"C" sequence is 10.174 ms long (64 frames), repeated un-shifted with one of 2047 third address portions, frames inverted according to modulated data.

Example Timing Acquisition Sequence

Figure 4A:
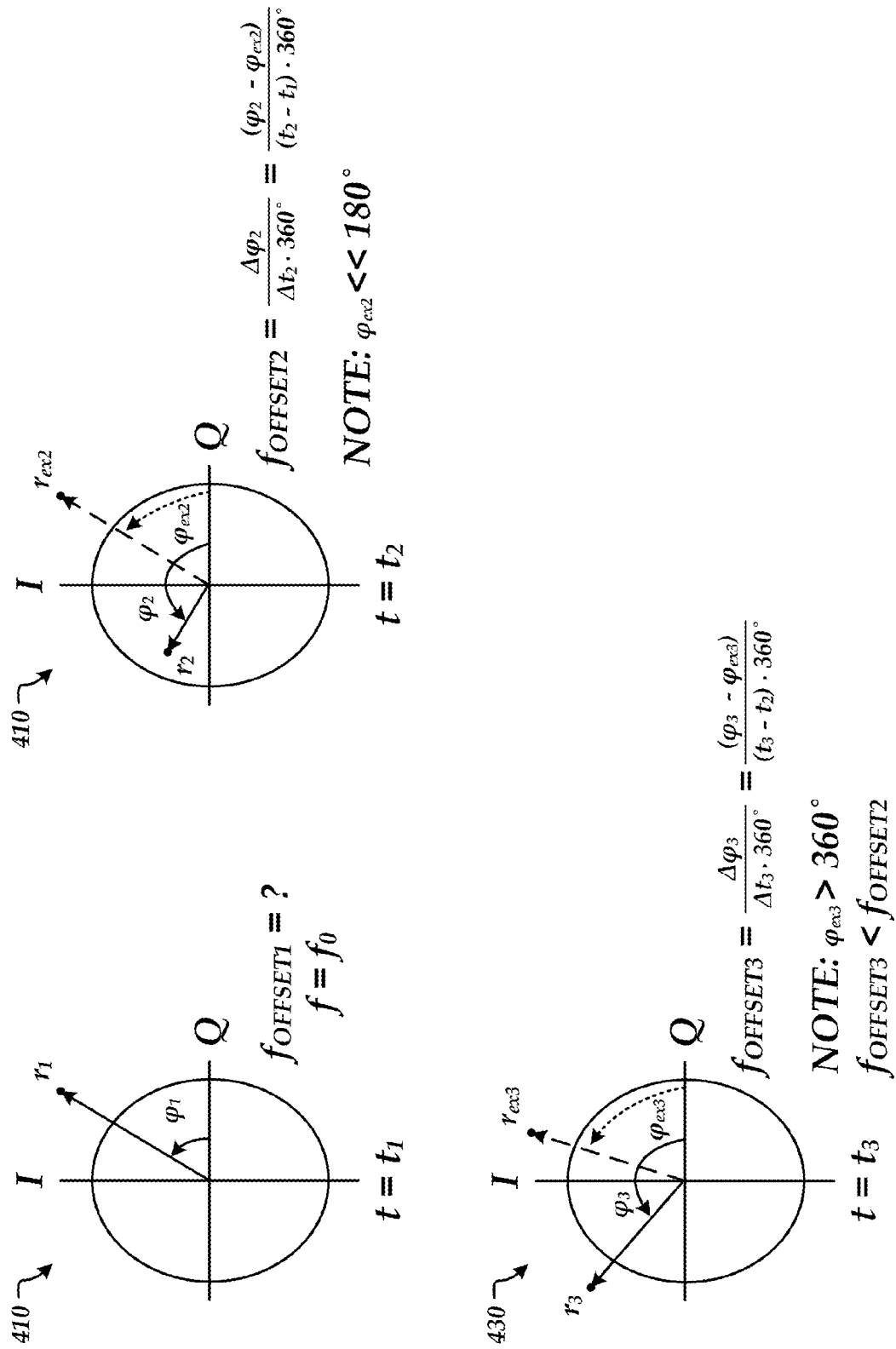
FIGS. 4A and 4B are diagrams illustrating the timing acquisition for an example communication system.
Figure 4B:
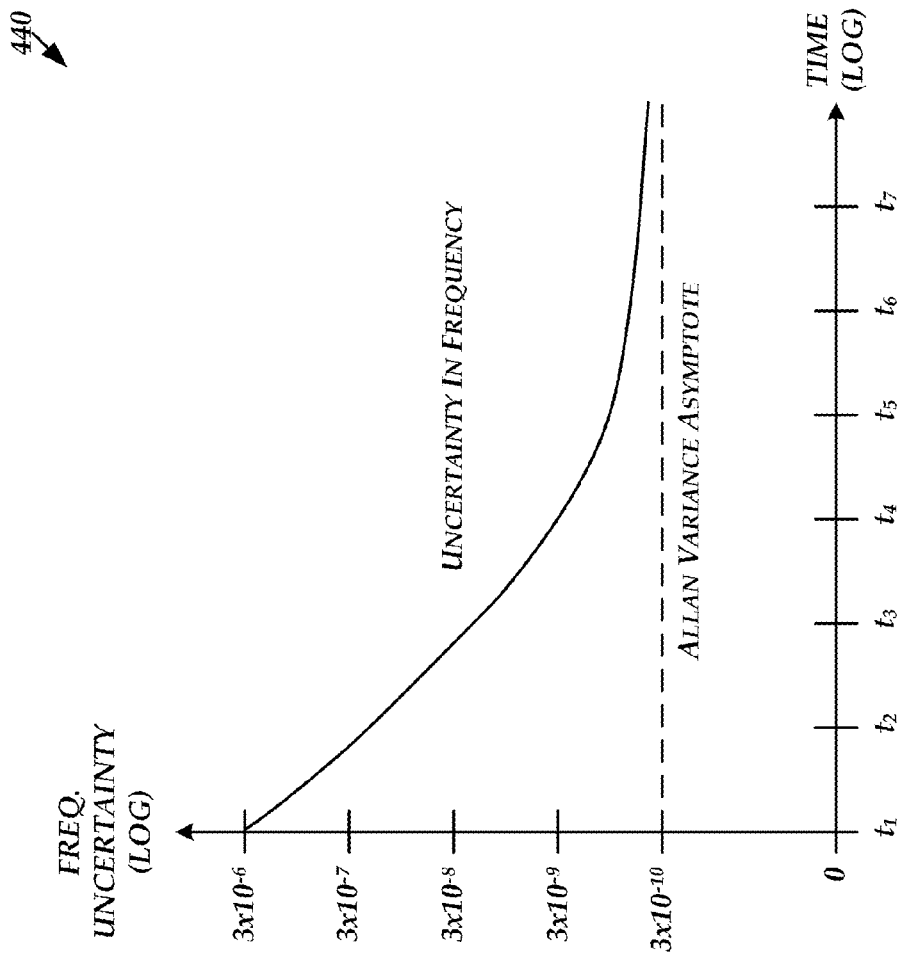

FIGS. 4A and 4B are diagrams illustrating the timing acquisition for an example communication system. The described timing acquisition sequence may be employed by the MT when receiving the three-part transmission sequence described previously with respect to FIGS. 1A, 1B, 2 and 3. However, as described herein, the timing acquisition sequence can be accomplished with only two of the three portions of the transmission sequence (e.g., sequence A and sequence B).

The receiver frequency is digitally synthesized from a locally generated clock circuit (e.g., a crystal oscillator). The carrier wave from the RL is also digitally synthesized from its own locally generated clocking circuits, and will likely be mismatched from the receiver frequency in the MT. The mismatch may be related to thermal differences in the operating environment, heat transients in the circuits, crystal tolerances, processing differences between the MT and the RL, as well as other non-ideal effects. Moreover, the overall system is not synchronized so there is no way to initially know the starting phase, frequency and cadence associated with the transmissions. FIG. 4A illustrates examples of phase and frequency determinations associated with an example "pattern A" sequence, while FIG. 4B illustrates the uncertainty in the receiver frequency over time during the timing acquisition.

The receiver portion of the communication system is initialized at time $t_1$ to an initial frequency (f) that is designated as $f=f_0$. However, the offset between the digitally synthesized receiver frequency and the carrier frequency from the received transmission is unknown at time $t=t_1$. The MT is arranged to measure the phase associated with the received signals from pattern A as phase $\phi_1$. The phase measurement (e.g., $\phi_1$) can be generated by an output of the correlator.

At time $t=t_2$, another portion of the transmission of pattern A is received, and the MT is arranged to measure the phase as $\phi_2$, and calculate a frequency offset error associated with the difference between the expected receiver frequency and the actual carrier wave from the RL's transmission. The frequency offset ($f_{offset2}$) is determined by the difference in the phases and the elapsed time between transmissions as: $f_{offset2}=[\phi_2-\phi_{ex2}]/[360(t_2-t_1)]$, where $\phi_{ex2}$ corresponds to the expected phase at time $t_2$. It is important to note that the time between the first two measurements should be short enough to result in an expected relative phase difference of substantially less than 180 degrees to ensure that unresolvable ambiguities do not occur. The expected phase is based on a reception interval for an integer period of frames that is reasonable based on expected transmission/reception time intervals. Notice that the expected phase for this time corresponds to $\phi_1$.

At time $t=t_3$, another portion of the transmission of pattern A is received, and the MT is arranged to measure the phase as $\phi_3$, and calculate a frequency offset error associated with the difference between the expected receiver frequency and the actual carrier wave from the RL's transmission. The frequency offset ($f_{offset3}$) is determined by the difference in the phases and the elapsed time between transmissions as: $f_{offset2}=[\phi_3-\phi_{ex3}]/[360(t_3-t_2)]$, where $\phi_{ex3}$ corresponds to the expected phase at time $t_3$. The expected phase is again based on a reception interval for an integer period of frames that is reasonable based on expected transmission/reception time intervals. It is important to note that the elapsed time for the first two measurements should again result in an expected relative phase difference of substantially less than 180 degrees to ensure that unresolveable ambiguities do not occur. However, the absolute phase difference is expected to be significantly larger than 360 degrees such that the time difference between successive offset calculations can be gradually spaced further and further apart as the timing acquisition is adjusted by each subsequent estimate. Notice that the frequency error is gradually reduced with each subsequent adjustment until limited by the Allan Variance.

FIG. 4B is a graph illustrating the uncertainty in the digitally synthesized receiver frequency over an elapsed timing acquisition period. Note that the scale for both axes is logarithmic, and that the uncertainty will asymptotically approach the Allan Variance associated with the crystal oscillators in the MT and the RL. The horizontal axis illustrates elapsed time, while the vertical axis illustrates the uncertainty in the frequency. Each successive time period has a refined estimate of the receiver timing such that the uncertainty decreases in an exponential fashion. A knee in the uncertainty curve occurs after sufficient samples of the received signal are acquired (e.g., at time $t_5$) such that estimates for the received carrier wave frequency asymptotically approach a minimum uncertainty that is determined by the Allan variance.

Example Receiver

Figure 5A:
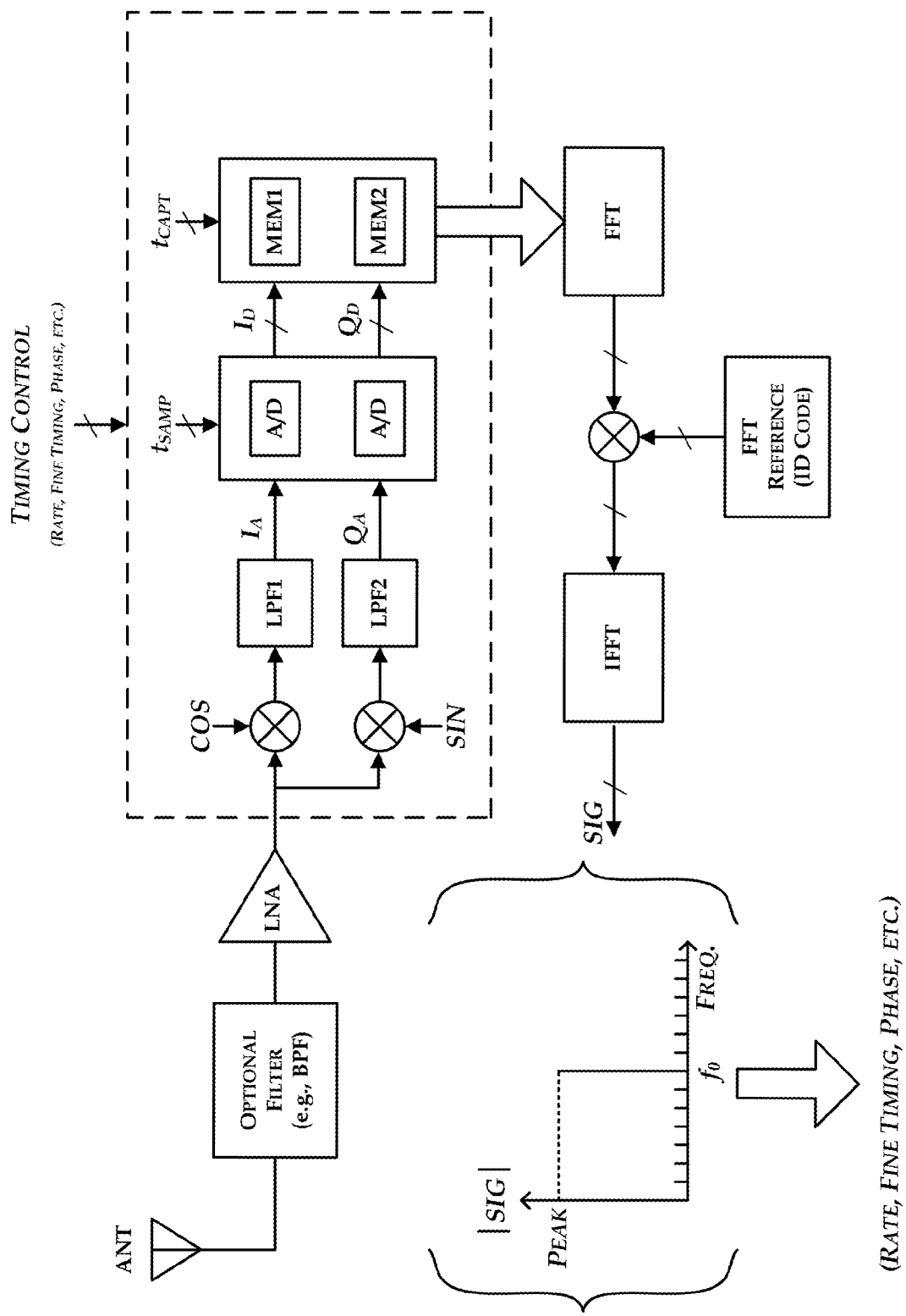
FIGS. 5A-5B are example diagrams for example receivers.

FIG. 5A is a block diagram for an example receiver. The example receiver includes an antenna (ANT), an optional filter, a low noise amplifier (LNA), a first mixer, a second mixer, a first low pass filter (LPF1), a second low pass filter (LPF2), an analog-to-digital converter (ADC), a buffer, an FFT processor, a correlator, and an inverse FFT processor. Other example receivers can use an analog storage method with delayed use of the ADC.

The antenna is arranged to couple received signals to the LNA through the optional filter (e.g., a band-pass filter). The LNA is arranged to increase signal strength, and couple the increased signal to the mixers. The first mixer is arranged to generate an in-phase signal (I) with a cosine wave heterodyne, while the second mixer is arranged to generate quadrature signal (Q) with a sine wave heterodyne. The in-phase signal is coupled to the ADC via LPF1 as signal $I_A$, while the quadrature-phase signal is coupled to the ADC via LPF2 as signal $Q_A$.

The ADC is operated at a sampling frequency ($f_{SAM}$). The ADC can be implemented as a single A/D converter circuit with time division multiplexing between the $I_A$ and $Q_A$ signals. The ADC can alternatively be implemented as two separate A/D converter circuits. The ADC circuits convert the $I_A$ and $Q_A$ signals to quantized digital signals that are coupled to the buffer as signals $I_D$ and $Q_D$, respectively. The buffer can be implemented as one contiguous memory, as partitioned memory (e.g., MEM1, MEM2, etc.), or any other appropriate temporary storage that buffers the captured data.

The output of the buffer is coupled to the FFT processor, which converts the input signal (e.g., the captured data that corresponds to the previously captured samples) to the frequency domain. The FFT of the reference signal (or reference sequence) is complex conjugate multiplied with the frequency domain representation of the captured signal. An inverse FFT of the product is taken, which is the circular correlation of the captured signal and the selected reference signal. Since the FFT reference is determined from the unique identifier of a MT (e.g., ID Code), the correlation of the FFT processor output will peak when a valid received code is identified in the signal. The carrier phase and pattern timing are also extracted from the received signals.

Figure 5B:
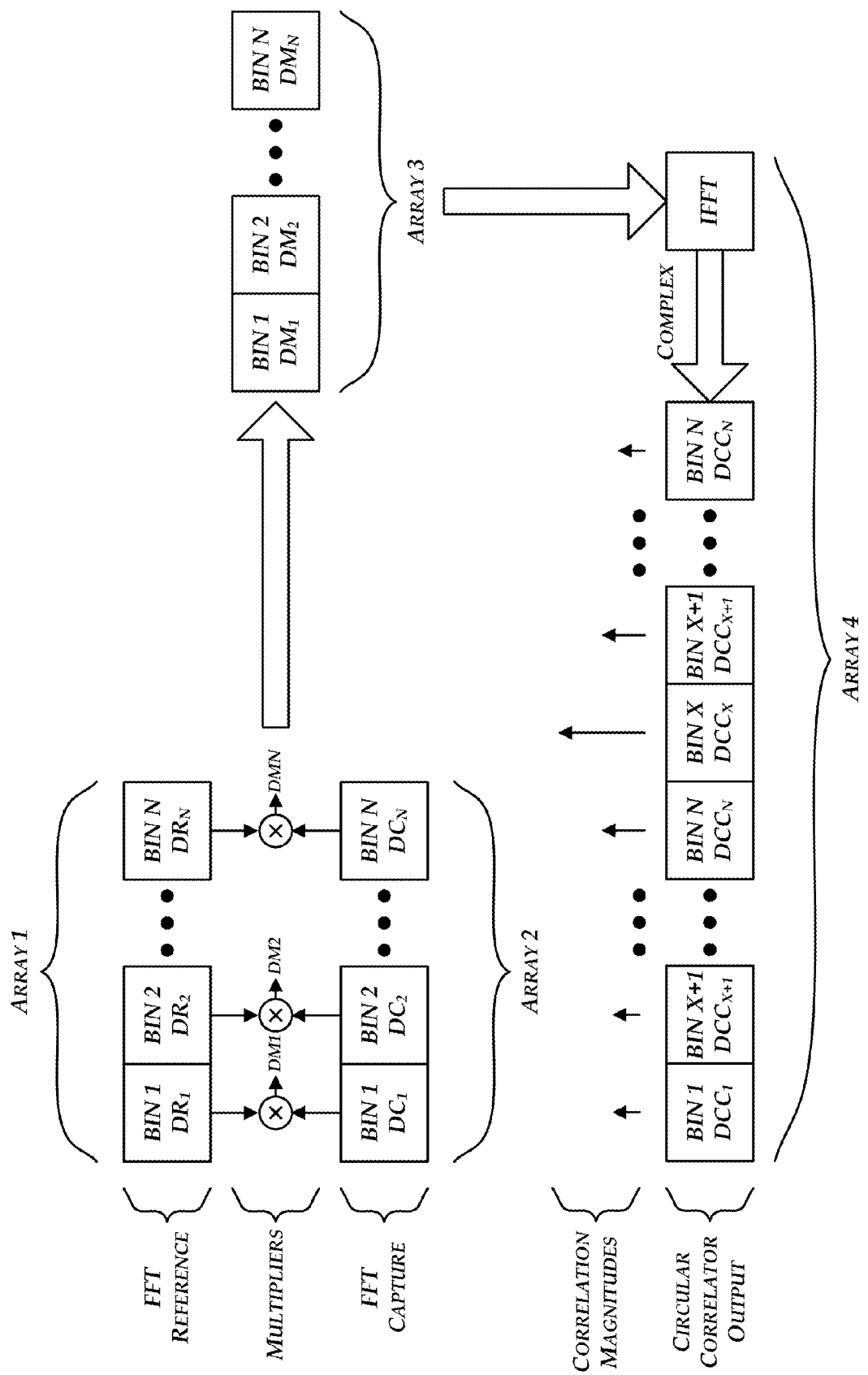

FIG. 5B illustrates operations in a receiver that may be performed as a DSP block. The FFT reference signal is provided as an array of N-bins. The captured signal is calculated as an FFT, also of N bins. Next, the complex conjugate of each complex element in a designated storage bin (BIN 1-BIN N) is multiplied by the data from the other corresponding storage bin. For example, the complex conjugate of the FFT reference signal is stored in a first array (ARRAY 1) as $D_{R1}$-$D_{RN}$, and the FFT capture data is stored in a second array (ARRAY 2) as $D_{C1}$-$D_{CN}$. In another example, the FFT reference signal is stored in the first array (ARRAY 1) as $D_{R1}$-$D_{RN}$, and the complex conjugate of the FFT capture data is stored in the second array (ARRAY 2) as $D_{C1}$-$D_{CN}$.

The multipliers are arranged to receive data from the first array and the second array to provide a multiplied output, yielding a product result that can be stored in a third array (ARRAY 3) as $D_{M1}$-$D_{MN}$. An inverse FFT is computed from the product identified in the third array (ARRAY 3), to retrieve the circular correlator output. The circular correlator output results can be stored in a fourth array (ARRAY 4), or can optionally overwrite the values from the third array (ARRAY 3). The contents of the fourth array (ARRAY 4), or the third array depending on the implementation, are a complex result that includes both magnitudes and phases. As illustrated in FIG. 5B, the inverse FFT of the circular correlator output has a peak magnitude (PEAK) that occurs when the FFT reference and the captured data correlate with one another. Each bin (BIN1-BIN N) of the third array (ARRAY 3), or fourth array depending on the implementation, corresponds to the output of the correlator, wherein a PEAK may be located in one of the bins (e.g., BINX), when a correlation occurs.

Example Operational Flow

Figure 6:
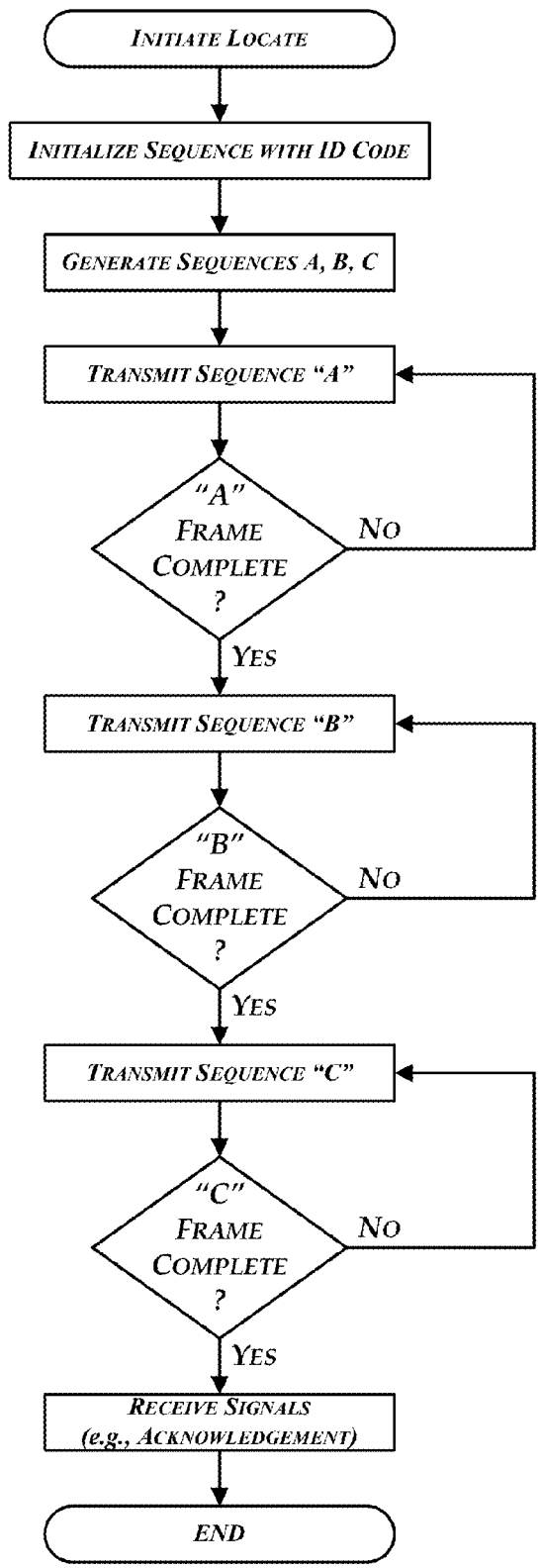
FIG. 6 is a flow-chart for an example transmitter.

FIG. 6 is a flow chart for an example transmitter in either a MT or a RL. Processing begins when a user, or some other process, initiates a request to locate a particular MT.

A transmission sequence is initialized with a unique identifier (ID Code). Sequences are generated for frame transmission such as sequence "A", "B", and "C" as previously described. Each of the "A", "B", and "C" sequences consists of bauds that are encoded with a portion of the unique code.

Next, the RL (or MT) then begins transmitting pattern "A", and repeats transmitting pattern "A" (Note: un-shifted) until the entire "A" sequence is completed (e.g., 13×1024 sequential patterns, or frame "A"), or the equivalent time has expired for transmitting the pattern "A" frame in the case of hollowed frames. The RL then begins transmitting pattern "B". For each subsequent transmission of pattern "B", the pattern is shifted such as using a bit rotation algorithm, as previously described. After the entire sequence of "B" patterns is transmitted (e.g., 2000 sequential patterns, or frame "B"), or the equivalent time has expired for transmitting the pattern "B" frame in the case of hollowed frames, the RL begins transmitting the "C" pattern. The sequence of "C" patterns includes modulated data that may correspond to command and control information for the MT. After the modulated data is transmitted (e.g., 64 sequential pattern, or frame "C"), or the equivalent time has expired for transmitting the pattern "A" frame in the case of hollowed frames, the RL stops transmitting and switches into a receive mode.

In the receive mode, signals are received from the MT with the RL in a similar format as provided between the RL and the MT. The RL can then calculate a distance and location based on the round-trip time and Doppler shift in the received signals as previously described. Moreover, the received "C" frame transmission may include data that is communicated between the MT and the RL, which is extracted and evaluated by the RL. Such data may include: physiological information such as heart rate, body temperature, blood pressure, heart rhythm, blood-sugar level, as well as other sensory information that is associated with a user of the MT.

Figure 7A:
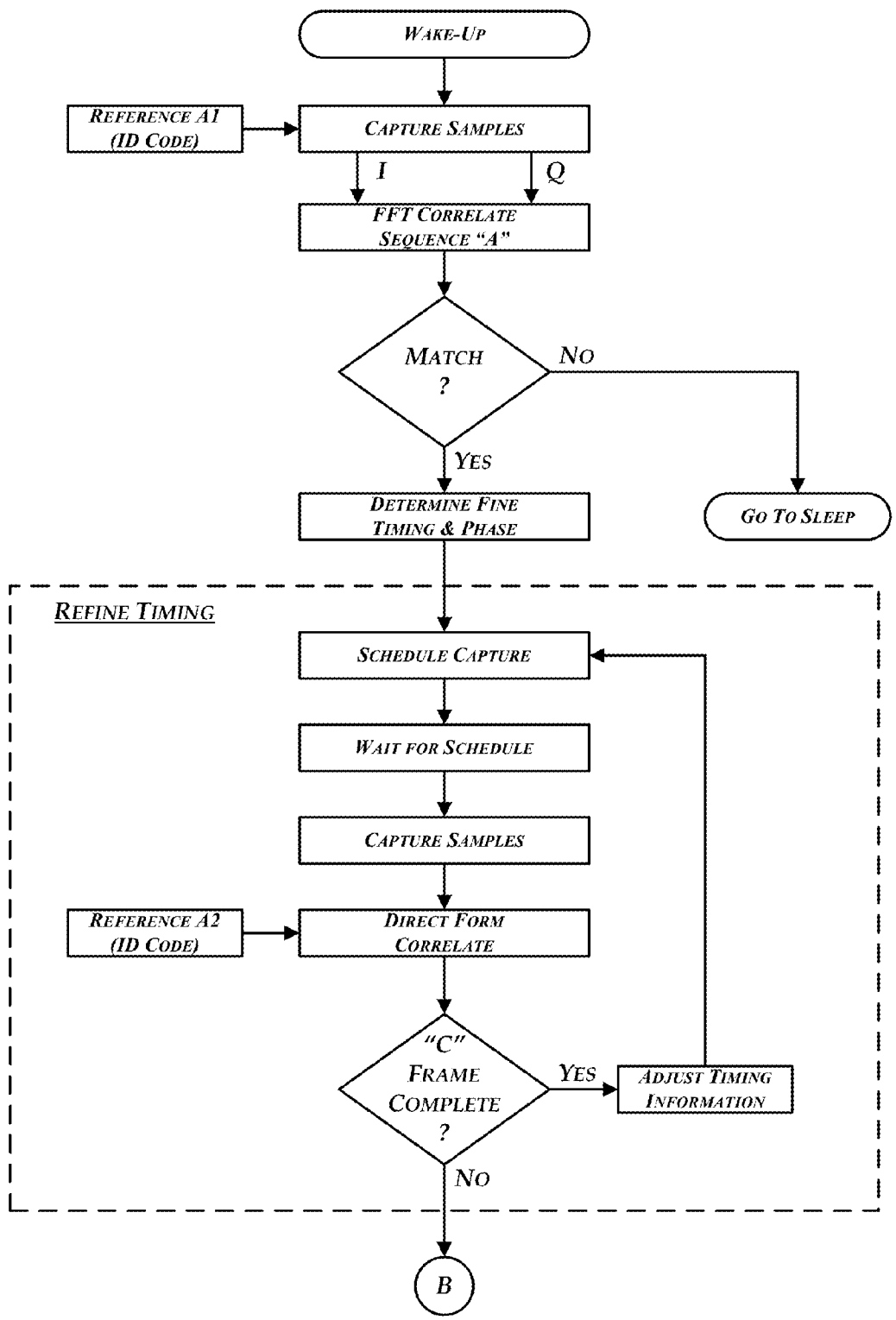
FIGS. 7A-7B, 8A-8B, and 9 are flow-charts for example receivers.

FIG. 7A is an example flow chart for an example receiver in a MT. Processing begins when the MT is activated out of a sleep mode (e.g., WAKE-UP is initiated). FIG. 7A illustrates the capture of samples associated with sequence "A" (or frame "A"). After wake-up is initiated, the receiver captures noise and/or signals. The MT will attempt to correlate the captured noise and/or signals with an expected transmission sequence that is encoded with the first portion of the unique identifier for the specific MT. When the correlation fails to match, the MT determines that the transmission is intended for another device, or possibly that no transmission is present, and returns to a sleep mode. Alternatively, the MT extracts baud and carrier timing information from the transmission sequence to refine the receiver timings.

Timing is refined by repeatedly scheduling capture intervals. The receiver waits, and then begins capturing a portion of the samples from each scheduled capture time, and attempts to correlate the captured samples with an expected transmission sequence that is encoded with another portion of the reference that is keyed to the code for the MT. Each time the correlation indicates a match, the timing for the receiver is adjusted (bootstrapped) to further refine the time/frequency estimates. Eventually, the correlation of pattern A fails to match the coded reference and processing continues to capture and evaluate pattern B as will be described with respect to FIG. 8A.

Figure 7B:
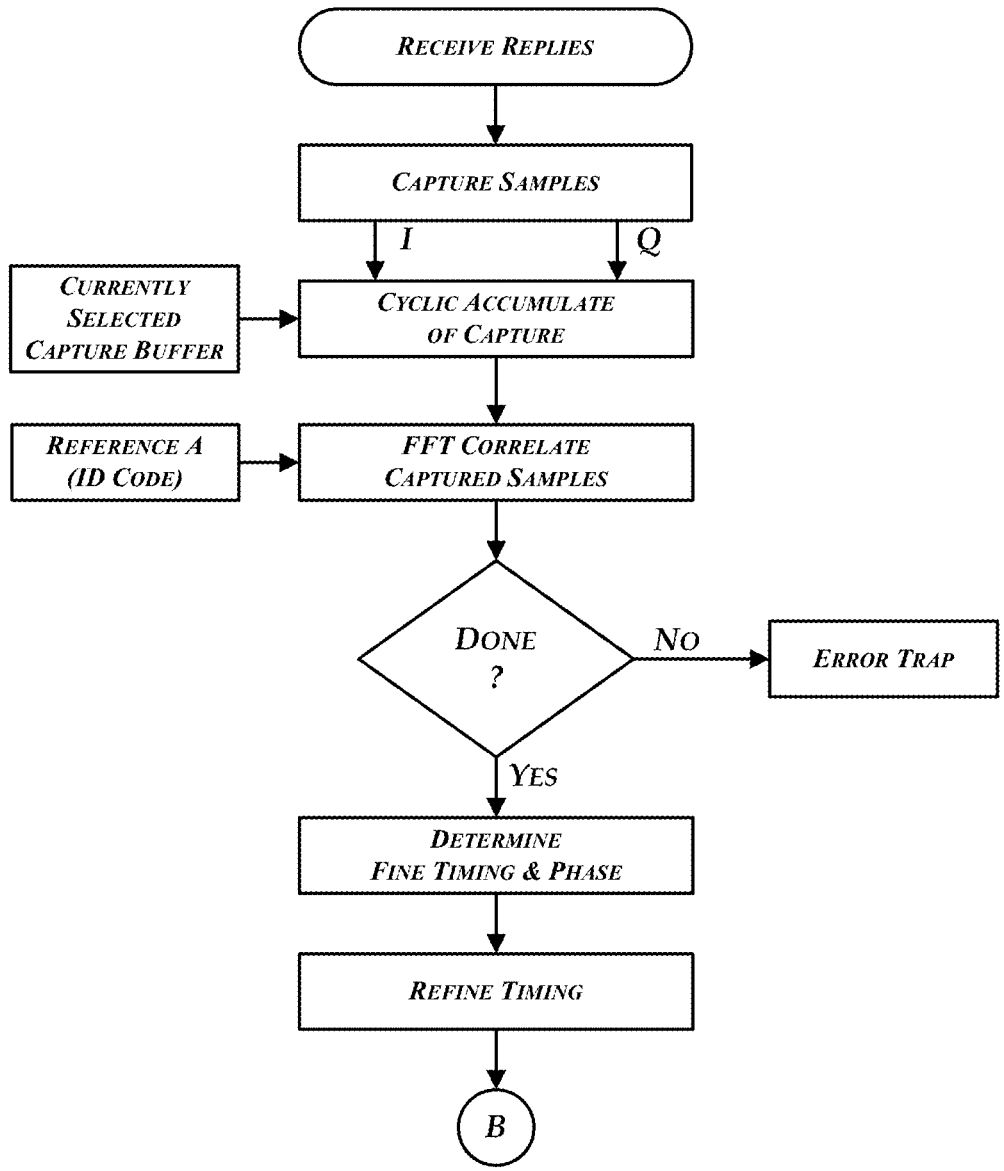

FIG. 7B illustrates the capture of samples associated with sequence "A" (or frame "A") in a receiver of an example RL device. Since the MT has limited power available for transmission, the signal may be considerably weaker than that from the RL. After wake-up is initiated by the RL, the receiver captures noise and/or signals. The RL will continue to capture the transmission for a predetermined time interval and accumulate values using a cyclic accumulation capture technique (e.g., an array of capture buffers that are cyclically selected in sequence). For each subsequent capture, the selected capture buffer is changed based on the time. Also, an accelerometer is used to measure the speed of the RL device for estimating time for reception, etc.

After the predetermined time interval expires, the RL attempts to FFT correlate the accumulated/captured signals and noise with an expected first transmission that is encoded with the first portion of the unique identifier for the specific RL. The accumulation of the captured patterns over the sequence using the described cyclic accumulation improves the signal levels and minimizes the impact of noise on the reception. When the correlation fails to identify a match, the RL determines that the transmission is intended for another device, that no transmission is present, or that an error has occurred, and returns to a sleep mode. Alternatively, the RL fine timing and phase information from the transmission sequence is used to refine the receiver timings for the RL. Processing then continues to capture and evaluate pattern B as will be described with respect to FIG. 8B.

Figure 8A:
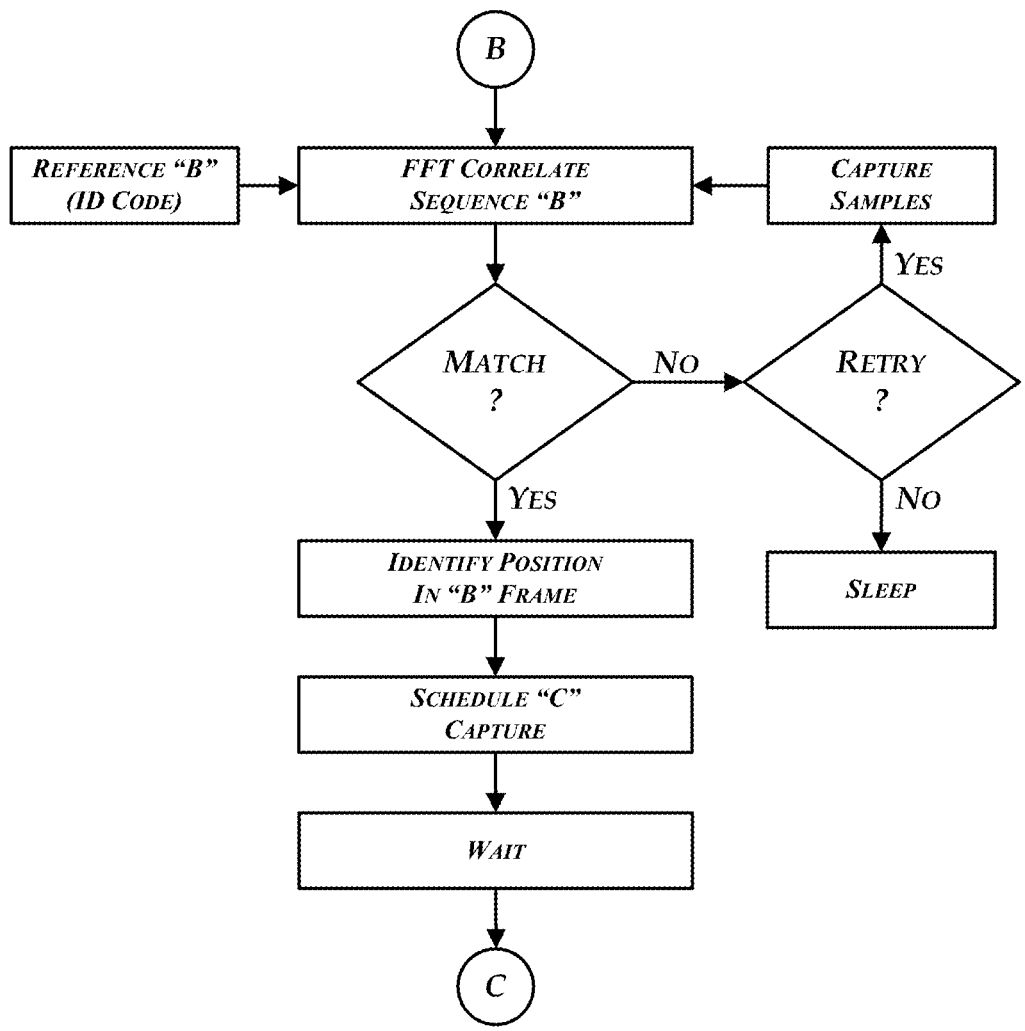

FIG. 8A illustrates the capture of samples associated with pattern "B" in a MT device. The receiver captures a sequence of samples, assuming those samples correspond to sequence "B". The MT will attempt to FFT correlate the captured samples with an expected second transmission that is encoded with the second portion of the unique identifier for the specific MT. When the correlation fails to identify a match, the MT may determine that the signal sequence is intended for another device. During a processing time interval, the expected B sequence is shifted and captured, and FFT correlation determinations then follow. When the processing time interval completes without a match of sequence "B", the MT determines that the transmission is intended for another MT or that there is no transmission to receive and returns to a sleep mode. Alternatively, if the MT finds a match for sequence "B", then the MT determines the relative position of the matched pattern within the sequence (or within the frame) based on the shift position that yields a match. Since the timing, phase, and frequency information are now known, the MT schedules reception of the "C" sequence. Processing continues for the MT in FIG. 9, which follows further below.

Figure 8B:
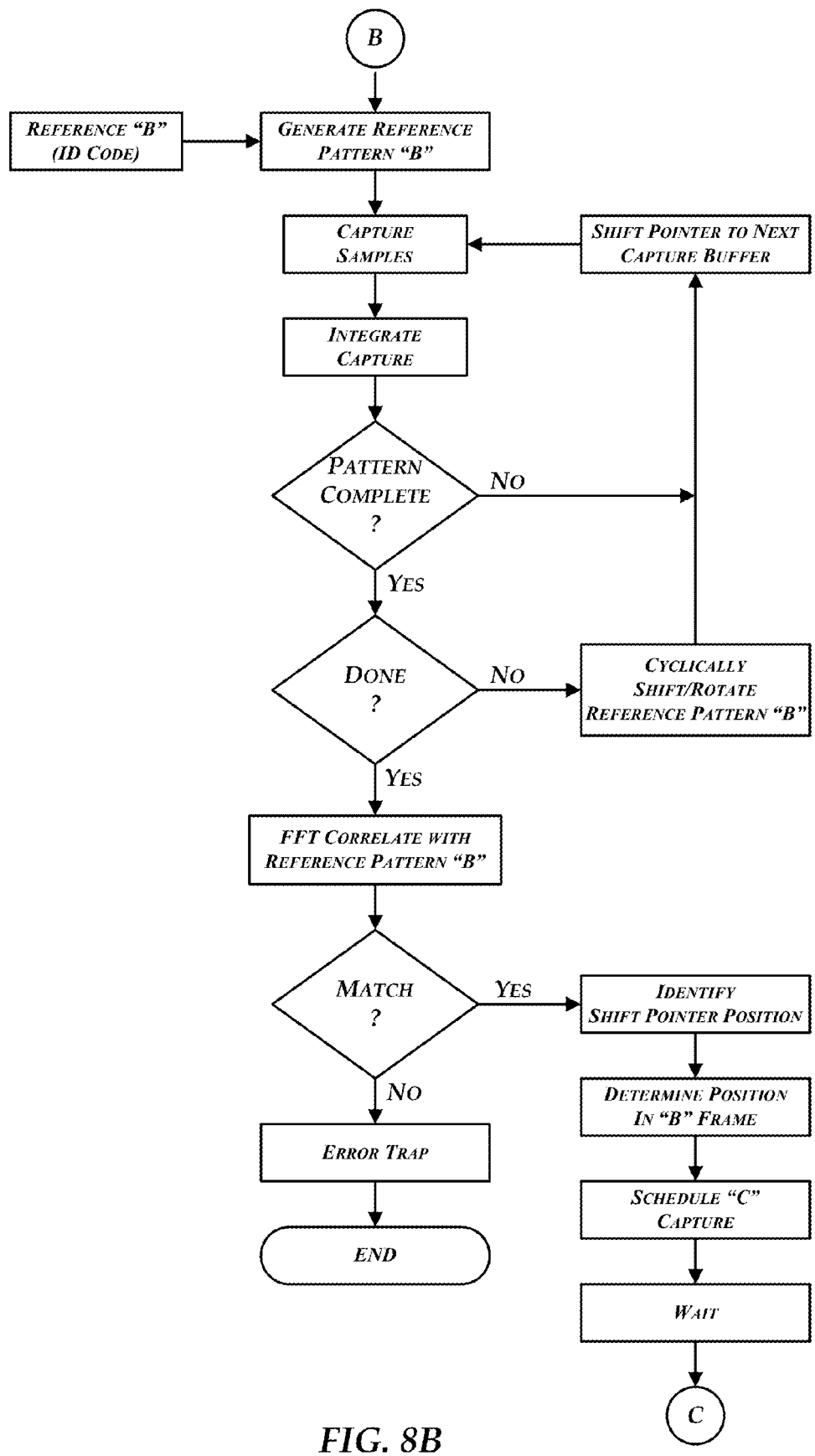

FIG. 8B illustrates the capture of samples associated with pattern "B" in a RL device. The receiver captures a sequence of complex samples (e.g., 4096 complex samples), assuming those samples correspond to sequence "B" using a cyclic accumulation/integration technique that is similar to that previously described for FIG. 7B. A reference pattern associated with pattern "B" is generated. Each received sample is captured and placed in a respective one of a series of buffers, where each buffer has an associated index such as a pointer. Each subsequently captured sample is placed in a different capture buffer (e.g., a capacitive storage cell).

As previously described with respect to the MT, sequence "B" is transmitted multiple times for receipt by the RL, where each subsequent "B" sequence is cyclically rotated with respect to the preceding sequence (e.g., see FIG. 3). As time moves forward a different capture buffer is used as the starting point for capturing a sequence by the RL. For example, assuming 4096 complex sample pattern with a starting pointer to capture buffer 0, captures will be placed in buffers 0-4095 sequentially followed by capture buffer 0. Each buffer can be an analog storage cell so that samples from the first pattern are accumulated with the samples from the second pattern using the described method. After numerous accumulations of additional patters, integration is completed and the accumulated signal can be evaluated.

After all of the samples for a pattern sequence "B" (e.g., 4096 complex samples from a sequence of pattern "B") are received (i.e., "pattern complete") and accumulated, the RL will attempt to FFT correlate the integrated captured sequence with the previously generated pattern for pattern "B". When the FFT correlation fails to identify a match, the RL falls into an error trap. Processing a received sequence may expire without match when the transmission is intended for another MT, or perhaps when an error has occurred. An error trap handles the remaining processing when an error occurs.

When the RL finds a correlation match for the generated pattern "B" (or any subsequently rotated version thereof), the RL can then determine the relative position of the matched pattern within the sequence (or within the frame) based on the shift position in the pattern that yields a match. Since the timing, phase, and frequency information are now known, the RL schedules to receive the "C" sequence. Processing continues for the RL in FIG. 9, which follows below.

In some examples systems the "B" sequence is sampled at four times the transmitter sequence rate, with each sequence step being four samples. For this example, the receiver samples at half the transmit rate so that each shift in the pattern corresponds to two buffer locations. In other words, the starting point for each "B" sequence capture for this example always corresponds to an even numbered buffer (e.g., 0, 2, 4, . . . ). The RL can then determine the relative position of the matched pattern within the sequence or frame by evaluating the starting point index to the buffer or sample bin that matches or correlates to the expected pattern.

Figure 9:
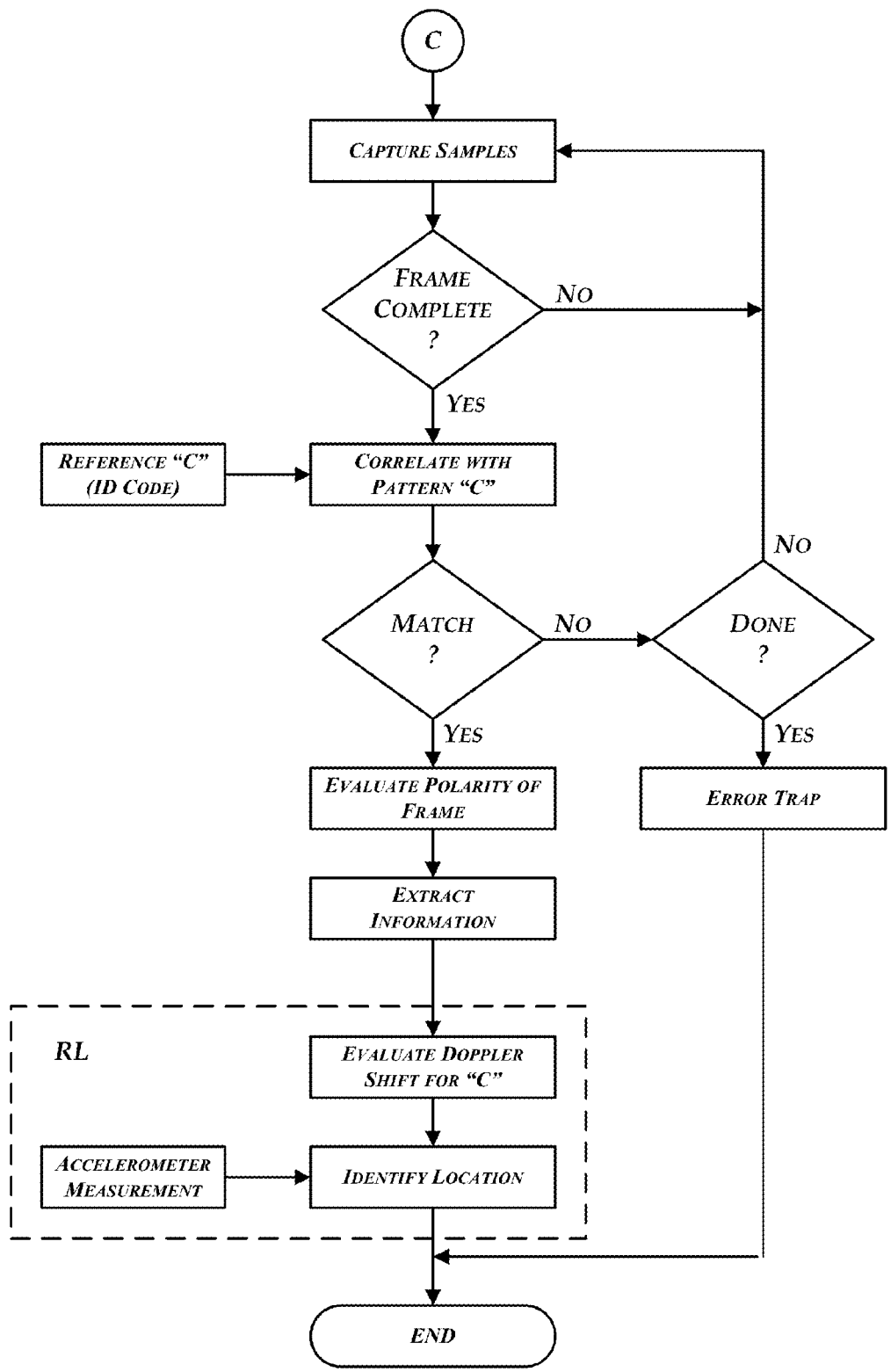

FIG. 9 illustrates the capture of samples associated with sequence "C". The receiver captures samples from the receiver in the MT, assuming those symbols correspond to pattern "C". The MT will continue to capture samples until the frame is expected to reach completion. The MT will then attempt to correlate the captured sequence (assuming it is sequence "C" from the RL) with an expected third transmission that is encoded with the third portion of the unique identifier for the specific MT. When the correlation fails to achieve a sufficient level for detecting a match, we can assume as a formality that the transmission of the "C" sequence has failed for any number of reasons (excessive noise in the environment, a high strength interfering signal, etc.) Since we know precisely when transmission of sequence "C" should occur, and what carrier frequency, phase, timing, and cadence for which transmission should occur, the receipt of the "C" pattern can be used formalistically for verification of a valid transmission.

Sequence "C" includes data modulated therein that may be coded with error correcting codes (ECC), where the coded information can be phase modulated and subsequently demodulated and decoded. When the time-period has not expired, capturing of the expected C sequence is resumed, followed by correlation determinations again. When the time-period has expired without a match of sequence "C", the MT determines that the transmission is intended for another and traps an error condition appropriately. Alternatively, the MT finds a match for pattern "C" and evaluates the polarities of the symbols received in this frame, and extracts command and control information from the "C" sequence.

In the case of the MT, the completed capture of sequence C is followed by a transmission of sequences "A", "B", and "C2" (or some other order, perhaps, or even a different set of A'B'C'. Sequences "A" and "B" include a similar pattern as previously described for the RL, although shorter in length. Sequence "C2" is still the same number of frames except that data is encoded into the transmission for communication between the MT and the RL.

In the case of the RL, the completed capture of sequence C is followed by evaluation of the round-trip time to determine linear distance from the RL to the MT. A time difference is evaluated between the reception of two signals that are received from two different receiving antennas to help identify a vector for direction between the RL and the MT. An analysis of a Doppler shift in the received signals from the MT can also be used to assist in the determination of the directional vector. In addition, sequence "C" is evaluated to extract transferred information from the MT to the RL. Moreover, measurements from the compass sensor and can be utilized to assist in determining location as will be described later.

Example Operational Features and Observations

The present disclosure merges "location request" polling with the location process itself. The RL device is arranged to provide a relatively lengthy, powerful, coded signal whose duration spans the polling interval of the MT. The MT very briefly samples the relevant spectrum, and finds a coded spread spectrum signal. In this event, the MT performs multiple signal captures from the lengthy transmission, making successively more accurate estimates of the signals frequency, cadence, and time reference. These estimates are limited in precision by the short-term stability (root Allan variance) of the MT's and RL's time bases (e.g., a quartz crystal oscillator) and by the relative acceleration between the RL and the MT. This Allan variance will typically be better than 1 part per billion, but the acceleration for observation periods of 0.25 seconds may be the order of: 10 meters/sec$^2$ by 0.25 seconds, which would give a 2.5 meter/second Doppler change. This lurch is unusual, and typically, a 0.25 meter/second change or less is observed. A velocity change of 0.25 meter/second round-trip is 0.5 meter/second, which is a Doppler change of $0.5/3 *10^8$, or 1.6 parts per billion (ppb). Thus, the estimates of incoming signal frequency/sequence should have a precision of approximately two (2) parts per billion or better. Experimentally, two (2) ppb has been observed.

The MT can use the precise estimate of the received signal timing to synthesize a coded spread spectrum reply with substantially the same timing and carrier frequency. This reply signal is emitted shortly after the end of the incoming signal. Since the timing is accurately captured, the presence of a delay or gap doesn't materially degrade accuracy. For example, if the time-base error is 2 ppb, then a 30 ms delay translates into a time uncertainty of approximately 60 ps, which is about one centimeter of round trip distance.

The coded reply signal from the MT is sufficiently lengthy so that integration over time compensates for its relatively low power. The signal from the MT can be coherently processed by the RL since the return signal is coherent plus or minus the synthetic round-trip Doppler shift with the RL's time base. A cyclic set of 4096 complex capacitive integrators can be used to perform the process of signal accumulation to raise the weak signals up and out of the noise floor. The complex patterns (e.g., a pattern of length 2047 chips) have approximately 33 db of spreading gain. The addition of the cyclic integrators can achieve an additional 20 db of signal gain with the repetitive portions of the signal, yielding 53 db of total gain. A bandwidth reduction from 26 MHz down to about 100 Hz is achieved with this technique. The thermal noise over the 100 Hz bandwidth is approximately −154 dbm, where reasonable signal reception is expected at a level of around −140 dbm. A maximum path loss of 150 dB is achieved for a +10 dbm transmitter. The corresponding ideal free space range for this transmitter is approximately 1000 km assuming a 915 MHz signal and omnidirectional antennae. This large free space range or loss margin is useful for building penetration, implanted devices, and so forth.

The capture duration in the MT is limited by the relative crystal frequency tolerance between the MT and the RL. With time and temperature, and taking advantage of periodic calibration signals, this tolerance can be managed to a few parts per million. Thus, the product of the signaling frequency and the crystal tolerance gives a frequency offset, which in turn indicates the maximum possible reception time without the use of multiple Doppler bins or repeated correlation attempts. For example at 915 MHz and with a 3.5 ppm frequency error, a capture period of 312 μs would correspond to a first complete signal null.

The RL will in general receive a signal whose cadence and frequency very closely match its internal crystal clock, and thus the RL can use long cyclic integration times, which greatly increase the available signal to noise ratio. The described coherent integration (or coherent accumulation) process has a signal power maximum when the signal has rotated through 180 degrees at the end of the capture interval. For a 3.5 ppm frequency tolerance, when the period of the spread signal is designed to be about 150 μs. It is advantageous to use a signal which is itself complex. Improved orthogonality between coded signals is achieved by using a complex signal. For example, the Gold codes used in the GPS system have a length of 1023 chips with a cross correlation of approximately −24 db for 1025 possible codes. The complex signaling codes employed in the presently described disclosure is on the order of length 2047 chips, with a cross-correlation of −33 db for 2048 possible codes. The use of complex codes allows for improved signal rejection.

The round trip Doppler shift between slowly moving objects (e.g., people walking) is on the order of 4-5 ppb. Slowly moving objects provide a significantly longer integration time in cases where the received signal is likely to be very close in frequency to the RL's time base. Even automobile speeds will result in a round-trip Doppler-shift of 200 ppb or less.

Inventory Location System Concepts

In many of the above described example devices, the communication protocols are generally utilized by a locator (RL) to find a single transponder (MT, or tag). In some industrial and/or government applications the presently described devices, systems and methods can be modified to accommodate a much larger scale system.

In an inventory tracking system, each tag (or transponder, MT) can be assigned to belong to one or more groups. In such as example, a single locator (RL) can transmit a sequence that identifies all members of the group (i.e., all members of a group identified with a group ID that is encoded in the transmission sequence sent by the locator).

One objective of coding the transmission with the group ID is to locate as many of the members of a group of tags (transponders) as is possible in a single brief transmission sequence. As described previously herein, the customary locator-transponder/tag communication exchange is where the locator transmits a structured sequence of patterns where the duration of the repeating first part of the pattern exceeds the time span separating the wake up intervals of the transponders.

As described previously above, the transponders (tags) acquire the precise frequency, cadence, and phase of the signal received from the locator or interrogator, where the terms "locator" and "interrogator" can be used interchangeably. The tags then, given an appropriate interrogation sequence, reply with an identical frequency, phase and cadence. An inherent time delay exists between the end of the interrogation signal and the beginning of the reply transmission. This is of no consequence, since for any practical delay of about a tenth second or less, the frequency and phase match is such that the accumulated time error does not exceed about ten picoseconds. At an example carrier frequency is 915 MHz, the carrier period is about 1.09 nanoseconds, and the carrier phase error will be about a few degrees of error. Thus, interferometric operation will remain valid with transmit delays of about a tenth second or so.

Given the above-described limitations, a system is described that uses different precise delay times between reception of the interrogation signal and transmission of a reply for a number of tags assigned to a group (e.g., a group ID). For example, one-hundred (100) railroad cars of sulfuric acid material can be tagged with transponders and assigned to a common group identified by a specific group ID. When it is desired to locate all of the railroad cars, a locator encodes the specific group ID for the sulfuric acid railroad cars in a transmission sequence as part of "A", "B", and "C" patterns. Each tag that is a member of the specific group recognizes the transmission sequence patterns by correlating the received transmission sequences with a reference pattern that is also keyed from the specific group ID, and subsequently transmits replies to this interrogation signal in sequence, with one-hundred (100) different precisely determined delay values. Since each of the railroad cars is assigned to a different delay value (e.g., DELAY1-DELAY100), irrecoverable collisions in the signal spectrum should not occur.

In some examples system, the reply transmission packets may be spaced apart by about three (3) packet times (e.g., 471 microseconds for a 157 microsecond packet time). For this example, a complete reply pattern for one-hundred (100) responding transponders may span, for example, about 47 milliseconds (i.e., 100*471 microseconds) and will include the "A" packets from all one-hundred (100) of the responding tags identified with the group ID that are within the transmission range of the locator(s).

The above outlined example protocol may, for example, occupy about three (3) seconds of air time, and may thus have a location capacity of about sixty-six (66) location fixes per second, assuming a populated set, and that auxiliary locators were receiving adequate information to perform 3-space location.

An example of an application for this system is a large warehouse, a chemical storage yard or refinery where hazardous, toxic, flammable or poisonous chemicals may be present, and it is important to determine their placement with respect to other containers or barrels of less hazardous material, or materials which may be frequently moved. In these cases, it may be useful to add sensing capabilities to the transponders, so that alarms may be generated if, a barrel for example is not upright, or is leaking. Additional applications may also be desired and are contemplated within the scope of this disclosure.

Example Systems

Figure 10A:
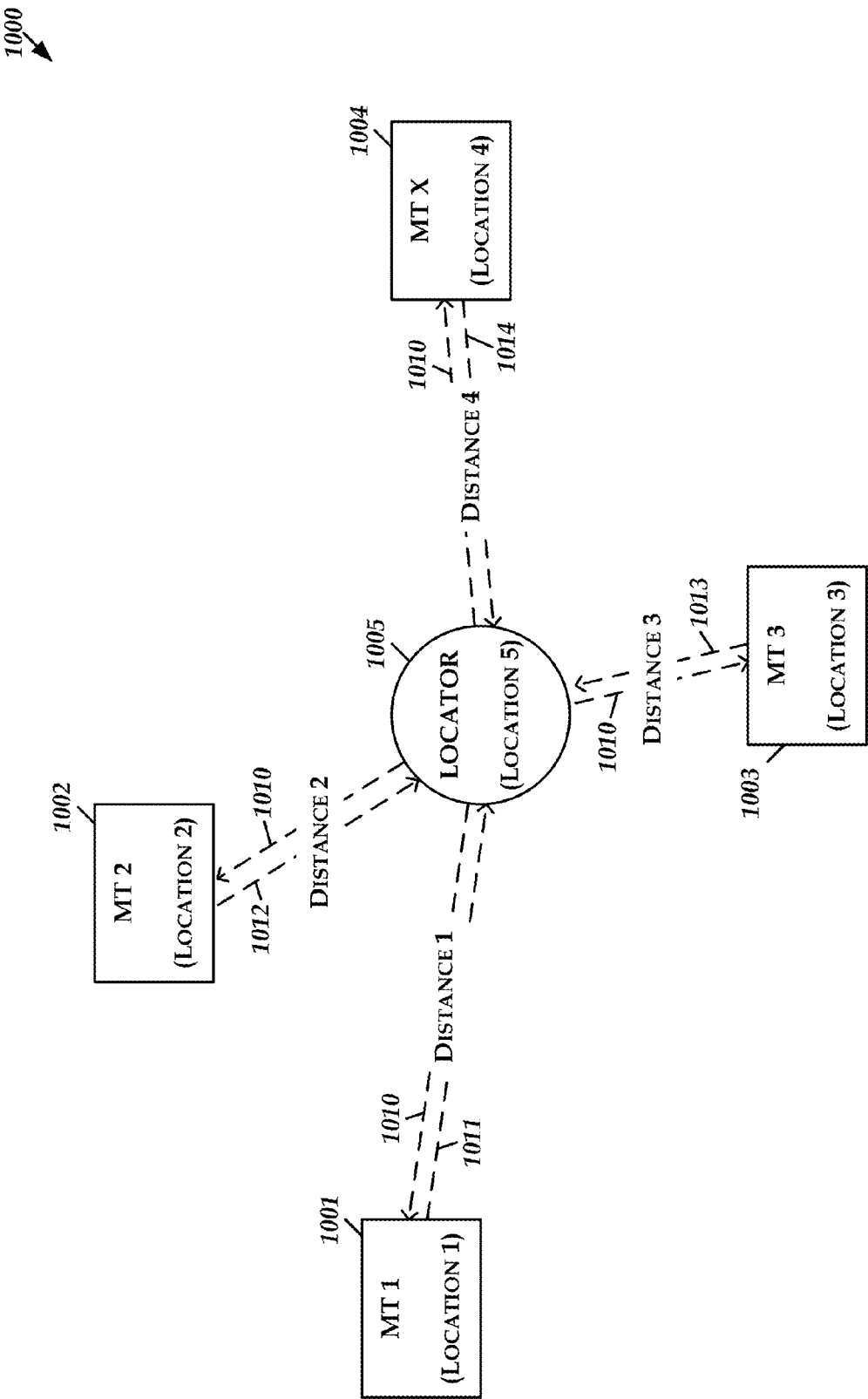

FIGS. 10A-10C illustrate an example system (1000) where a locator concurrently transmits to multiple transponders (MTs or tags) that are the member of a group, and subsequently receives transmissions from each transponder according to a precisely determined delay. System 1000 includes a number (X) of transponders (1001-1004) or micro-transponders (MT1-MTX) that are arranged to communicate with at least one locator (1005), as illustrated in FIG. 10A. A first transponder (1001) is located at a first physical location (LOCATION 1), a second transponder (1002) is located at a second physical location (LOCATION 2), a third transponder (1003) is located at a third physical location (LOCATION 3), while a fourth transponder (1004) is located at a fourth physical location (LOCATION 4). The locator (1005) is located at a fifth physical location (LOCATION 5).

In operation, the locator (1005) transmits an encoded transmission sequence (1010) in a multi-frame sequence that is encoded with a group ID such as illustrated in FIG. 10B. Each of the transponders (1001-1004) receives the encoded transmission sequence (1010), waits for the start of a transmission time interval after a precisely calculated delay time, and then transmits its own reply (1011-1014). For example, FIG. 10C illustrates that the first transponder (MT1) may transmit a reply sequence (1011) after a first delay (DELAY1), the second transponder (MT2) may transmit a reply sequence (1012) after a second delay (DELAY2), the third transponder (MT3) may transmit a reply sequence (1013) after a third delay (DELAY3), and the fourth transponder (MTX) may transmit a reply sequence (1014) after a fourth delay (DELAY4), where none of the transponders (1001-1004) are transmitting a reply at the same time.

Each transponder in a group is assigned a different delay value. However, the precise delay times (e.g., DELAY 1-DELAY 4) are synthesized inside each transponder (tag) using the timing from the locator's cadence. In a conventional RFID type of tag, precise delay times are not possible. For example, 1 ppm crystal in a conventional RFID tag has a time error after 0.1 seconds that corresponds to an error of plus-or-minus 100 nanosecond. An error of 100 nanoseconds is too great to use in the present locator application since the time related measurements would be ruined and collisions may occur in the spectrum. By adopting the present described time synthesis using the locator's cadence in the transponder (tag), high accuracy timing can be achieved to synthesize sufficiently precise delay times to avoid collisions and achieve an accurate position location system.

It is important to note that each of the transponders (1001-1004) is located at a different physical location (LOCATION1-LOCATION 4) relative to the locator's physical location (LOCATION 5). Moreover, the distance between the locator (1005) and each of the transponders (1001-1004) may correspond to different distances (DISTANCE 1-DISTANCE 4) that are not equal to one another. The physical location associated with each of the transponder and locator devices is determined by the physical location of the corresponding antenna (or antennas) of the respective device since the antenna location will determine transmit and receive times associated with their transmitted and received signals. Due to the physical arrangement of transponders relative to the locator, each transponder may not receive the incident interrogation signal at exactly the same time. However, each of the transponders is arranged to calibrate its own internal timing using the precise frequency, cadence, and phase of the interrogation signal as previously described herein. Each transponder accounts for this carefully calibrated timing in consideration of the precise delay times before the start of the transmit time interval so that the different times of arrival of the interrogation signal at each transponder does not create an error in the reply time resulting in collisions in the requisite signal spectrum.

The reply transmissions may consist of one or more packets of the sequence "A" pattern. In a simplest example, each reply transmission corresponds to a single packet of sequence "A". For the example illustrated in FIG. 10C, each reply transmission occupies two (2) packet times (sequence "A" followed by sequence "A"). A multi-packet packet sequence can permit for some margins of error in a transmission since a complete packet can be received even when either end of the multi-packet transmission is lost. For example, if a beginning portion of the first sequence "A" packet is lost, then it can be recovered by the beginning of the second sequence "A" packet, which is redundant, providing a guard band of about one-half of a packet time (e.g., 78 microseconds for a 157 microsecond packet time).

One or more additional packet can also be added between the end of the transmission from one transponder and the beginning of the transmission by another transponder to reduce errors. For the example of FIG. 10C, a two packet sequence "A" transmission is followed by a single packet time spacing, thus providing a total packet spacing of three (3) packet times for each transmission.

Figure 10D:
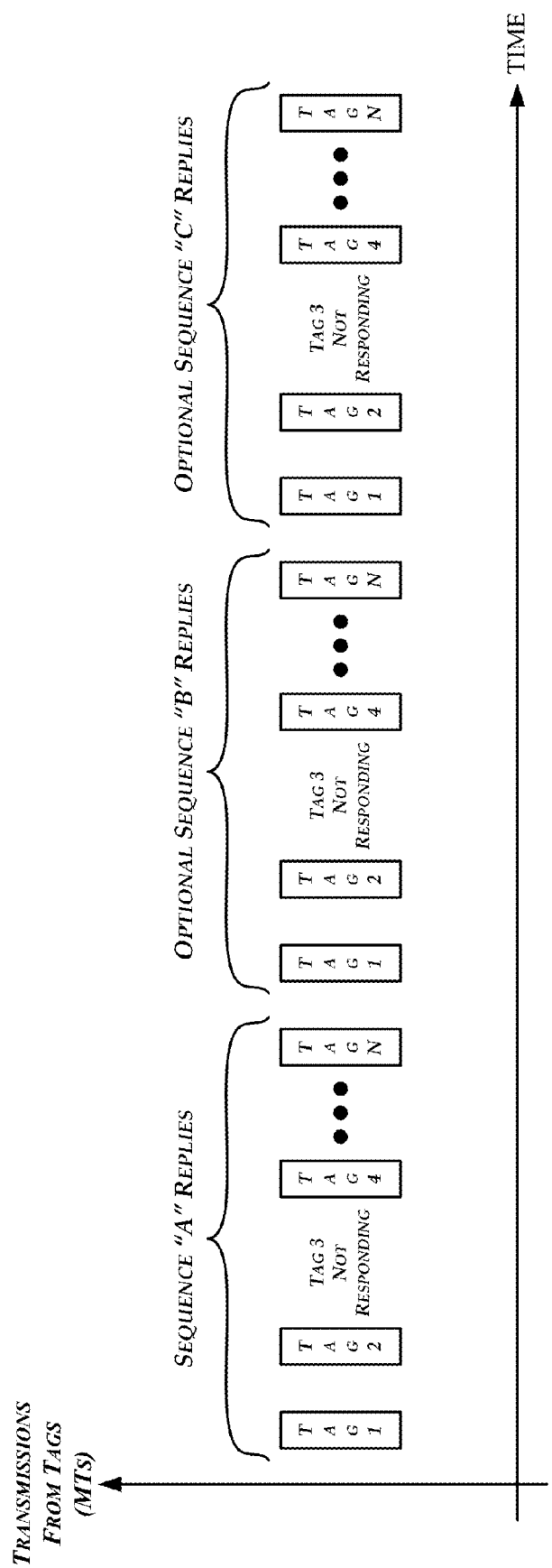
FIG. 10D illustrate example reply transmissions that are transmitted from the transponders (MTs) to one or more locators, where additional information is optionally encoded in sequence "B" and sequence "C" replies.

In some applications sensors may be included in the tag so that various conditions associated with a container (or other object) are monitored. For example, a cargo container may include sensors to sense the temperature and/or humidity of the cargo container, or perhaps a status of a cargo container as breached, open, closed, etc). In such examples, it may be desirable for the transponder to provide data from one or more of the sensors by encoding additional information in a reply transmission. Such additional information can be encoded in additional packets of transmissions such as sequence "B" transmission and/or perhaps sequence "C" transmissions. FIG. 10D illustrates example reply transmissions that are transmitted from the transponders (e.g., tag 1-tagN) to one or more locators, where the additional information can optionally be encoded in sequence "B" or sequence "C" reply transmissions (or perhaps both sequence "B" and sequence "C"). As illustrated, all of the sequence "A" reply transmissions for tags 1-N are followed by all of the sequence "B" reply transmissions, which are then followed by all of the sequence "C" reply transmissions. Also noted in FIG. 10D, one transponder (tag3) is not responding, indicating that the tag is either damaged or outside the range of the locator (e.g., the tagged item may have been stolen and is missing from the inventory).

Figure 11A:
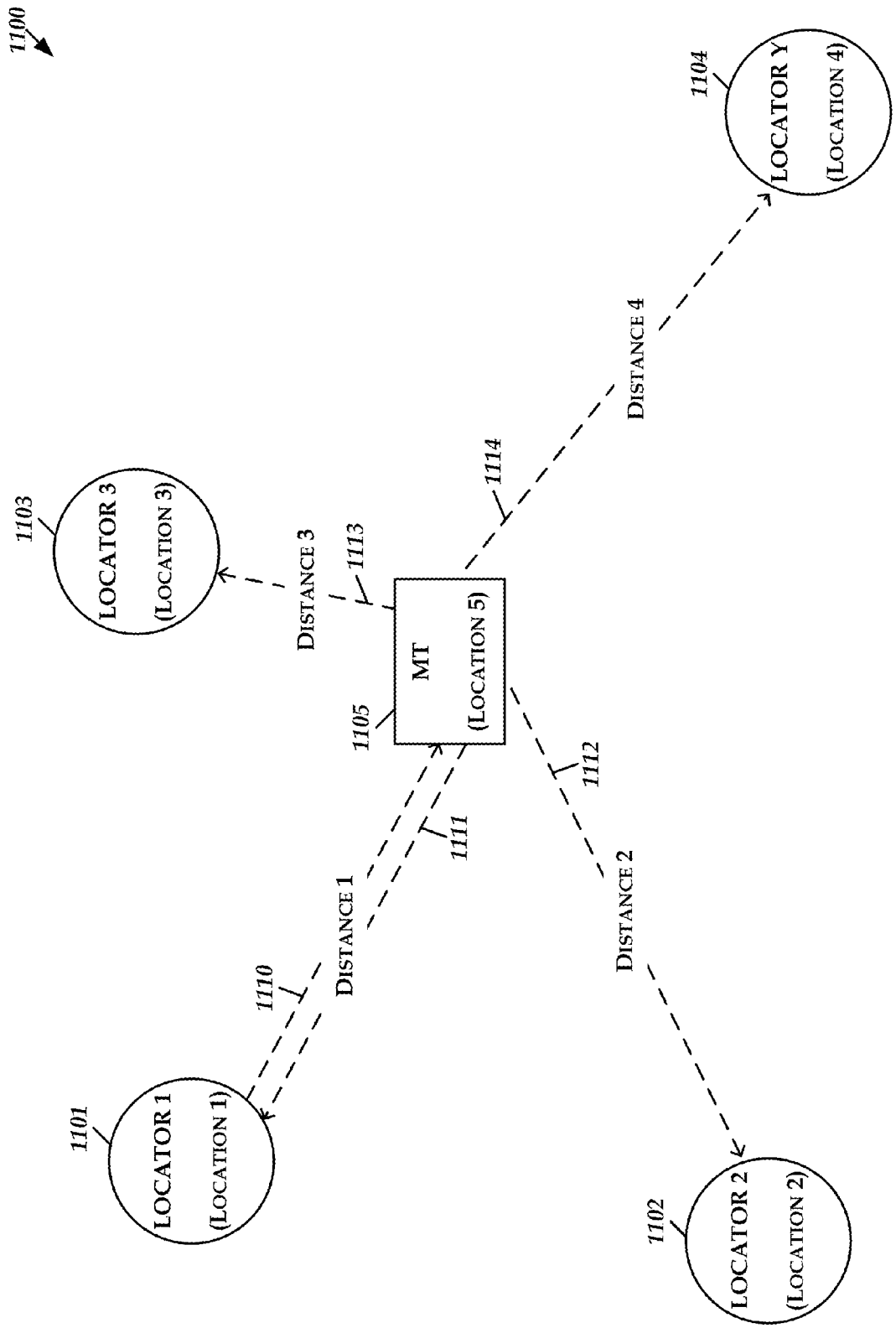
FIGS. 11A-11C illustrate an example system where a single transponder receives a sequence from a single locator, and then concurrently transmits a reply sequence that is received by multiple locators.
Figures 11B, 11C:
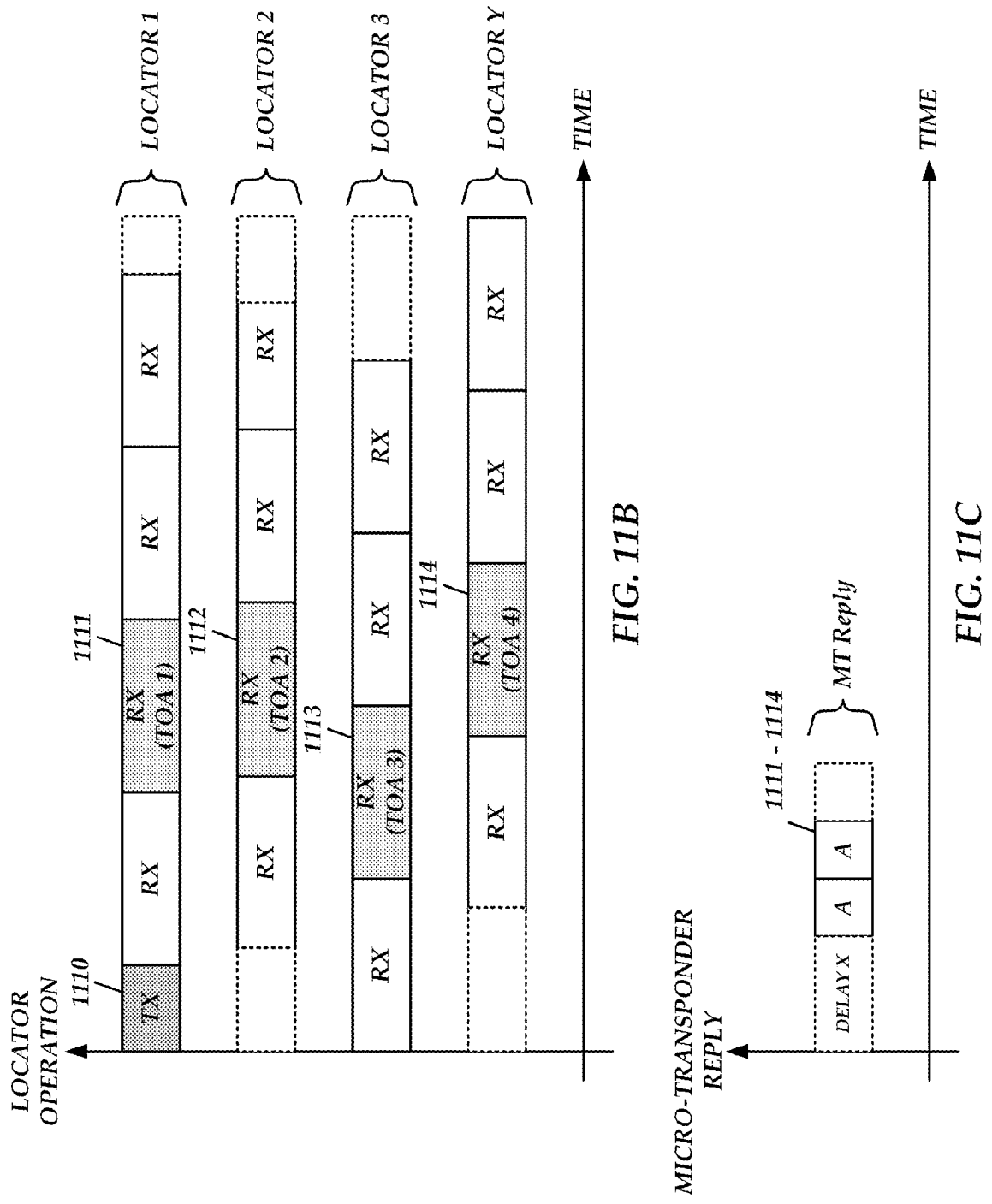

FIGS. 11A-11C illustrate an example system (1100) where a single transponder (MT) receives a sequence from a single locator, and then concurrently transmits a reply sequence that is received by multiple locators. System 1000 includes a number (Y) of locators (1101-1104) that are arranged to communicate with at least one transponder (1106), as illustrated in FIG. 11A. A first locator (1101) is located at a first physical location (LOCATION 1), a second locator (1102) is located at a second physical location (LOCATION 2), a third locator (1103) is located at a third physical location (LOCATION 3), while a fourth locater (1104) is located at a fourth physical location (LOCATION 4). The transponder (1106) is located at a fifth physical location (LOCATION 5).

In operation, locator 1101 initiates communication with transponder 1106 by transmitting an encoded transmission sequence (1110) in a multi-frame sequence that is encoded with a group ID such as illustrated previously in FIG. 10B. Transponder 1106 receives the encoded transmission sequence (1010), waits for the start of a transmission time interval after a precisely calculated delay time (DELAY X), and then transmits its own reply that is received by each of the locators (1101-1104) that is within the range to receive the transmitted reply.

As illustrated in FIG. 11A, each of the locators (1101-1104) is located at a different physical location (LOCATION1-LOCATION 4) and at a different distance (DISTANCE1-DISTANCE 4) relative to the transponder's physical location (LOCATION 5). Due to the physical arrangement of locators relative to the transponder, each transponder may not receive the reply transmission from the transponder at exactly the same time. As illustrated in FIG. 11B, locator 1101 may receive a reply transmission (1111) at a first time of arrival (TOA 1), locator 1102 may receive the same reply transmission (1112) at a second time of arrival (TOA 2), locator 1103 may receive the same reply transmission (1113) at a third time of arrival (TOA 3), and locator 1104 may receive the same reply transmission (1114) at a fourth time of arrival (TOA4). Since locator 1103 is closest to the transponder (i.e., DISTANCE 3 is the shortest distance in FIG. 11A), the time of arrival for receiving reply transmission 1113 is first. Since locator 1101 is second closest to the transponder (i.e., DISTANCE 1 is the second shortest distance in FIG. 11A), the time of arrival for receiving reply transmission 1111 is second. Since locator 1102 is third closest to the transponder (i.e., DISTANCE 2 is the third shortest distance in FIG. 11A), the time of arrival for receiving reply transmission 1112 is third. Since locator 1104 is furthest from the transponder (i.e., DISTANCE 4 is the longest distance in FIG. 11A), the time of arrival for receiving reply transmission 1114 is last.

As previously discussed, the physical location associated with each of the transponder and locator devices is determined by the physical location of the corresponding antenna (or antennas) of the respective device since the antenna location and orientation will determine transmit and receive times associated with the transmitted and received signals. In some example systems, the electronics and antenna(s) associated with each locator may be located within a single housing such that the location of the antenna corresponds to the location of the housing in an inventory tracking area. In some additional example systems, the electronics associated with a locator may be at a different physical location from the corresponding antenna(s), and the physical location associated with the particular locator in the inventory tracking area is determined by the physical location of the locator's corresponding antenna(s). In still other examples systems, the electronics associated with two or more locators may be at a common physical location, while the corresponding antennas may be located at different physical locations. For location determining purposes, the physical location associated with each of the locators is determined by the physical location of the corresponding antennas.

Central Processing

Figure 12A:
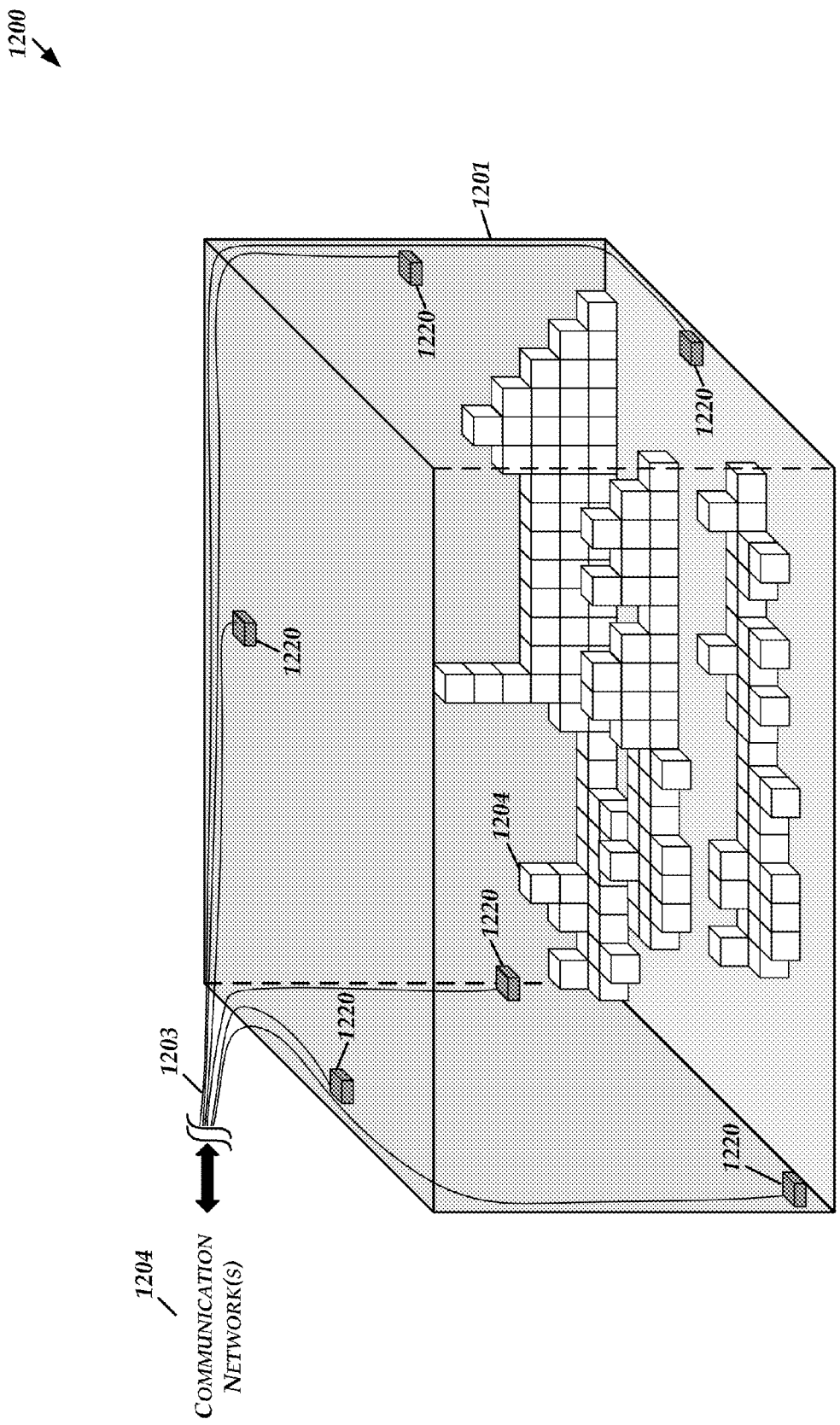
FIGS. 12A-12B illustrate an example system where multiple locators receive reply transmissions from one or more transponders (MTs) in a warehouse, and each locator communicates information about the received replies to a central processing unit via one or more communication networks.
Figure 12B:
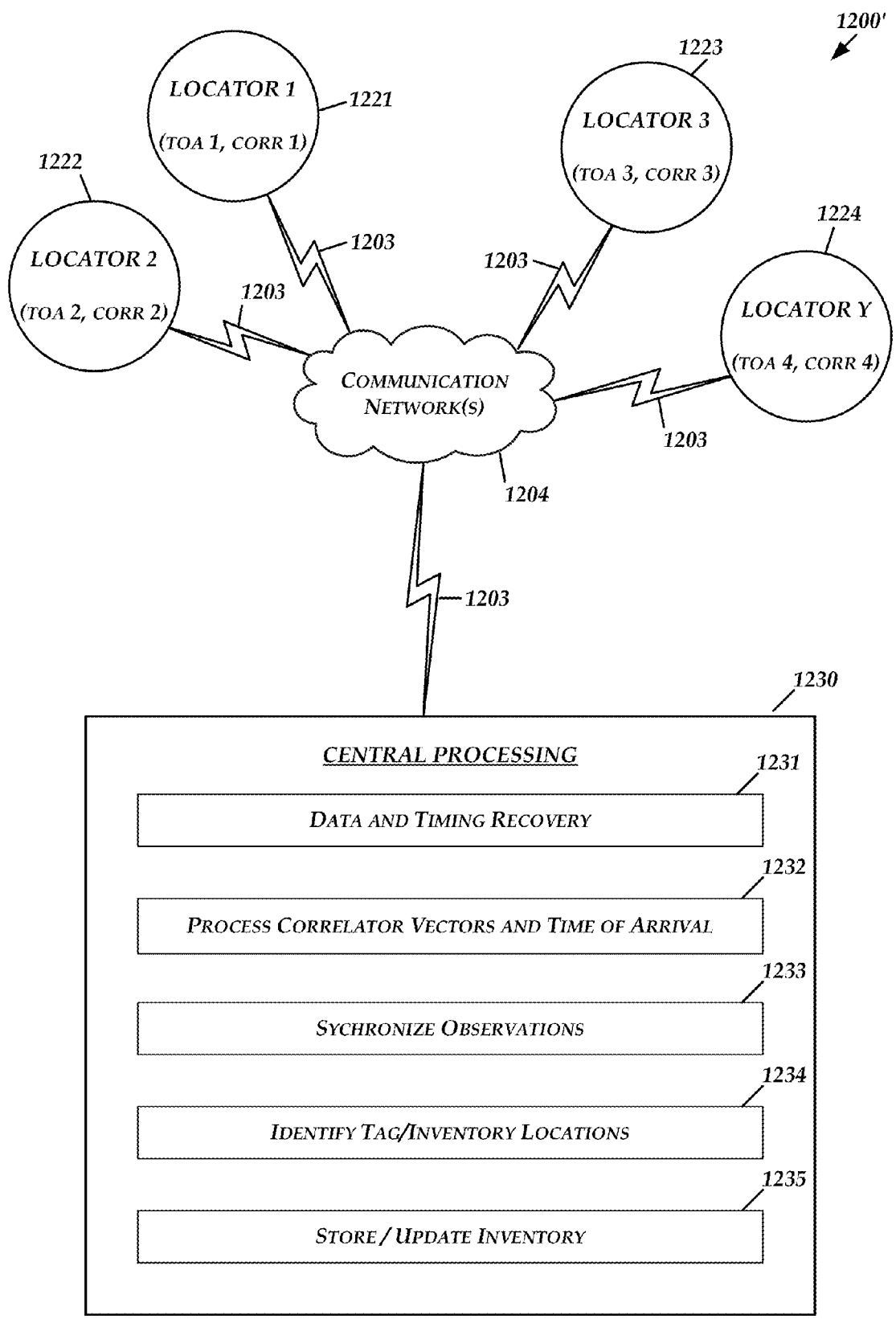

FIGS. 12A-12B illustrates an example system (1200) where multiple locators receive reply transmissions from one or more transponders in a warehouse, and each locator communicates information about the received replies to a central processing unit via one or more communication networks.

A warehouse (1201) is illustrated in FIG. 12A where a large number of tagged crates, boxes, containers or other objects (1204) are located. Each of the objects (1204) may be one of numerous objects that can located against any floor or wall surface of the warehouse, or stacked upon one another as is illustrated. One of the locators (1220) can be selected to initiate communications with a group of tagged objects using a transmission sequence that is encoded with the requisite group ID. Each tagged object (1204) that is a member of the identified group will then transmit a reply transmission at a different delay time relative to the transmission of the communication from the initiating locator (1220). Each of the locators (1220) will then capture the reply transmissions from the responding transponders (1204) and subsequently communication information to the central processing unit via one or more communication networks (1204). Communication (1203) from the locators (1220) to the communication networks (1204) can be implemented with any reasonable communication topology such as a fiber-optic communication link (e.g., an RF to Fiber-Optic Modulator).

The physical location of each of the locators (1220) is different from one another and can be arranged on walls and/or ceilings at varying positions about the warehouse (1201) area. By varying the number and position of the locators throughout the warehouse (1201), and by centrally processing the various signals received from the locators, accurate position/inventory information can be reliably achieved for the warehouse.

As illustrated by FIG. 12B, each locator (1221-1222) is arranged to communicate to a central processing block (1230) via a communication link (1203) through one or more communication networks (1204). Information such as a time of arrival (TOA) for a reply transmission and a correlation vector (a vector of complex numbers) for the reply transmission is communicated from each locator (1221-1224) to the central processing. For example, central processing block 1230 receives a first time of arrival (TOA1) and a first correlation vector (CORR1) from the first locator (1221), a second time of arrival (TOA2) and a second correlation vector (CORR2) from the second locator (1222), a third time of arrival (TOA3) and a third correlation vector (CORR3) from the third locator (1223), and a fourth time of arrival (TOA4) and a fourth correlation vector (CORR4) from the fourth locator (1224).

The central processing block (1230) is arranged to perform data and timing recovery (1231), process the correlation vectors based on their time of arrivals (1232), synchronize the observations of all of the locators (1233), identify tags and their physical location from the processed vectors (1234), and store the information or update the inventory (1235). Additional information from each of the tags can also be collected by the central processing block (1230) such as temperature, humidity and other indicia concerning the tagged objects as previously described.

Figure 12C:
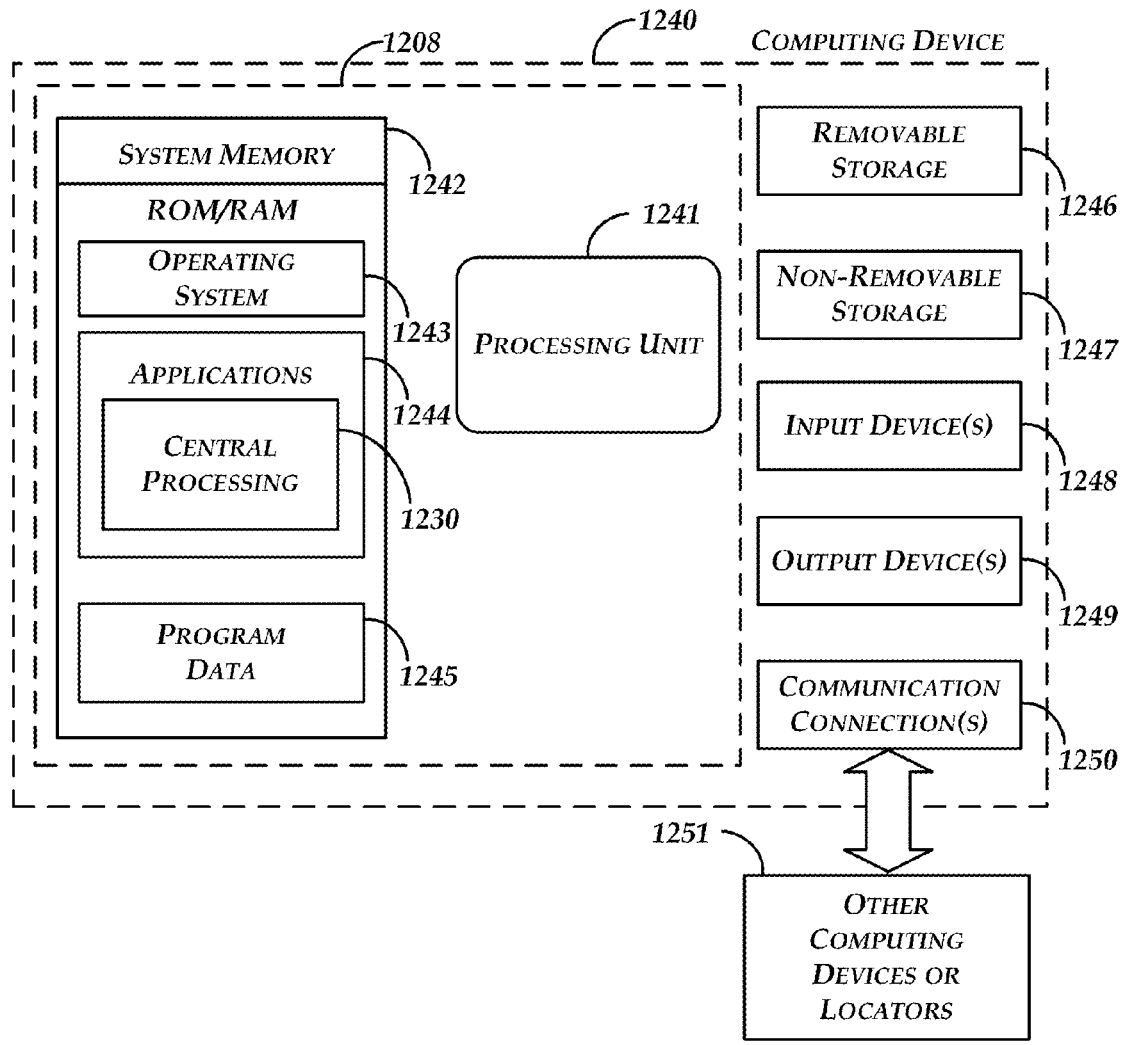
FIG. 12C illustrates an example computing device that is arranged to operate as a central processing unit.

FIG. 12C illustrates an example computing device (1240) that can be used for central processing. In a basic configuration, computing device 1240 may be a stationary computing device or a mobile computing device. Computing device 1240 typically includes at least one processing unit (1241) and at least one system memory (1242). Depending on the exact configuration and type of computing device, system memory 1242 may be volatile (such as RAM), non-volatile (such as ROM, flash memory, and the like) or some combination of the two. System memory 1242 may include an operating system (1243), one or more applications (1244), and may include program data (1245). In one embodiment, applications 1244 further include a central processing block application (1230) that performs various processing operations for inventory management and control.

Computing device 1240 may also have additional features or functionality. For example, computing device 1240 may also include additional data storage devices (removable and/or non-removable) such as, for example, magnetic disks, optical disks, or tape. Such additional storage is illustrated in FIG. 12C by a removable storage (1246) and a non-removable storage (1247). Computer storage media may include volatile and non-volatile, removable and non-removable media implemented in any method or technology for storage of information, such as computer readable instructions, data structures, program modules or other data. System memory 1242, removable storage 1246 and non-removable storage 1247 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1240. Any such computer storage media may be part of device 1240. Computing device 1240 may also have input device(s) 1248 such as a keyboard, a mouse, a pen or stylus, a voice input device, a touch input device, etc. One or more Output devices (1250) such as a display, speakers, printer, etc. may also be included.

Computing device 1240 also contains communication connection(s) 1250 that allow the device to communicate with other computing devices or locators (1251), such as over a wired network (e.g., an optical network) or a wireless network. Communication connection(s) 1250 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Example Process Flows and Polling Sequences

Figure 13A:
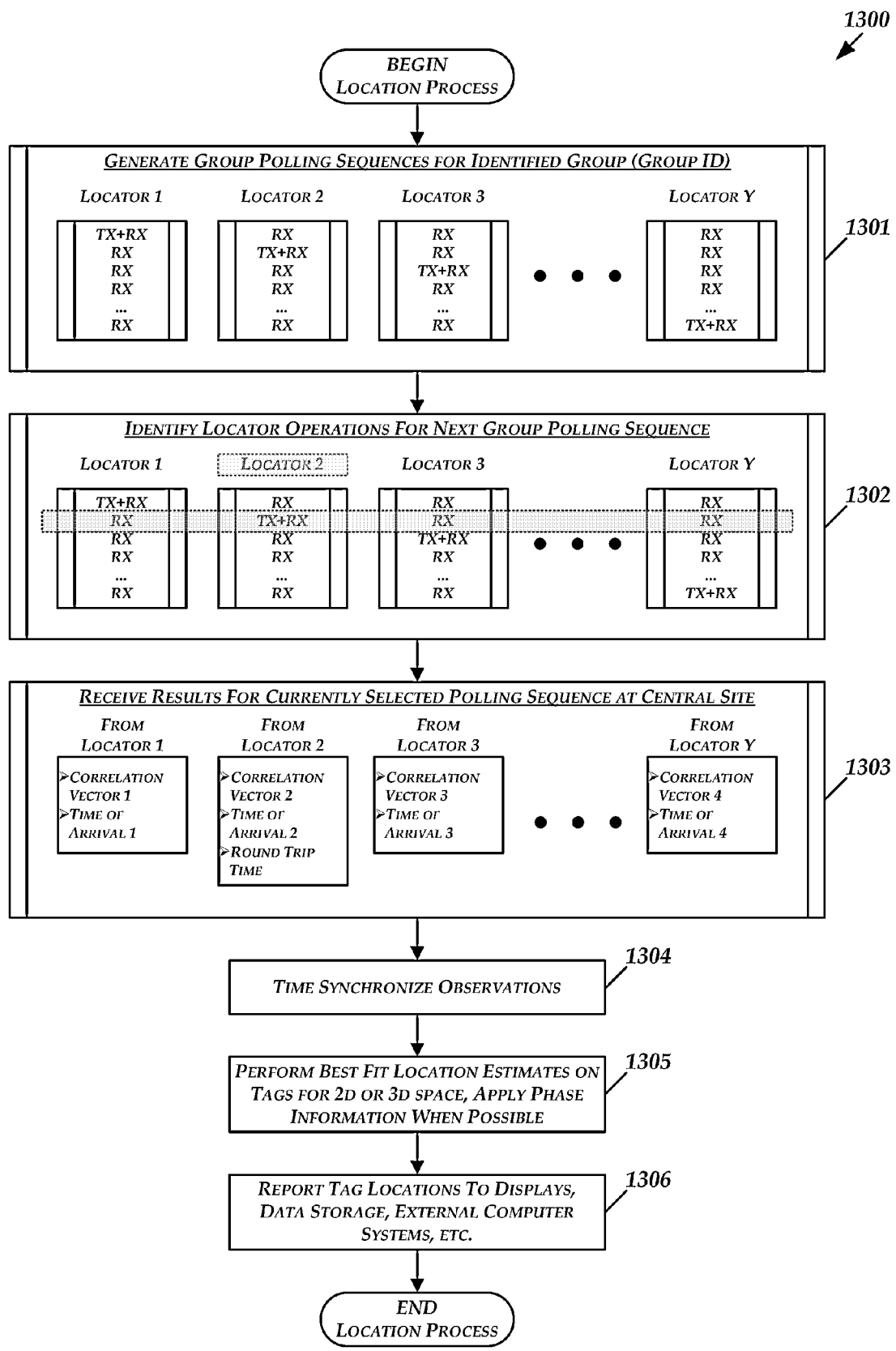
FIGS. 13A-13B illustrate example flow charts for a location process that consolidates the information about the received replies (Results) at a central processing unit.

FIG. 13A illustrates an example flow chart for a location process (1300 that consolidates the information about the received replies (Results) at a central processing unit. Processing begins at block 1301 (GENERATE GROUP POLLING SEQUENCES FOR IDENTIFIED GROUP) where group polling sequences are generated for the identified group (e.g., associated with Group ID). Each locator in the system is assigned an operating mode for the each of the polling sequences. For example, block 1301 illustrates that locator 1 is selected to initiate communications in a transmit (TX) and receive (RX) mode. The transmit mode is where the selected locator will be activated to source the interrogation signal that is sent to the transponders as previously described.

The receive mode is where the selected locator will capture signals from the relevant spectrum to "listen" for a reply transmission from transponders.

In a first example polling sequence, all of the Locators are selected to be in a receive (RX) mode except for the first Locator, which is arranged to transmit (TX) the interrogation signal and then receive (RX) the reply transmissions. Similarly in a second example polling sequence, all of the Locators are selected to be in a receive (RX) mode except for the second Locator, which arranged to transmit (TX) the interrogation signal and then receive (RX) the reply transmissions. The illustrated polling sequences are a round-robin type of repeating sequence (where the interrogation transmission is sent in turn by: Locator 1→Locator 2→Locator 3→ . . . . Locator Y→Locator 1→ . . . ). Although illustrated as a round-robin sequence, any other type of sequence is also suitable including a random sequence, pseudo-random sequence, or some other ordered sequence. In a simplest implementation, a single locator can be selected to always transmit the interrogation signal.

After the group polling sequence is generated AT BLOCK 1301, processing continues to block 1302 (IDENTIFY LOCATOR OPERATIONS FOR NEXT GROUP POLLING SEQUENCE) where the locator operations for the next group polling sequence are selected and each of the locators is configured into its respective operating mode as either a receiver (RX) or a transceiver (TX+RX). As illustrated in FIG. 13, Locator 2 is selected for operation as a transceiver (TX+RX) device (i.e., an interrogator device) while the remaining locator devices (Locator 1 and Locator 2-Locator Y) are selected for operation as receiver (RX) devices.

Processing proceeds from block 1302 to block 1303 (RECEIVE RESULTS FOR CURRENTLY SELECTED POLLING SEQUENCE AT CENTRAL SITE) where results from all of the locators are received at the central site (e.g., via a fiber-optic communication link). As described previously, each of the locators will capture signals from the relevant signal spectrum during its receiver operation, perform a correlation on the captured signals, log the time of arrival for signals that successfully correlate with the relevant reference pattern for the selected group identifier (e.g., GROUP ID), and optionally decode additional information that is transmitted from the corresponding transponder. Therefore, the term "results" can be understood in the broad sense to include all information that is obtained from a correlation including but not limited to: time of arrival, round-trip time (for the interrogating locator), correlation vector (a vector of complex numbers), and any additionally encoded information received from the responding tag. In the example illustrated by block 1303, the first locator (Locator 1) is in a receiver mode and reports Correlation Vector 1 and Time of Arrival 1; the second locator (Locator 2) is in a transceiver mode and reports Correlation Vector 1, Time of Arrival 2, and Round-Trip Time; the third locator (Locator 3) is in a receiver mode and reports Correlation Vector 3 and Time of Arrival 3; and the last locator (Locator Y) is in a receiver mode and reports Correlation Vector 4 and Time of Arrival 4. The described results are gathered on a tag by tag basis so that the all of the locators that receive a response from one particular tag report their results at approximately the same time to the central processing unit.

Processing continues from block 1303 to block 1304 (TIME SYCHRONIZE OBSERVATIONS), where the results that are gathered from all of the locators are evaluated for each respective tag and time synchronization is performed.

In some example synchronization processes, time synchronization can be achieved by carefully computing the roundtrip time of the communication link between the central processing unit and each locator. A common clock signal can be distributed between the central processing unit and each locator over a communication link (e.g., a fiber-optic communication link). A synchronization pulse (or synchronization sequence) can be sent from the central processing unit to each locator. Each locator receives the synchronization pulse (or synchronization sequence) and sends back a reply synchronization pulse (or sequence). The central processing unit receives the reply synchronization pulse (or sequence) and logs the time reported for signal arrival from each locator (e.g., an optical signal arrival time). The central processing unit then computes the precise roundtrip delay time from the central processing unit to each locator. In some fiber-optic implementations, synchronization can be facilitated with a fiber loop-back so that a precise round trip delay can be computed for the fiber-optic communication link.

Any number of communication lines can be used for the above described time synchronization methods. In one example configuration, a single optical fiber can be used for all communications between a central processing unit and a locator. In another configuration, multiple fiber-optic communication lines are used for communications (e.g., one fiber-optic line for clocking, one fiber-optic line for data, etc.).

Processing then continues from block 1304 to bock 1305 (PERFORM BEST FIT LOCATION ESTIMATES ON TAGS FOR 2D OR 3D SPACE, APPLY PHASE INFORMATION WHEN POSSIBLE). At block 1305, location estimates are computed for each tag based on the time synchronized observations. In one example, the precise location of each locator within the warehouse can be predetermined and stored in a database. Based on the time of arrival to each locator, the roundtrip time to the interrogating device, and other information (e.g., phase and magnitude of the correlation vector) an exact position can be identified for the transponder (tag).

Processing continues from block 1305 to block 1306 (REPORT TAG LOCATIONS TO DISPLAYS, DATA STORAGE, EXTERNAL COMPUTER SYSTEM, ETC.). At block 1306 the determined locations for each of the tags is reported to the requesting system. In some examples, the requesting system is an external computer (e.g., a computer terminal, a personal computer, etc.) that submits a request to the central processing unit. In other examples, the requesting system is the central processing unit itself (e.g., via a system initiated process according to a schedule, an event trigger, user initiated input, etc.). The results of the locations can be stored in a data storage device for later retrieval (e.g., stored in a database, stored in a file, etc.), or viewed on a display screen in either graphical or tabular format.

In some examples, an external computer system can be used to submit a request to scan the inventory from a remote location. For these examples, it may be preferred to have a secure login procedure that permits the external computer to interact with the central processing unit for the purposes of submitting inventory scan requests, deleting items from inventory, adding items into the inventory, assigning group IDs to tags, removing group IDs from tags, viewing the current inventory, identifying items missing from the catalogued inventory (e.g., a previously identified or active inventory), and identifying new items not found in the catalogued inventory.

At least two locators are necessary to compute an ambiguous position for locating a transponder. The ambiguity can be resolved by adding an auxiliary collocated sensing antenna to one of the transponders. In a simplest solution, three locators can be used to exactly identify a position for a transponder.

Additional locators can be used for error resistance and improved accuracy. Statistical analysis functions can be applied to the results to identify the best estimates on location for the transponder considering such functions as: least squares, best fit, weighting functions (e.g., high magnitude correlations are given a higher weight that lower magnitude correlation so that closer locators are more reliable than distant locators), as well as other numerical models.

Figure 13B:
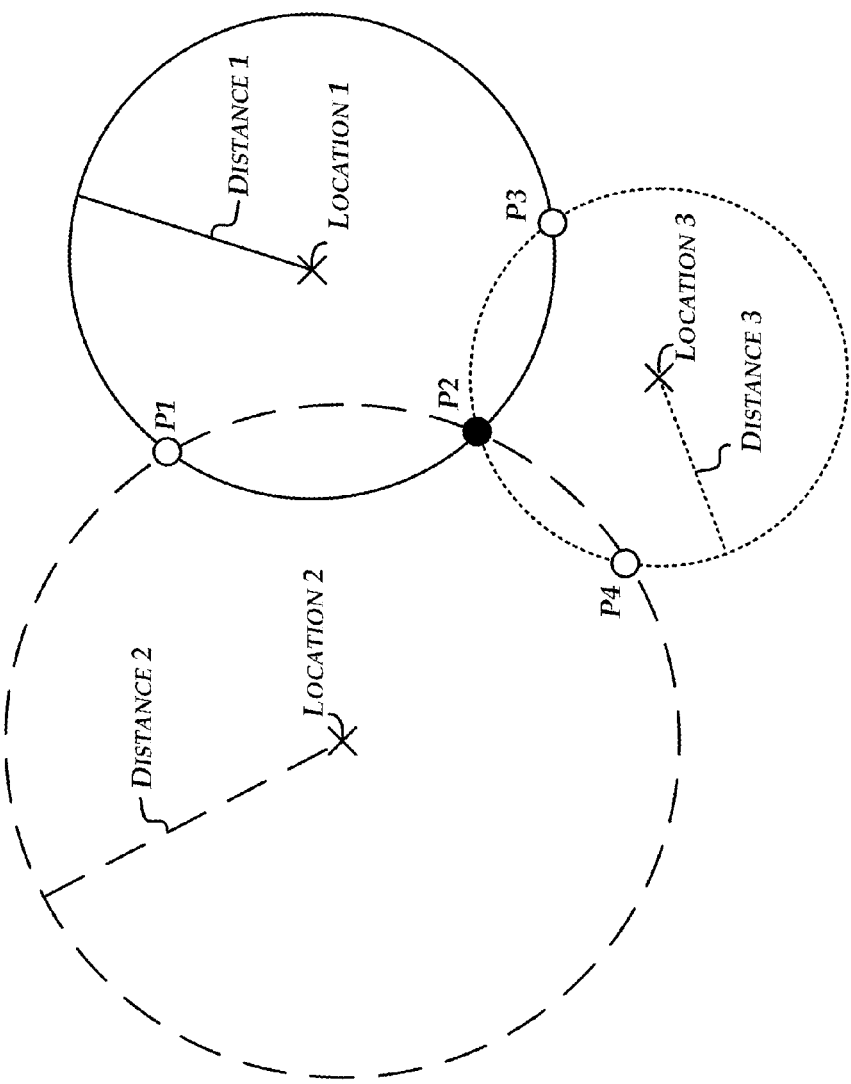

An example location process is graphically illustrated by FIG. 13B, where three locators are used to determined an exact position of a transponder (tag) based on the various results reported to the central processing unit. A first locator is at Location 1 at Distance 1 away from the responding tag. A second locator is at Location 2 at Distance 2 away from the responding tag. A third locator is at Location 3 at Distance 3 away from the responding tag. As illustrated in the figure, Distance 2>Distance 1>Distance 3. Each locator is located at a known physical position that can be stored in a central database. The first locator is the interrogation device for this example, and therefore Distance 1 can be calculated with great precision using the roundtrip time (the time between transmission of an interrogation sequence and receipt of a reply from the transponder). However, there is an uncertainty as to absolute direction relative to the locator, and thus the transponder may be located at first position that is positioned a fixed distance of Distance 1 away from Locator 1. The second locator receives the reply from the transponder, and logs the time of arrival and the correlation vector, which can then be used in conjunction with the information from the first locator to identify a second position that is positioned a fixed distance of Distance 2 away from Locator 2. The third locator receives the reply from the transponder, and logs the time of arrival and the correlation vector, which can then be used in conjunction with the information from the first locator to identify a third position that is positioned a fixed distance of Distance 3 away from Locator 3. The first and second positions can intersect each other at two possible points (in 2D space) as illustrated by points P1 and P2. The first and third positions can intersect each other at two possible points (in 2D space) as illustrated by points P2 and P4. The second and third positions can intersect each other at two possible points (in 2D space) as illustrated by points P2 and P4. Thus, all three positions intersect each other at a single point as illustrated by point P2. Position P2 can be calculated based on the geometric relationship between known Locations 1-3, and determined Distances 1-3. Although illustrated as a 2D space calculation, the same discussions holds in 3D space, where the 3D spheres intersect at a common point that is identified as the location of the transponder.

In another example, two locators are used to identify a position of a transponder. The first locator (e.g., Locator 1) is located at a first position with a roundtrip time that corresponds to a distance of 49.2 meters from the transponder. The second locator (e.g., Locator 2) receives a reply transmission from the transponder 40 nanoseconds earlier than the first locator, which corresponds to a distance that is 12 meters closer than the first locator, or approximately 37.2 meters. For a distance between the locators of 19 meters, a triangle is formed between the two locators and the transponder with sides of 19 meters, 37.2 meters and 49.2 meters. Applying the law of cosines ($C^2=A^2+B^2-2*A*B*COS(theta)$), an angle theta can be calculated as $theta=COS^{-1}((A^2+B^2-C^2)/(2*A*B))$. For the example described above, the angles of the triangle correspond to 118.56 degrees, 19.82 degrees, and 41.6 degrees. Therefore, the position of the transponder relative to the first locator is determined as 49.2 meters, at an angle of 41.6 degrees relative to the second transponder, and the position of the transponder relative to the second locator is determined as 37.2 meters at an angle of 118.56 degrees relative to the first transponder.

In some instances, a locator may be positioned near an interfering device that obstructs, impedes, or otherwise distorts communications from the locator relative to one tag, while the same locator may have little or no interference relative to another tag. For example, walls, metal tanks, steel plates, steel support beams, and other materials in the storage area may create a variety of signal obstructions. In some instances the physical limitations of the site location may be a determining factor for group assignments (or altering group assignments) based upon those tags that are within the reception range of one or more locators. A communication site survey can be generated as a list or some other similar form of data structure to facilitate identification of limited communication zones on a tag-by-tag and locator-by-locator basis. Each tag that successfully communicates with each locator can be noted in the communication site survey. The group assignments of tags or the groups of locators assigned for polling the assigned group can then be altered to optimize efficiency or throughput using the communication site survey.

FIGS. 13C-13D illustrate example data structures for storing information about locators and tags such as might be used in the above described communication site survey. FIG. 13C illustrates an example data structure (1320) that can be used for storing information about locators, while FIG. 13D illustrates an example data structure (1330) that can be used for storing information about transponders (tags)

The top row of data structure 1320 in FIG. 13C shows the data field designators for each column as "Locator Number", "Operational Status", "Physical Location", "Accessible Tags", and "Group Assignments". Each row of the data structure corresponds to a locator (e.g., Locator 1, Locator 2 . . . Locator Y). As shown by a first row, the operational status of Locator 1 is "OK", the physical location is logged at "Position 1", the tags that are accessible by Locator 1 are all tags (Tag 1, Tag 2, Tag 3 . . . Tag N), and Locator 1 is currently assigned to all groups (Group 1, Group 2, Group 3 . . . Group M). As shown by a second row, the operational status of Locator 2 is "OK", the physical location is logged at "Position 2", only Tag 2 is accessible by Locator 2, and Locator 2 is currently assigned to Group 1. As shown by a third row, the operational status of Locator 3 is "Not Responding", the physical position is logged as "*Position 3*", accessibility to tags is unknown since it is not responding, and Locator 3 is assigned to Group 1, Group 3 and Group 4. Since Locator 3 is not responding to communication inquiries, the position is listed in asterisks (i.e., "*Position 3*") to indicate that this was the last known position before communications failed. As shown by a fourth row, the operational status of Locator 4 is "OK", the physical location is logged at "Position 4", the tags that are accessible by Locator 4 are Tag 1, Tag 2, and Tag 4, and Locator 4 is currently assigned to Group 1 and Group 2. As shown by the last row (row Y), the operational status of Locator Y is "OK", the physical location is logged at "Position Y", the tags that are accessible by Locator Y are all tags (Tag 1, Tag 2, Tag 3 . . . Tag N), and Locator Y is currently assigned to all groups (Group 1, Group 2, Group 3 . . . Group M). The top row of data structure 1330 in FIG. 13D shows the data field designators for each column as "Tag Number", "Operational Status", "Physical Location", and "Group Assignments". Each row of the data structure corresponds to a tag (e.g., Tag 1, Tag 2 . . . Tag N). As shown by a first row, the operational status of Tag 1 is "OK", the physical location is logged at "Location 1", and Tag 1 is currently assigned to Group 2. As shown by a second row, the operational status of Tag 2 is "Not Responding", the physical location is "*Location 2*", and the Group Assignment is all groups (Group 1, Group 2, Group 3 . . . Group N). As shown by a third row, the operational status of Tag 3 is "OK", the physical location is logged as "Unknown", and Tag 3 is currently not assigned to any groups ("None"). Once the tag is assigned scanned into an inventory, the physical location can be updated for Tag 3, and a group can be assigned. As shown by a fourth row, the operational status of Tag 4 is "OK", the physical location is logged as "Location 4", and Tag 3 is currently assigned to Group 1 and Group 3. As shown by a last row, the operational status of Tag N is "OK", the physical location is logged as "Location 4", and Tag 3 is currently assigned to Group 1 and Group 3.

As will be appreciated by the above described data-structure examples, tags may be accessible by different locators while being assigned to the same groups. In such a situation it may be advantageous to change group assignments so that tags that are commonly accessible by a locator are clustered together in the same group. Moreover, an optimization algorithm can be utilized to collate the various possible groups and tags into an optimal set of group assignments so that efficient scanning of the inventory can be done with an appropriate set of locators that is different for each group. It should be noted that the above data-structures are merely illustrative examples and many other comparable data-structures are contemplated as a reasonable substitution. The data-structures can also be stored in a central database that is accessed by the central processing unit, or by external computer systems. Also, in some example inventory schemes a history file can be time stamped to indicate dates and times that the inventory/status change occurred.

Figure 14A:
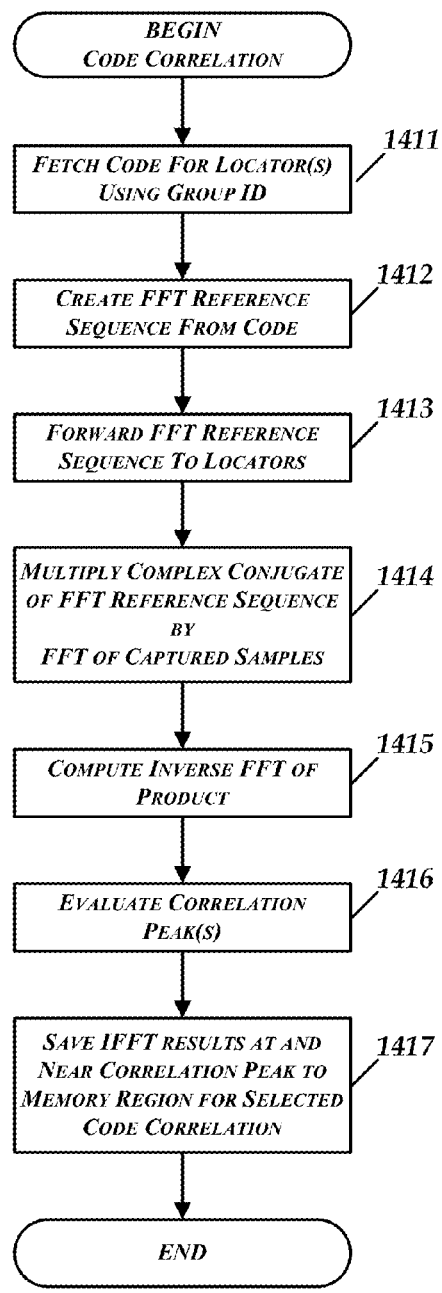
FIGS. 14A-14B illustrate example flow charts for code correlation processes.
Figure 14B:
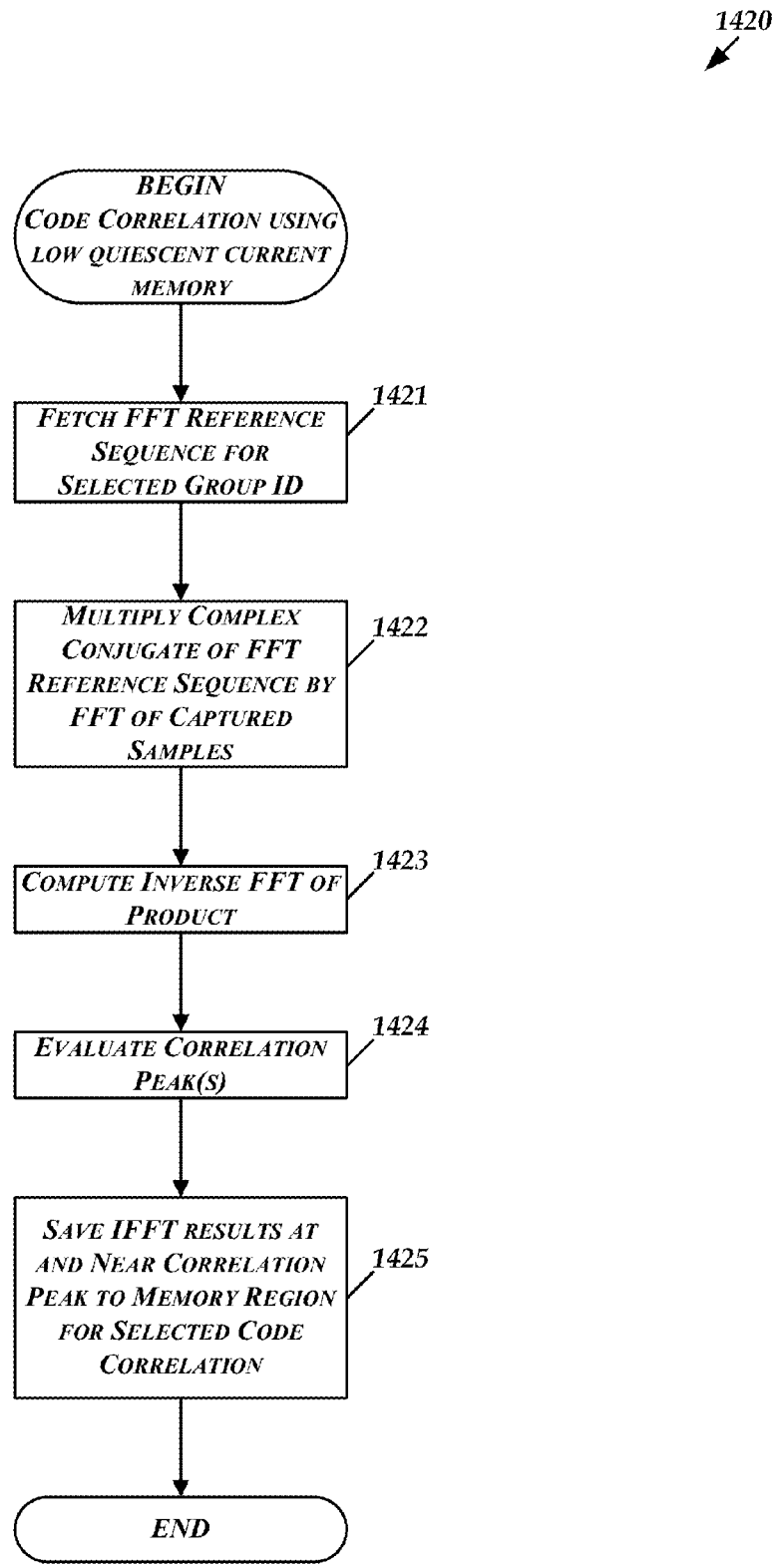

FIGS. 14A-14B illustrate example flow charts for code correlation processes. A first code correlation process (1410) is illustrated in FIG. 14A, while a second code correlation process (1420) is illustrated in FIG. 14B.

Processing for code correlation process 1410 begins at block 1411 (FETCH CODE FOR LOCATORS USING GROUP ID), where a code is retrieved by the central processing unit for a specific group of transponders identified by a group identifier (Group ID). Each tag can be assigned to any number of groups as may be desired. Continuing to block 1412 (CREATE FFT REFERENCE SEQUENCE FROM CODE), a reference sequence is generated for the generated code from block 1411, and the FFT of the reference sequence is calculated. Continuing to block 1413 (FORWARD FFT REFERENCE SEQUENCE TO LOCATORS), the computed FFT reference sequence from block 1412 is forwarded to all of the locators within the desired area (e.g., a warehouse containing a multiplicity of locators that are used for tracking an inventory contained therein). Each of the locators can then store the FFT Reference Sequence for later use in a receiver operating mode.

Processing flows from block 1413 to block 1414 (MULTIPLY COMPLEX CONJUGATE OF FFT REFERENCE SEQUENCE BY FFT OF CAPTURED SAMPLES), where each locator is arranged to apply a correlation function to complex samples captured by it's receiver for the relevant signal spectrum during a reply transmission from a locator when in a receiver mode according to the selected polling sequence. A first part of the correlation function is computed by multiplying the complex conjugate of the FFT Reference Sequence by the FFT of the captured samples (i.e., complex samples) associated with received reply transmissions (e.g., see FIG. 5A and FIG. 5B and related discussion). Processing then continues to block 1415 (COMPUTE INVERSE FFT OF PRODUCT), where an inverse FFT of the multiplication product is computed as a second part of the correlation function. Processing then continues to block 1416 (EVALUATE CORRELATION PEAKS), where the peak magnitudes of the inverse FFT are evaluated to identify if a correlation is found between the FFT Reference Sequence and the captured samples.

Continuing from block 1416 to block 1417 (SAVE IFFT RESULT AT AND NEAR CORRELATION PEAK TO MEMORY REGION FOR SELECTED CODE CORRELATION), the IFFT results are collected for evaluation and storage in a memory storage device of the locator. However, instead of merely saving a single correlation peak, the IFFT results for additional correlation magnitudes is stored for those correlations that are adjacent to a peak value. The locators subsequently communicate the correlation results and other information (e.g., time of arrival of correlation, etc.) to the central processing unit.

Processing for code correlation process 1420 is illustrated for a situation where a low quiescent current memory is used in each locator. Processing begins at block 1421 (FETCH FFT REFERENCE FOR SELECTED GROUP ID), an FFT reference sequence is retrieved from the locators memory for use in correlation with captured samples. Processing flows from block 1421 to block 1422 (MULTIPLY COMPLEX CONJUGATE OF FFT REFERENCE SEQUENCE BY FFY OF CAPTURED SAMPLES), where each locator is arranged to apply a correlation function to complex samples that are captured during a time interval of reply transmissions from a locator when in a receiver mode according to the selected polling sequence. A first part of the correlation function is computed by multiplying the complex conjugate of the FFT Reference Sequence by the FFT of the captured samples (i.e., complex samples having I and Q portions) associated with the received reply transmissions (e.g., see FIG. 5A and FIG. 5B and related discussion). Processing then continues to block 1423 (COMPUTE INVERSE FFT OF PRODUCT), where an inverse FFT of the multiplication product is computed as a second part of the correlation function. Processing then continues to block 1424 (EVALUATE CORRELATION PEAKS), where the peak magnitudes of the inverse FFT are evaluated to identify if a correlation is found between the FFT Reference Sequence and the captured samples.

Continuing from block 1424 to block 1425 (SAVE IFFT REULST AT AND NEAR CORRELATION PEAK TO MEMORY REGION FOR SELECTED CODE CORRELATION), the IFFT results are collected for evaluation and storage in a memory storage device of the locator. However, instead of merely saving a single correlation peak, the IFFT results for additional correlation magnitudes is stored for those correlations that are adjacent to a peak value. The locators subsequently communicate the correlation results and other information (e.g., time of arrival of correlation, etc.) to the central processing unit.

Figure 15:
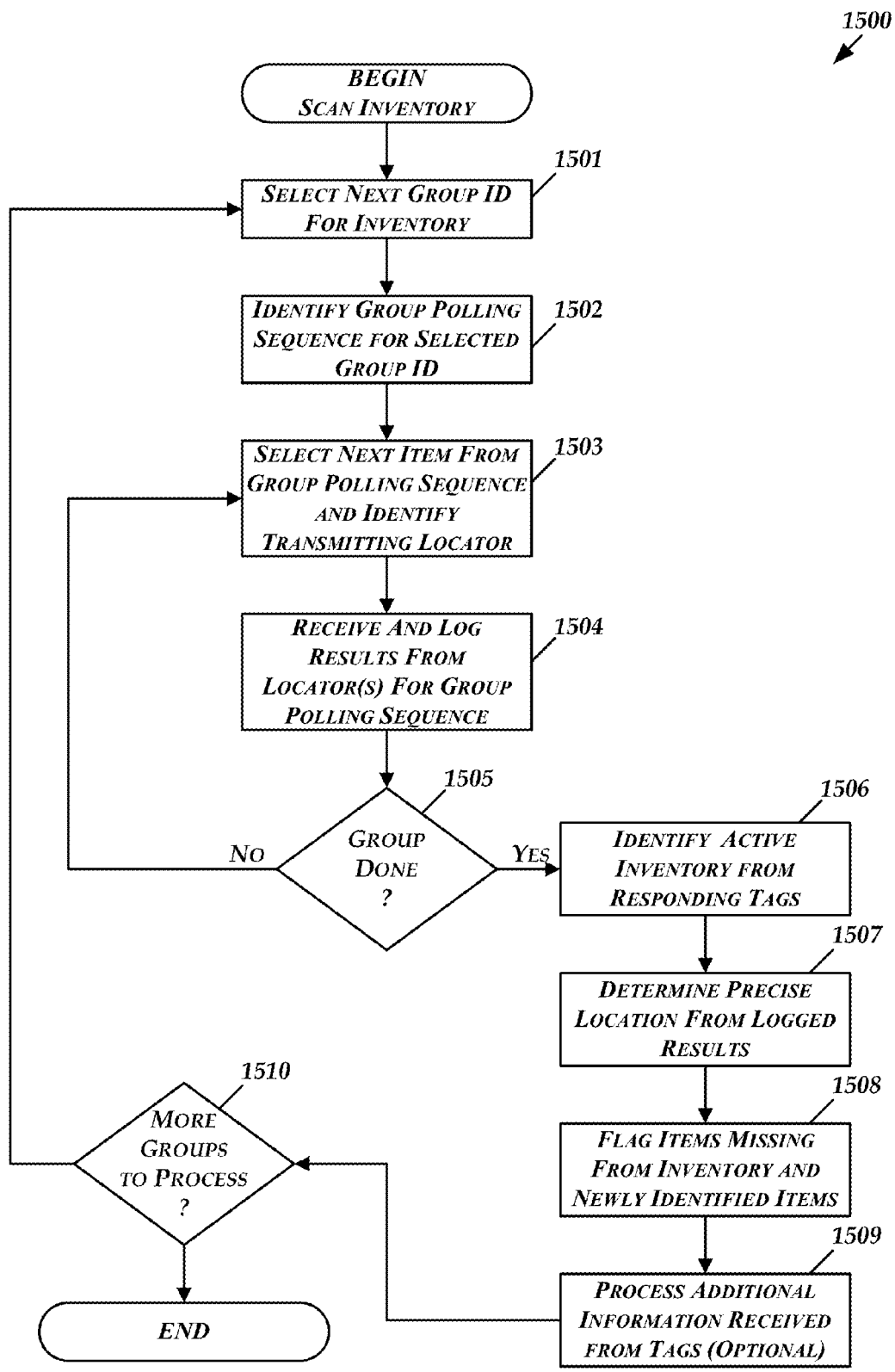
FIG. 15 illustrates an example flow chart for an inventory scanning process.

FIG. 15 illustrates an example flow chart for an inventory scanning process (1500). Processing begins at block 1501 (SELECT NEXT GROUP ID FOR INVENTORY), where the central processing unit identifies a next group of locators for inventory scanning. The group of locators is identified with a group ID as previously described. Processing continues to block 1502 (IDENTIFY GROUP POLLING SEQUENCE FOR SELECTED GROUP ID), where the central processing unit identifies the group polling sequence for all locators (e.g., see FIGS. 13A-13B and related discussion), At block 1503 (SELECTED NEXT ITEM FROM GROUP POLLING SEQEUNCE AND IDENTIFY TRANSMITTING LOCATOR), the central processing unit selects the next polling sequence and instructs the various locators to operate in a receiver or transceiver mode as previously described with respect to FIG. 13A. The central processing unit also identifies the transmitting locator as the interrogation signal source for computational purposes of determining an exact position for responding tags. Continuing to block 1504 (RECEIVE AND LOG RESULTS FROM LOCATOR(S) FOR GROUP POLLING SEQUENCE), the central processing unit is arranged to receive results (e.g., via a fiber-optic communication link) from each of the locators and log those results for computation as previously described (e.g., FIGS. 12A-12B, 13A-13B, and 14A-14B and related discussion).

At decision block 1505 (GROUP DONE?), the central processing unit determines if all of the processing is completed for the selected group. In some instances, it may be desired to collect additional data where the transmitting locator is changed to a different locator. IN such an instance, processing continues from decision block 1505 to block 1503 so that the next group polling sequence for the currently selected group can be selected. Otherwise, processing continues to block 1506 when no additional group polling is necessary for the currently selected group.

At block 1506 (IDENTIFY ACTIVE INVENTORY FROM RESPONDING TAGS), the currently logged data is evaluated to identify which tags are responding to the interrogation signal. The responding tags are referred to as the active inventory. Continuing to block 1507 (DETERMINE PRECISED LOCATION FROM LOGGED RESULTS), the location of each tag in the active inventory is determined such as described with reference to FIGS. 13A and 13B above. Proceeding to block 1508 (FLAG ITEMS MISSING FROM INVENTORY AND NEWLY IDENTIFIED ITEMS), the active inventory is compared to a prior inventory (e.g., stored in a database) to determine if the status of any item has changed. When a new tag is identified as part of the group, it is flagged as a newly found inventory item. When a tag in the prior inventory is missing from the active inventory it is flagged as missing. Block 1509 (PROCESS ADDITIONAL INFORMATION RECEIVED FROM TAGS) is an optional block, where tags may communicate additional information such as described with respect to the optional sequence "B" and "C" replies of FIG. 10D. When such information is retrieved (e.g., temperature, humidity, breached or sealed status, etc.), the information can be logged by the central processing with the associated tag.

Continuing to decision block 1510 (MORE GROUPS TO PROCESS?), the central processing unit determines if all of the processing is completed for all groups. In some instances, it may be desired to collect data in a demand model, where only one group is selected at a time. In other instances, it may be desired to collected data for all possible groups in a scanning process. When additional groups are to be processed, processing flows from decision block 1510 back to block 1501, where the next group ID can be selected. Otherwise processing terminates once all groups are processed.

Additional steps can be added to the process flow of FIG. 15 to allow user interaction such as alarms to alert the user of missing inventory, user prompts to display the results as they are collected, a visual warehouse map indicating the location of the currently scanned inventory, etc.

Example Synchronization of Locators

Figure 16A:
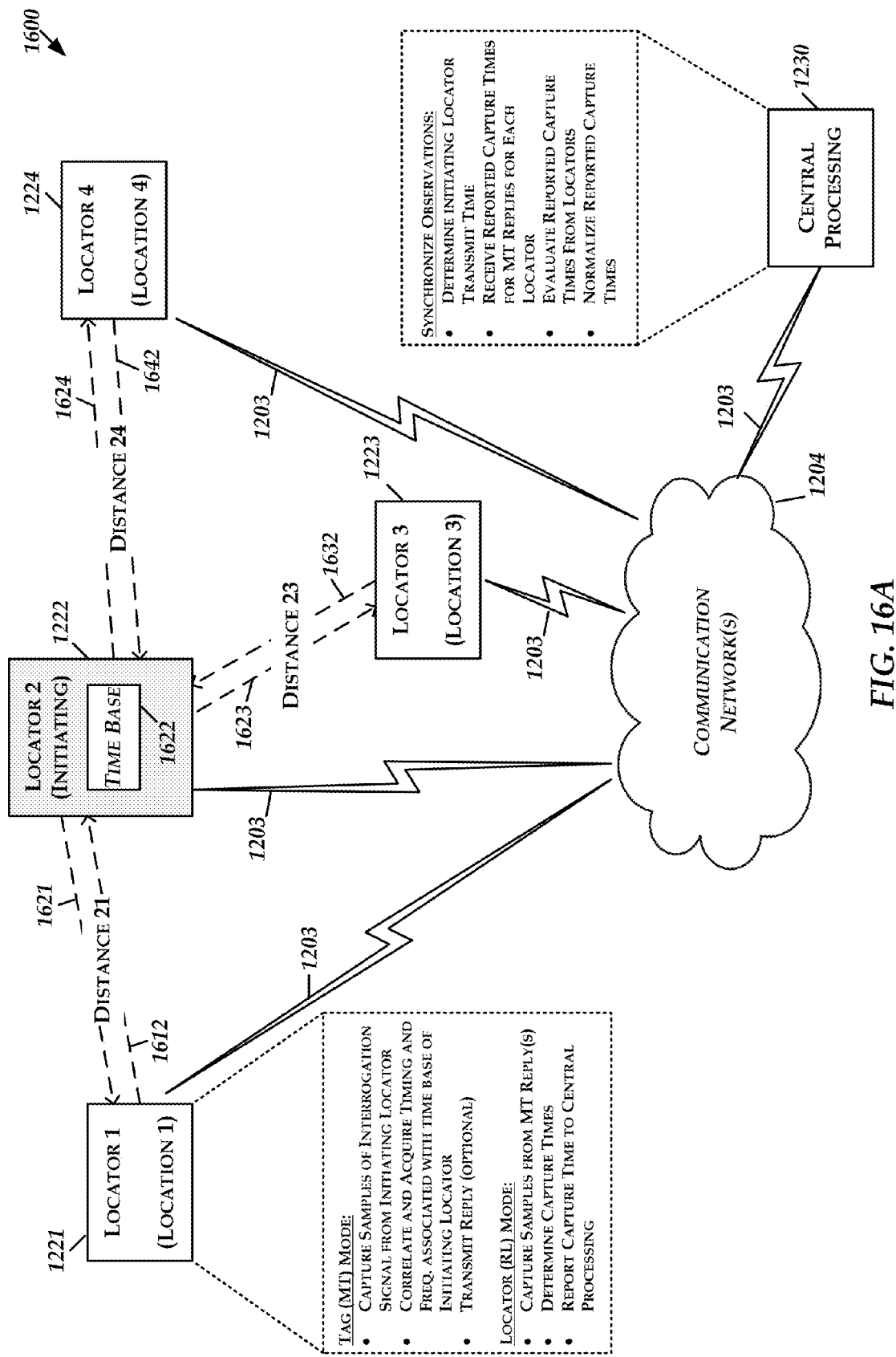
FIGS. 16A-16C illustrates an example system where multiple locators are configured for synchronization and inventory management.
Figure 16B:
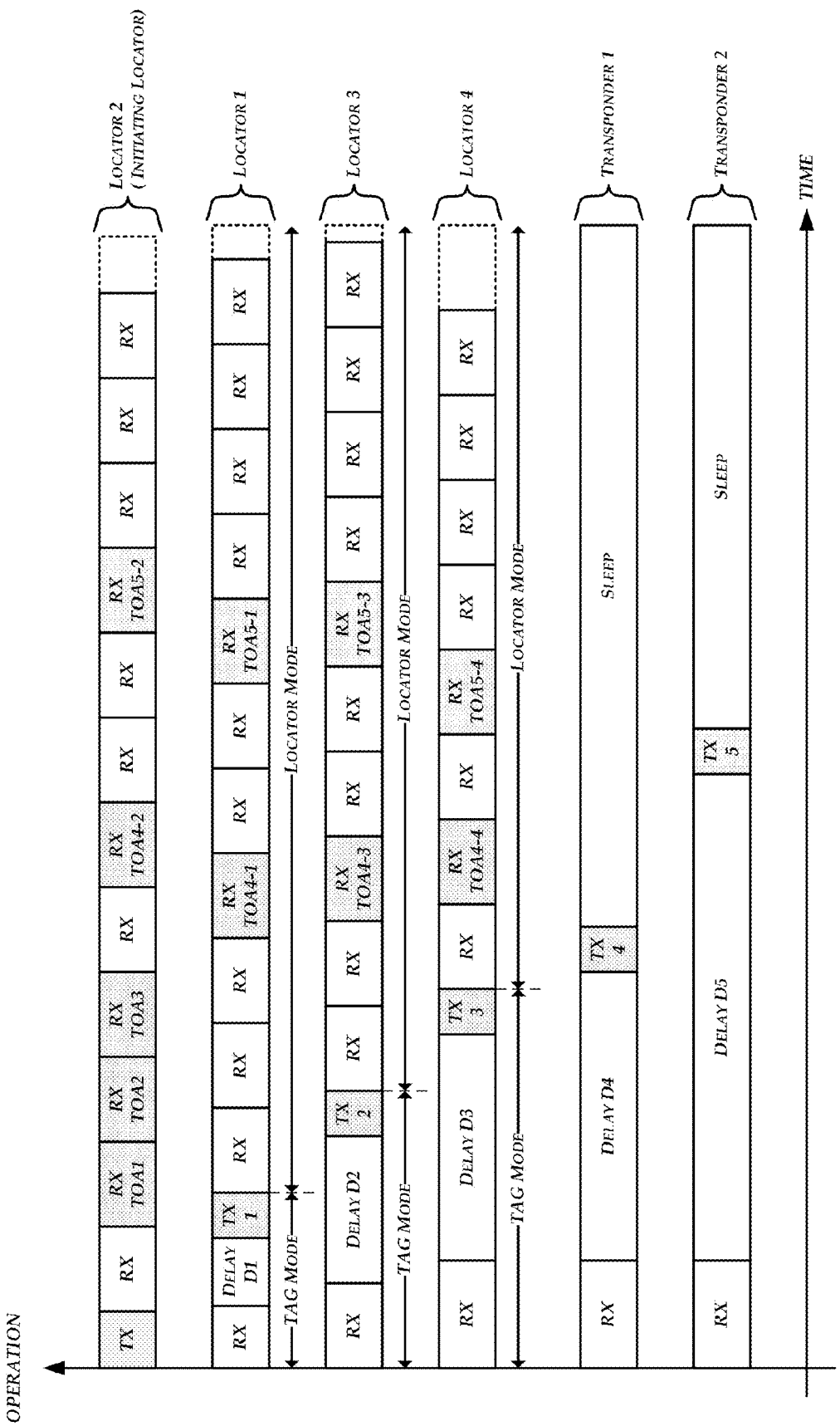

FIGS. 16A-16B illustrates an example system where multiple locators are configured for synchronization and inventory management in accordance with at least some examples described herein. FIG. 16A is similar to FIG. 12B, where each locator (1221-1224) is arranged to communicate to a central processing block (1230) via a communication link (1203) through one or more communication networks (1204). However, FIG. 16A further illustrates that a selected locator (e.g., Locator 2, 1222) can be configured as an interrogator or initiating locator that is operated in an interrogator mode, where the selected locator is adapted to transmit (TX) interrogation signals (e.g., 1621, 1623, 1624) to a set of one or more of the non-selected locators. The non-selected locator(s) can be configured to act similar to tags that receive (RX) the interrogation signal and adapt their internal timings to acquire timing and frequency from the interrogation signal for purposes of synchronization (i.e., a synchronization mode) as will be described. In some instances the non-selected locator(s) can be configured to transmit a responsive reply signal (e.g., 1612, 1632, 1642) after adapting the internal timings such that a complete system calibration may be achieved (i.e. a calibration mode). FIG. 16B is similar to FIGS. 11B and 11C, with additional details as will be described, where the time associated with FIG. 16B is not drawn to scale.

The initiating locator can be selected to operate as in interrogator according to a schedule as part of an inventory review schedule. The set of non-selected locators can be any appropriate set of locators, which may include a single non-selected locator, a group of non-selected locators, or all of the non-selected locators, where the set of non-selected locators may also be selected according to the schedule. In some examples, the set of non-selected locators can be determined from the group ID previously described in the inventory management scheme. In some other examples, the set of non-selected locators can be determined from some other identifier that is based on the selected locator or some other parameter(s).

The set of non-selected locators can be configured to operate in a synchronization mode. In the synchronization mode, the non-selected locator can be configured to effectively receive the interrogation signal (e.g., the interrogation signal is a wireless broadcast signal) from the selected locator (e.g., capture samples of the signal spectrum that are associated with transmitted interrogation signal communications from the selected locator or interrogator). Based on the received communications from the initiating locator, the non-selected locator can adapt internal timing and frequency adjustments for synchronization purposes. Since the initiating locator is configured to synthesize the interrogation signal transmission carrier/frequency/phase/timing using an internal time base, the adapted timing/frequency of the non-selected locator is effectively derived from the same time base as the initiating locator.

After the interrogation signal transmission is complete, the selected locator can be operated in a locator mode. The changeover from interrogator mode to locator mode can be automatically handled by selected locator, or initiated in response to some other event. For example, the changeover may occur automatically when the selected locator has determined that transmission of the interrogation signal is complete. In some other examples, the changeover from interrogator mode to locator mode can be initiated according to a schedule or after a time delay expires. In still other examples, the changeover from synchronization mode to locator mode can be initiated upon receipt of a command.

After the timing and frequency are acquired in the non-selected locators, synchronization is deemed complete and the non-selected locators can be configured to operate in a locator mode. The changeover from synchronization mode to locator mode can be automatically handled by non-selected locator, or initiated in response to some other event. For example, the changeover may occur automatically when the non-selected locator has determined that timing and frequency synchronization is complete (e.g., when the interrogation signal correlates with a reference sequence, timing acquisition may be deemed complete). In some other examples, the changeover from synchronization mode to locator mode can be initiated according to a schedule or after a time delay expires. In still other examples, the changeover from synchronization mode to locator mode can be initiated upon receipt of a command.

Once in the locator mode, the non-selected locator can be configured to effectively receive (RX) the reply signal(s) from one or more of the responding tags or MTs (e.g., capture samples of the signal spectrum that are associated with transmitted reply signal communications from one or more of the MTs). The locators can also be configured to determine a capture time (time of arrival, or TOA) associated with the receipt of reply signal transmissions, and report the capture times to the central processing (1230).

A central computer (e.g., central processing 1230) can be adapted to communicate with the locators through any appropriate communication network (1204). Thus, the communication channel(s) between the locators and the central computer can utilize any appropriate communication topology, including but not limited to wired (e.g., fiber-optic, Ethernet, etc.) or wireless (e.g., WIFI, SMS, etc.) message passing systems. In some examples, communications could also be passed between the central computer and the locators through one or more wireless transponders and locators, which in such an example act as a message relay system. The message/control passing does not need precise timing, and data communication systems optimized for network messaging may be utilized in this application.

In addition to the processes described previously (e.g., see FIGS. 12-15 and related discussion), the central processing block (1230) can be configured to determine the initiating locators transmit time (e.g., via a reported time from the interrogator), receive the reported capture times for the MT replies from each of the locators (e.g., via messaging from the locators), evaluate the reported capture times and synthesize a normalized capture time (e.g., time of arrival) for inventory management. For example, the central processing block (1230) can determine a set of time difference calculations for the time difference between the transmit time of the interrogation signal, and the receipt of the tag reply from each of the locators (i.e. from both the selected locator, and the non-selected locators), where the constants associated with the non-selected locators are effectively subtracted out.

In one example, consider the situation where a system of four (4) locators (e.g., Locator 1, 1221; Locator 2, 1222; Locator 3, 1223; Locator 4, 1224) are configured in an inventory and location system such as in a container yard. One of the locators (e.g., Locator 2, 1222) can be selected to operate as an initiating locator (i.e., a transmitting or interrogating locator) in an interrogator mode. The non-selected locators (e.g., Locator 1, 1221; Locator 3, 1223; Locator 4, 1224; etc.) can be instructed (e.g., by a message from a central computer such as central processing 1230) to initially be configured to operate in a synchronization mode. In the synchronization mode, the non-selected locator can be configured to receive an interrogation signal from the initiating locator, where the interrogation signal transmission is synthesized using the time base (e.g., time base, 1622) associated with the initiating locator (e.g., Locator 2, 1222). The non-selected locator(s) can be configured to receive the interrogation signal (e.g., the interrogating sequence may be comprised of three message frames that include patterns A, B, C as illustrated in FIGS. 3 and 10B) by capturing samples with a receiver such as illustrated in FIG. 5A, where the captured samples can be correlated against an appropriate reference signal (e.g., an internally stored reference sequence such as described previously in FIGS. 5A-5D) identified with a valid transmission sequence as previously described with respect to the transponders (MTs). The non-selected locators, having been previously configured in a synchronization mode to recognize the interrogation signal (e.g., the locators may use the particular group address codes associated with values for A, B, and C patterns from the interrogation signal), can adapt (e.g., acquire) their timing and frequency based on the timing identified from the correlation with the interrogation signal. Since Locator 2 (1222) synthesized the interrogation signal transmission carrier/frequency/phase/timing using time base 622, the adapted timing/frequency of the non-selected locator(s) is effectively derived from the same time base (622) as Locator 2.

In some examples, the interrogation signal that is transmitted from the initiating locator (e.g., Locator 2; 1222) to the non-selected locators (e.g., Locators 1, 1221; Locator 3, 1223; Locator 4, 1224) for purposes of time/frequency synchronization is the same interrogation signal that is transmitted to the other tags for inventory management. Thus, synchronization with the non-selected locators does not require additional time overhead on the inventory system, and also does not have any appreciable effect on the speed with which inventory can be located, since signal acquisition by all devices (tags or locators alike) in the network be they tags or locators is a parallel effort. Since the time/frequency bases associated with each of the tags in the inventory system are inherently synchronized to the common time base derived signals from the initiating locator. Since the non-selected locators can also be effectively synchronized to the same time base as the initiating locators, all of these devices in the inventory system can be frequency synchronized very closely (e.g., frequency can be synchronized to less than a part per billion accuracy). In addition, all of the devices (tags or locators) able to receive the interrogation signal have, except for speed of light propagation issues, approximately matched timing.

In some examples, the non-selected locators (e.g., Locator 1, 1221; Locator 3, 1223; Locator 4, 1224) may be configured in a calibration mode where the non-selected locators transmit a reply signal (e.g., 1612, 1632, 1642) after acquiring the timing and frequency similar to the reply signal transmission from regular tags. The calibration mode is substantially similar to the synchronization mode with the addition of the reply signal transmission. The reply signal transmission may be useful for occasional calibration in a networked inventory locator system. The non-selected locator positions relative to the selected locator can be extracted subject to an arbitrary rotation angle. If two locator positions are surveyed, then normally this rotational arbitrariness is resolved. The network of locators with no surveyed positions may be thought of as a network which is triangulated and therefore rigid, but in an unknown location and orientation. With one surveyed position, then positions are known subject to an arbitrary rotation. If two locator positions are surveyed, then for planar networks, all positions are usually known. These extra or occasional replies would provide the computer system with data regarding the distances between all of the locators, assuming that they could all ping each other.

After the reply signal transmission is completed, the non-selected locator in the calibration mode can switch to the locator mode. The changeover from calibration mode to locator mode can be automatically handled by non-selected locator, or initiated in response to some other event. For example, the changeover may occur automatically after the non-selected locator has determined that timing and frequency adjustments are complete and (e.g., when the interrogation signal correlates with a reference sequence, timing acquisition may be deemed complete) and after the reply signal transmission is complete. In some other examples, the changeover from calibration mode to locator mode can be initiated according to a schedule or after a time delay expires. In still other examples, the changeover from calibration mode to locator mode can be initiated upon receipt of a command.

As illustrated in FIG. 16A, each of the locators (1221-1224) is located at a different physical location (LOCATION1-LOCATION 4). Locator 2 (1222) can be selected as an initiating locator (or interrogator). Each of the non-selected locators (1221, 1223, 1224) is located at a different distance (DISTANCE 21, DISTANCE 23, DISTANCE 24) relative to the initiating locators physical location (LOCATION 2). Due to the physical location differences, each of the non-selected locators (Locator 1, 1221; Locator 3, 1223; Locator 4, 1224) operated in the synchronization mode or calibration mode may not receive the interrogation signal from the initiating locator (Locator 2, 1222) at exactly the same time.

As illustrated in FIG. 16B, Locator 2 (1222) may initiate the transmission of an interrogation signal when configured in an interrogator mode where the interrogation signal may be transmitted (TX). Each of the locators (e.g. Locator 1, 1221; Locator 3, 1223; Locator 4, 1224) in the synchronization mode or calibration mode can be configured in a receive mode (RX) to capture the interrogation signal. After a first delay time (D1) relative to the interrogation signal transmission, a first non-selected locator (Locator 1, 1221) in the calibration mode can be operated in a transmit mode (TX) to transmit a reply transmission (1612) that is received by Locator 2 (1222) with a first time of arrival (TOA 1). After a second delay time (D2) relative to the interrogation signal transmission, a second non-selected locator (Locator 3, 1223) in the calibration mode can be operated in a transmit mode (TX) to transmit a reply transmission (1632) that is received by Locator 2 (1222) with a second time of arrival (TOA 2). After a third delay time (D3) relative to the interrogation signal transmission, a third non-selected locator (Locator 4, 1224) in the calibration mode can be operated in a transmit mode (TX) to transmit a reply transmission (1642) that is received by Locator 2 (1222) with a third time of arrival (TOA 3). This process may continue until all of the non-selected locators that are operated in the calibration mode have completed their reply transmissions, at which point each of the non-selected locators can return to the locator mode of operation.

Each locator in the locator mode of operation may not receive the reply transmission from the transponder (or MT) at exactly the same time due to the physical location differences of the locators relative to the transponders. For example, each of the transponders (Transponder 1, 2, etc.) can be operated in a receive mode (RX) to capture the same interrogation signal from the initiating locator (Locator 2), which may be the same interrogation signal transmitted to the non-selected locators. After a fourth delay time (D4) relative to the interrogation signal transmission, a first transponder (Transponder 1) can be operated in a transmit mode (TX) to transmit a reply transmission that is received by Locator 1 (1221) with a first time of arrival (TOA 4-1), received by Locator 2 (1222) with a second time of arrival (TOA 4-2), received by Locator 3 (1223) with a third time of arrival (TOA 4-3), and received by Locator 4 (1224) with a fourth time of arrival (TOA 4-4). After a fifth delay time (D5) relative to the interrogation signal transmission, a second transponder (Transponder 2) can be operated in a transmit mode (TX) to transmit a reply transmission that is received by Locator 1 (1221) with a first time of arrival (TOA 5-1), received by Locator 2 (1222) with a second time of arrival (TOA 5-2), received by Locator 3 (1223) with a third time of arrival (TOA 5-3), and received by Locator 4 (1224) with a fourth time of arrival (TOA 5-4).

As illustrated above, the non-selected locators (Locator 1, 1221; Locator 3, 1223; Locator 4, 1224) are operated as hybrid tag/locators, first receiving and correlating the sequences from the interrogating locator (Locator 2, 1222), optionally transmitting a reply, and then capturing and correlating the signals transmitted from one or more of the tags addressed by the interrogation signal (e.g., via group ID or some other identifier such as MT ID Code), after an appropriate time delay. The locators can also communicate their timing measurements and other measurement information (e.g., Doppler measurements) with the central computer system. For the selected locator (e.g. Locator 2, 1222), the timing measurements may correspond to the corrected round trip time (i.e., the difference between time of transmission and the time of arrival once programmed delays are subtracted out). For the non-selected locators (e.g., Locator 1, 1221; Locator 3, 1223; Locator 4, 1224) the timing measurements may correspond to "bent path" times from the selected locator (e.g. Locator 2, 1222) via each tag in the addressed group to the non-selected locators (e.g., Locator 1, 1221; Locator 3, 1223; Locator 4, 1224) respectively, minus the propagation time from the selected locator (e.g. Locator 2, 1222) to the respective non-selected locator (e.g., Locator 1, 1221; Locator 3, 1223; Locator 4, 1224). The central computer can be configured to cooperatively operate the locators (e.g., periodically, scheduled, on demand, etc.) to determine the inter-locator distances/propagation times (pinging the other locators), and store these distance/propagation times for use in calculations. For example, the central computer can capture, perhaps as the result of an interrogation sequence, all the distances from the tags to the selected locator (e.g., Locator 2, 1222), and all of the bent path distances from the non-selected locators (e.g., Locator 1, 1221; Locator 3, 1223; Locator 4, 1224) to the selected locator (e.g., Locator 2, 1222).

Example Calculations of Distances for Bent Paths

Figure 16C:
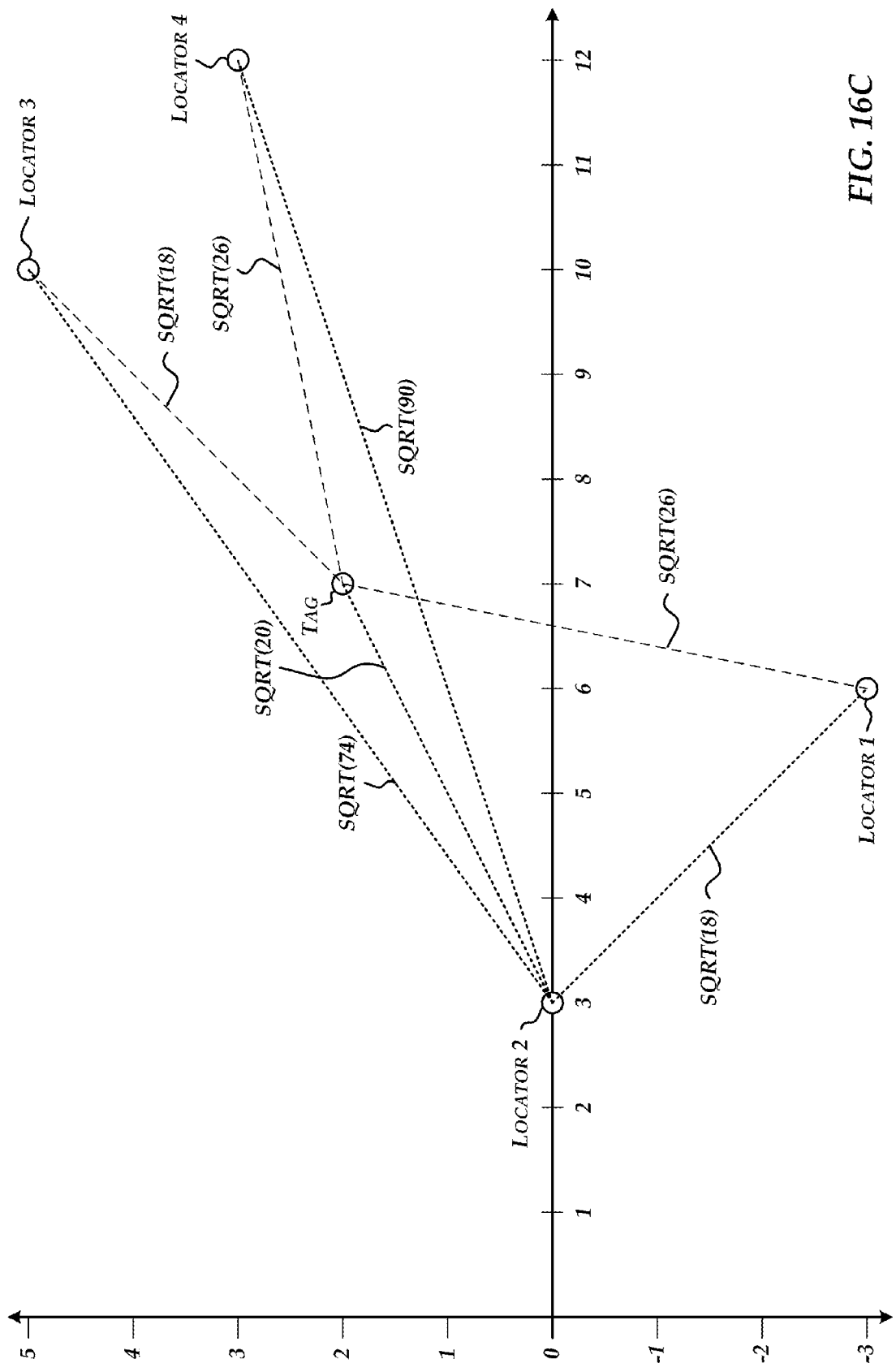

FIG. 16C illustrates an example location map of four locators (Locators 1-4) and a tag to illustrate bent signal path calculations. An example set of calculations are illustrated in the table below:

| Device | Grid Location (x, y) | Distance to Interrogator (uSec) | Distance to Tag (uSec) | Reported Time (u Sec) |
|---|---|---|---|---|
| Locator 2 | 3, 0 | 0 | SQRT(20) | 2 × SQRT(20) = 8.944272 |
| Tag | 7, 2 | SQRT(20) | 0 | NA |
| Locator 1 | 6, -3 | SQRT(18) | SQRT(26) | SQRT(20) + SQRT(26) − SQRT(18) = 5.328510 |
| Locator 3 | 10, 5 | SQRT(74) | SQRT(18) | SQRT(20) + SQRT(18) − SQRT(74) = 0.112452 |
| Locator 4 | 12, 3 | SQRT(90) | SQRT(26) | SQRT(20) + SQRT(26) − SQRT(90) = 0.084327 |

As shown in the table and FIG. 16C: distance=SQRT$(\Delta X^2 + \Delta Y^2)$. The (x,y) grid locations noted in the table and FIG. 16C correspond to the locations associated with a device (e.g., a locator or a Tag), while the distance is given in terms of microseconds of distance, which corresponds to about 1000 feet of light for each microsecond of time. For example, the time distance between Locator 2 and the Tag is given as SQRT(20) or 4.462136 uSec, thus the reported time for Locator 2 corresponds to the round-trip time of 2×SQRT(20) or 8.944272 uSec. The distance between Locator 1 and the Tag is given as SQRT(26) or 5.0990195 uSec., but the reported time for Locator 1 corresponds to the time from Locator 2 to the Tag (i.e., SQRT(20) or 4.46136 uSec) added to the time from the Tag to Locator 1 (i.e., SQRT(26) or 5.0990195 uSec), less the time from Locator 2 to Locator 1 (i.e. SQRT (18) or 4.242641 uSec), giving a reported time of 5.328510 uSec. The distance between Locator 3 to the Tag is given as SQRT(18) or 4.242641 uSec, but the reported time for Locator 3 corresponds to the time from Locator 2 to the Tag 1 (i.e., SQRT(20) or 4.46136 uSec) added to the time from the Tag to Locator 3 (i.e., SQRT(18) or 4.242641 uSec), less the time from Locator 2 to Locator 3 (i.e. SQRT (74) or 8.602325 uSec) giving a reported time of 0.112452 uSec. The distance between Locator 4 to the Tag is given as SQRT(26) or 5.0990195 uSec., but the reported time for Locator 4 corresponds to the time from Locator 2 to the Tag (i.e., SQRT(20) or 4.46136 uSec) added to the time from the Tag to Locator 4 (i.e., SQRT(26) or 5.0990195 uSec), less the time from Locator 2 to Locator 4 (i.e. SQRT (90) or 9.468833 uSec) giving a reported time of 0.084327 uSec.

As can be seen from the above calculations, the inter-locator distances are subtracted off of the reported times and thus the computer system (e.g., central processing 1230) will need to be configured to account for this by adding the inter-locator times back into the calculations to provide accurate bent path times. The inter-locator times can be readily determined by calibration such as by identifying half of the round-trip time of arrival associated with the interrogator signal and the reply from the corresponding locator.

In some examples, the central computer can be configured to initiate a site survey with two or more of the locators. During a site survey, the central computer can select one of the locators to operate as an initiating locator in an interrogator mode, and one or more of the other locators (i.e., non-selected locators) can be operated in a calibration mode. The site survey can be useful for determining inter-locator times for transmission and receipt of transmissions.

In some examples, the locators can be configured into the calibration mode, synchronization mode, interrogator mode or the locator mode by a command received from the central computer via the communication network (1204). In some other examples, the non-selected locators can be configured into their operating modes by a command that is encoded in a broadcast transmission, which may be the same broadcast transmission received by the other tags in the system. In still other examples, the locators can be configured into their operating modes according to a predetermined schedule or after a timeout event occurs. In yet other examples, the locators can be configured into their operating modes based on an assigned group ID encoded in a wireless broadcast such as described previously with respect to FIGS. 13-15.

Additional Variants and Observations

The data communication over the network (1204) increases by a factor corresponding to the number of locators, and the amount of location data returned by the network. In practice, not all tags may be able to communicate with all locators. This could be due to any number of environmental factors such as signal reflections, occlusions that impair the signal, multi-path as well as other factors. As a consequence, the selected locator will likely need to be changed/rotated to facilitate locating all tagged items in the inventory. In some instances, not all of the reported/calculated location data will perfectly agree and thus some of the data may be unreliable. However, by reviewing the data from multiple locators, faulty data can be identified and marked to be ignored. A variety of well known techniques can be utilized to extract the best position estimates in the cases where the data from the multiple locators do not agree with one another. The positions of the locators and the environmental factors to be considered in communications with those locators may be presumed, at least in some instances, to have been surveyed and made available as data in the central computer system.

In some examples, portable locators such as hand help locators may be utilized in an inventory system. Some portable locator devices may be commanded to perform complete ping sequences, thereby providing location data for those locators. Some example portable locators may be adapted to communicate capture time information in a wireless communication formal such as Bluetooth, WIFI, etc. Some other examples portable locators may be adapted to encode information for receipt by the central computer system as an encoded signal transmission. In some examples, the signal transmission can correspond to a multi-frame sequence that includes messages encoded in the "C" packets via the locator system, where another locator can receive the message and relay the message to the central computer system.

In some examples a chain of locators can be used to establish synchronization. In one example, one of the locators (e.g., Locator 3) is unable to acquire a signal from the initiating locator (e.g., Locator 2) due to environmental conditions such as multipath signals and reflections. In this example, the impaired locator (e.g., Locator 3) can be adapted to acquire a signal from another locator (e.g., Locator 4), where the other locator (e.g., Locator 4) can be configured to transmit a reply signal transmission that can be captured and processed by the impaired locator (e.g., Locator 3). The data returned from the impaired locator (e.g., Locator 3) can incorporate compensation for two timing propagation delays instead of one.

A calibration ping (e.g., an interrogation signal that is transmitted to the non-selected locators for purposes of aligning the time and frequency of the non-selected locators) can be transmitted very occasional in a static network that does not undergo any appreciable environmental changes (e.g., significant shifts in temperature can effect the accuracy of the synthesized timing and frequency). However, the presently disclosed calibration/synchronization methods may also be applied in dynamic networks where one or more of the locators may be moving. In some example dynamic networks, a calibration ping can be triggered whenever the locators are determined to be moving (i.e., by a status flag or some other communication mechanism).

In some additional example dynamic networks, a calibration ping can be triggered at the beginning of each interrogation signal similar to that described with respect to FIG. 16B. In still further example dynamic networks, a calibration ping can be triggered at both the beginning and end of each interrogation signal so that the non-selected locators can transmit a reply to the interrogator (i.e., the selected locator) at both the beginning of the interrogation sequence and then again after all of the tags have responded. The change in distances and reported times can then be evaluated and an interpolation of the inter-locator distances may be made using the end points and time of arrival as a mechanism to determine the relative movement of the locators.

In some examples of dynamic or moving networks, two ping returns (beginning and end) may not be required since Doppler shifts will be detected in the calibration ping return. The detected Doppler shift can, in some examples, serve as an indicator that the locators are moving relative to one another in a three-dimensional space (X, Y, Z). Once the Doppler is identified, a logical flag can be set in the system so that a ping return can be requested from the non-selected locator (i.e., the non-selected locator that is moving relative to the selected locator), and the Doppler can be utilized by the central processing 1230 to extrapolate distance. This type of dynamic network may be useful with heterogeneous networks of ground vehicle mounted locators, static locators, airborne locators and hand held locators that may be used in a dynamic network.

Since some of the dynamic networks may be airborne or located in some other three-dimensionally moving space, it may be useful to have locators report their GPS position to the central processing (1230), for additional accuracy. With truly changing three-dimensional locations, the moving locators could be tracked by static or known locations using real-time GPS.

The presently described system, apparatus, and methods take advantage of the acquired frequency knowledge to allow for synthesis of a time and phase coherent response to accurately determine location with a low-power MT. Although the preceding description describes various embodiments of the system, the invention is not limited to such embodiments, but rather covers all modifications, alternatives, and equivalents that fall within the spirit and scope of the invention. For example, the positioning of the various components may be varied, the functions of multiple components can be combined, individual components may be separated into different components, or components can be substituted as understood in the art. Since many embodiments of the invention can be made without departing from the spirit and scope of the invention, the invention is not limited except as by the appended claims.

What is claimed is:

1. An inventory management system that is arranged for tracking inventory in a tracking area, the system comprising:
    a central processing unit that is arranged to track inventory in response to communications received over a communication network;
    a plurality of locators, wherein each of the plurality of locators is arranged to communicate with the central processing unit over the communication network, and also arranged to communicate with one or more transponders located within the tracking area,
       wherein a selected locator from the plurality of locators is configured to
          encode a transmission sequence with a first identifier associated with a group of transponders, and
          transmit the encoded transmission sequence in a first wireless broadcast; and
       wherein at least one of the plurality of locators is configured to
          receive one or more reply transmission sequences,
          correlate received reply transmission sequences with an identified sequence to generate a correlation vector for each of the one or more reply transmission sequences, wherein the identified sequence is associated with the one or more transponders,
          determine a time of arrival for each corresponding correlation vector, and
          forward the time of arrival and corresponding correlation vector to the central processing unit; and
    a transponder that is positioned within the tracking area and arranged to:
       capture information from at least a portion of the first wireless broadcast;
       correlate the captured information with a reference sequence, wherein the reference sequence is associated with the first identifier;
       identify a correlation when the captured information correlates with the internally stored reference sequence;
       encode a reply sequence with a second identifier associated with the transponder;
       determine a precise time interval to transmit the encoded reply sequence based on the previously received first wireless broadcast; and
       transmit the encoded reply sequence in a second wireless broadcast, wherein the transmission of the encoded reply sequence is transmitted at the precisely determined time interval.

2. The inventory management system of claim 1, wherein the selected locator and the at least one of the plurality of locators correspond to the same one of the plurality of locators.

3. The inventory management system of claim 1, wherein the selected locator and the at least one of the plurality of locators correspond to different ones of the plurality of locators.

4. The inventory management system of claim 1, wherein the at least one of the plurality of locators comprises at least three locators.

5. The inventory management system of claim 1, wherein the group of transponders comprises one or more transponders.

6. The system of claim 1, wherein the selected locator is selected by the central processing unit according to a group polling sequence, wherein the group polling sequence corresponds to one or more of a round-robin selection sequence, an ordered selection sequence, a random selection sequence, or a pseudo-random selection sequence.

7. The system of claim 6, wherein the central processing unit is further arranged to identify an active inventory from each responding transponder, and determine precise locations for each responding transponder in the active inventory from the logged results.

8. The system of claim 1, wherein the central processing unit is operated according to a scan inventory process such that the central processing unit is configured to: select a next group of transponders, identify a group polling sequence for the next group of transponders, select a next item from the group polling sequence and identify a transmitting locator, and receive and log results from locators for the group polling sequence.

9. The system of claim 1, wherein the central processing unit is further arranged to time synchronize observations associated with the correlation vectors received from the plurality of locators.

10. The system of claim 1, wherein the central processing unit is further arranged to perform a best fit location estimate for each responding transponder based on the correlation vectors and time of arrivals from each of the plurality of locators associated with the corresponding responding transponder.

11. The system of claim 1, wherein the central processing unit is further arranged to identify an active inventory comprised of each transponder that is determined to respond to the first wireless broadcast.

12. The system of claim 1, wherein the central processing unit is configured to determine time delays between transmission of a wireless broadcast of an interrogation signal from an initiating locator and receipt of the interrogation signal by one or more non-selected locators.

13. The system of claim 12, wherein the central processing unit is further configured to utilize one or more of the determined time delays to offset the time of arrival determinations received from the at least one of the plurality of locators.

14. The system of claim 13, wherein the offset time of arrivals correspond to either a round-trip time or a bent path time.

15. The system of claim 1, wherein the selected locator corresponds to an initiating locator, and wherein another of the plurality of locators corresponds to a non-selected locator, wherein the non-selected locator is configured to capture samples of the first wireless broadcast to acquire timing and frequency adjustments for the non-selected locator based on timing and frequencies associated with the first wireless broadcast from the initiating locator.

16. The system of claim 14, wherein the at least one of the plurality of locators corresponds to the non-selected locator.

17. The system of claim 1, wherein the selected locator corresponds to an initiating locator that is configured to transmit an interrogation signal, and wherein another of the plurality of locators corresponds to a non-selected locator, wherein the non-selected locator is configured to operate in a synchronization mode to: capture samples associated with the interrogation signal; and acquire timing and frequency adjustments for the non-selected locator when the captured samples correlate with an internally stored reference sequence.

18. The system of claim 17, wherein the at least one of the plurality of locators corresponds to the non-selected locator when the non-selected locator is operated in a locator mode.

19. The system of claim 17, wherein the internally stored reference sequence is associated with the first identifier, and wherein the interrogation signal corresponds to the first wireless broadcast.

20. The system of claim 17, wherein the internally stored reference sequence is associated with a specific identifier, and wherein the interrogation sequence corresponds to the third wireless broadcast that is different from the first wireless broadcast and the second wireless broadcast.

21. The system of claim 17, wherein the non-selected locator is configured to operate in either the synchronization mode or a locator mode in response to one of: a command received from the central processing unit via the communication network, a command encoded in a wireless broadcast, a predetermined schedule, or an assigned group ID associated with a wireless broadcast.

22. The system of claim 1, wherein the wherein the selected locator corresponds to an initiating locator that is configured to transmit an interrogation signal, and wherein another of the plurality of locators corresponds to a non-selected locator, wherein the non-selected locator is configured to operate in a calibration mode to: capture samples associated with the interrogation signal, acquire timing and frequency adjustments for the non-selected locator when the captured samples correlate with an internally stored reference sequence, encode a second reply sequence with a third identifier associated with the non-selected locator, and transmit the encoded second reply sequence in a third wireless broadcast for receipt by the selected locator.

23. The inventory management system of claim 1, wherein each of the plurality of locators has an antenna, and wherein at least some of the antennas are positioned at different physical locations proximal to the tracking area.

24. The system of claim 1, wherein the central processing unit is arranged to transmit a synchronization pulse to each locator over the communication network, receive a reply transmission over the communication network from each locator in response to the transmitted synchronization pulse, and compute a precise roundtrip delay time between the central processing unit and each locator.

25. The system of claim 24, wherein the central processing unit is arranged to utilize the previously computed roundtrip delay times to time synchronize the time of arrival for each corresponding correlation vector received from each corresponding locator.

26. The system of claim 24, wherein the central processing unit is arranged to store each computed precise roundtrip delay time for each locator in a database.

27. The system of claim 1, wherein the central processing unit is arranged to determine a location of the transponder by evaluating the correlation vectors and times of arrival from at least two of the locators.

28. The system of claim 27, wherein the central processing unit is arranged to evaluate: a round-trip between a first locator and the transponder to compute a first distance from the first locator to the transponder, a first known position associated with the first locator to determine a first set of possible positions for the transponder relative to the first known position according to the first distance, a time of arrival for a second locator to compute a second distance from the second locator to the transponder, a second known position associated with the second locator to determine a second set of possible positions for the transponder relative to the second known position according to the second distance, and a third set of possible positions that correspond to the intersections between the first set of possible positions and the second set of possible positions.

29. The system of claim 28, wherein the central processing unit is further arranged to evaluate: a time of arrival for a third locator to compute a third distance from the third locator to the transponder, a third known position associated with the third locator to determine a third set of possible positions for the transponder relative to the third known position according to the third distances, and wherein the third set of possible positions corresponds to the intersection between the first set of possible positions, the second set of possible positions, and the third set of possible positions.

30. The system of claim 27, wherein the central processing unit is further arranged to evaluate a first correlation vector from the first transponder and a second correlation vector from the second transponder.

31. The system of claim 30, wherein the central processing unit is arranged to compare the magnitudes of the first correlation vector and the second correlation vector.

32. The system of claim 30, wherein the central processing unit is arranged to apply a statistical analysis function to the first correlation vector and the second correlation vector to determine a best estimate of location for the transponder.

33. The system of claim 30, wherein the statistical analysis function corresponds to one of a least squares fit, a best fit, or a weighting function.

34. The system of claim 1, wherein the central processing unit is arranged to identify interference in communications between the transponder and a particular locator, whereby obstructions are found for communications between the transponder and the particular locator.

35. The system of claim 34, wherein the central processing unit is arranged to store the identified interference in a site survey.

36. An inventory management system that is arranged for tracking inventory in a tracking area, the system comprising:
   a plurality of locators that each include a respective antenna positioned at different positions proximate to the tracking area;
   a plurality of transponders associated with inventory positioned within the tracking area;
   a central processing unit that is configured in communication with the plurality of locators over a communication network to track the inventory positioned within the tracking area, wherein the central processing unit is configured to select one of the plurality of locators as a selected locator operated in either an interrogator mode or a locator mode, and also configured to select two or more of the plurality of locators as non-selected locators operated in either a synchronization mode or the locator mode;
   wherein the selected locator in the interrogator mode is configured to: synthesize timing and frequency from a time base, encode a transmission sequence with an identifier, transmit an interrogation signal using the synthesized timing and frequency from the time base, wherein the interrogation signal corresponds to a wireless broadcast of the transmission sequence encoded with the identifier;
   wherein each non-selected locator in the synchronization mode is configured to: capture samples of the interrogation signal, correlate the captured samples with a reference sequence to acquire timing and frequency for operating the non-selected locator, wherein the acquired timing and frequency is effectively associated with the time base of the selected locator;
   wherein each transponder is configured to capture samples of the interrogation signal and determine if the captured samples correlate with the reference sequence associated with the corresponding transponder, when the captured samples are determined to correlate the transponder is further configured to: encode a reply sequence with an identifier associated with the transponder, determine a precise time interval for the transponder to transmit the encoded reply sequence in a reply signal, and transmit the reply signal at the precisely determined time interval for receipt by one or more of the plurality of locators; and
   each locator that is configured in the locator mode is configured to: capture samples of the reply signal, correlate the captured samples with a reference sequence to generate a correlation vector associated with a corresponding transponder, determine a time of arrival for each corresponding correlation vector, and forward each time of arrival and corresponding correlation vector to the central processing unit.

37. The system of claim 36, wherein the central processing unit is further configured to initiate the operation of the selected locator in the interrogator mode when at least one non-selected locators is operated in the synchronization mode such that the timing and frequency associated with the at least one non-selected locator is synchronized.

38. The system of claim 37, wherein the central processing unit is further configured to initiate operation of the selected locator and at least two non-selected locators in the locator mode after the interrogation signal is transmitted such that at least three of the locators capture reply signals from one or more of the transponders.

39. The system of claim 36, wherein the central processing unit is further adapted to configure one of the non-selected locators in a relay mode, wherein the non-selected locator in the relay mode is configured to capture samples of the interrogation signal and retransmit the interrogation signal for receipt by another one of the non-selected locators.

40. The system of claim 36, wherein the central processing unit is configured to determine time delays between transmission of the interrogation signal and receipt of the interrogation signal by one or more of the non-selected locators.

41. The system of claim 40, wherein the central processing unit is further configured to utilize one or more of the determined time delays to offset the time of arrival determinations received from the corresponding one of the plurality of locators.

42. The system of claim 41, wherein the offset time of arrivals correspond to either a round-trip time or a bent path time.

43. The system of claim 36, wherein one or more of the non-selected locators is configured to operate in either the synchronization mode or the locator mode in response to one of: a command received from the central processing unit via the communication network, a command encoded in a wireless broadcast, a predetermined schedule, or an assigned group ID associated with a wireless broadcast.

44. The system of claim 36, wherein the selected locators is configured to operate in either the interrogator mode or the locator mode in response to one of: a command received from the central processing unit via the communication network, a command encoded in a wireless broadcast, a predetermined schedule, or an assigned group ID associated with a wireless broadcast.

45. The system of claim 36, wherein the central processing unit is configured to select one or more of the plurality of locators as non-selected locators operated in a calibration mode, wherein the non-selected locator operated in the calibration mode is configured to: capture samples of the interrogation signal, correlate the captured samples with a reference sequence to acquire timing and frequency for operating the non-selected locator, wherein the acquired timing and frequency is effectively associated with the time base of the selected locator, encode a second reply sequence with an identifier associated with the corresponding locator, determine a precise time interval for the corresponding locator to transmit the encoded reply sequence in a second reply signal, and transmit the second reply signal at the precisely determined time interval for receipt by one or more of the plurality of locators.

46. An inventory management system that is arranged for tracking inventory in a tracking area, the system comprising:
   a plurality of locators that each include a respective antenna;
   a plurality of transponders associated with inventory positioned within the tracking area;
   a central processing unit that is configured in communication with the plurality of locators over a communication network to track the inventory positioned within the tracking area, wherein the central processing unit is configured to select one of the plurality of locators as a selected locator operated in an interrogator mode or a locator mode, and also configured to select two or more of the plurality of locators as non-selected locators operated in a synchronization mode, a calibration mode, or the locator mode;
   wherein the selected locator in the interrogator mode is configured to: synthesize timing and frequency from a time base, encode a transmission sequence with an identifier, transmit an interrogation signal using the synthesized timing and frequency from the time base, wherein the interrogation signal corresponds to a wireless broadcast of the transmission sequence encoded with the identifier;

wherein each non-selected locator in the synchronization mode or the calibration mode is configured to: capture samples of the interrogation signal, correlate the captured samples with a reference sequence to acquire timing and frequency for operating the non-selected locator, wherein the acquired timing and frequency is effectively associated with the time base of the selected locator;

wherein each non-selected locator in the calibration mode is further configured to: encode a reply sequence with an identifier associated with the corresponding locator, determine a precise time interval for the corresponding locator to transmit the encoded reply sequence in a reply signal, and transmit the reply signal at the precisely determined time interval for receipt by one or more of the plurality of locators;

wherein each transponder is configured to capture samples of the interrogation signal and determine if the captured samples correlate with the reference sequence associated with the corresponding transponder, when the captured samples are determined to correlate the transponder is further configured to: encode a second reply sequence with an identifier associated with the transponder, determine a second precise time interval for the transponder to transmit the encoded second reply sequence in a second reply signal, and transmit the second reply signal at the second precisely determined second time interval for receipt by one or more of the plurality of locators; and each locator that is configured in the locator mode is configured to: capture samples of the reply signal, correlate the captured samples with a reference sequence to generate a correlation vector associated with a corresponding transponder, determine a time of arrival for each corresponding correlation vector, and forward each time of arrival and corresponding correlation vector to the central processing unit.

47. The system of claim 46, wherein the central processing unit is further configured to initiate the operation of the selected locator in the interrogator mode when at least one of the non-selected locators is operated in either the synchronization mode such that the timing and frequency associated with the at least one non-selected locator is synchronized.

48. The system of claim 46, wherein the central processing unit is further configured to initiate the operation of the selected locator in the interrogator mode when at least one of the non-selected locators is operated in the calibration mode such that the timing and frequency associated with the at least one non-selected locator is synchronized and the delay times can be determined for a complete calibration.

49. The system of claim 48, wherein the central processing unit is configured to select the calibration mode for at least one of the non-selected locators when one or more of the locators is determined to be in motion.

50. The system of claim 49, wherein one or more of the locators is determined to be in motion based on a Doppler shift detected in the reply signal transmission.

51. The system of claim 48, wherein the central processing unit is further configured to initiate a second cycle of the operation of the selected locator in the interrogator mode with at least one of the non-selected locators such that change in distances and reported time or arrivals can be evaluated and an interpolation of the inter-locator distances may be made using the end points and time of arrival as a mechanism to determine the relative movement of the locators.

* * * * *